(12) United States Patent
Tokuchi

(10) Patent No.: US 11,265,428 B2
(45) Date of Patent: Mar. 1, 2022

(54) INFORMATION PROCESSING APPARATUS AND NON-TRANSITORY COMPUTER READABLE MEDIUM FOR OPERATING A TARGET OBJECT IN A REAL SPACE THROUGH A VIRTUAL INTERFACE BY DETECTING A MOTION OF A USER BETWEEN A DISPLAY SURFACE DISPLAYING THE VIRTUAL INTERFACE AND THE USER

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 192 days.

(21) Appl. No.: 16/412,646

(22) Filed: May 15, 2019

(65) Prior Publication Data
US 2019/0373119 A1 Dec. 5, 2019

(30) Foreign Application Priority Data

May 29, 2018 (JP) .............................. JP2018-102770

(51) Int. Cl.
*G06F 3/12* (2006.01)
*H04N 1/00* (2006.01)
*H04N 1/327* (2006.01)
*G06F 3/01* (2006.01)

(52) U.S. Cl.
CPC ......... *H04N 1/00381* (2013.01); *G06F 3/017* (2013.01); *G06F 3/1204* (2013.01); *G06F 3/1205* (2013.01); *G06F 3/1237* (2013.01); *H04N 1/32776* (2013.01)

(58) Field of Classification Search
None
See application file for complete search history.

(56) References Cited

U.S. PATENT DOCUMENTS

| | | | |
|---|---|---|---|
| 2012/0326966 A1 | 12/2012 | Rauber | |
| 2014/0232747 A1* | 8/2014 | Sugimoto | G06T 11/00 345/633 |
| 2014/0258880 A1* | 9/2014 | Holm | G06F 3/04842 715/748 |
| 2015/0288883 A1* | 10/2015 | Shigeta | H04N 5/23218 345/642 |
| 2016/0316080 A1* | 10/2016 | Shimamoto | H04N 1/00477 |
| 2016/0316081 A1* | 10/2016 | Matsuki | G06F 3/0304 |
| 2016/0320836 A1* | 11/2016 | Oyama | G06F 3/005 |
| 2017/0262045 A1* | 9/2017 | Rouvinez | G06F 3/011 |
| 2018/0053352 A1* | 2/2018 | Finding | H04N 5/33 |
| 2018/0188806 A1* | 7/2018 | Colosimo | G06F 3/014 |

(Continued)

FOREIGN PATENT DOCUMENTS

| | | |
|---|---|---|
| JP | 2013-172432 A | 9/2013 |
| JP | 2014-520339 A | 8/2014 |

*Primary Examiner* — Henok Shiferaw
(74) *Attorney, Agent, or Firm* — Oliff PLC

(57) ABSTRACT

An information processing apparatus includes a detection unit and a control unit. The detection unit detects motion of a user made between a display surface that displays an image of an object to be operated and the user. The motion is made without contact with the display surface. The control unit instructs the object to execute an operation corresponding to the detected motion of the user.

30 Claims, 61 Drawing Sheets

(56) References Cited

U.S. PATENT DOCUMENTS

| | | | |
|---|---|---|---|
| 2018/0218538 A1* | 8/2018 | Short | G02B 27/017 |
| 2019/0082061 A1* | 3/2019 | Tokuchi | H04N 5/77 |
| 2019/0094977 A1* | 3/2019 | Ishihara | H04N 1/00413 |
| 2019/0212962 A1* | 7/2019 | Iwasaki | G06F 3/1229 |

* cited by examiner

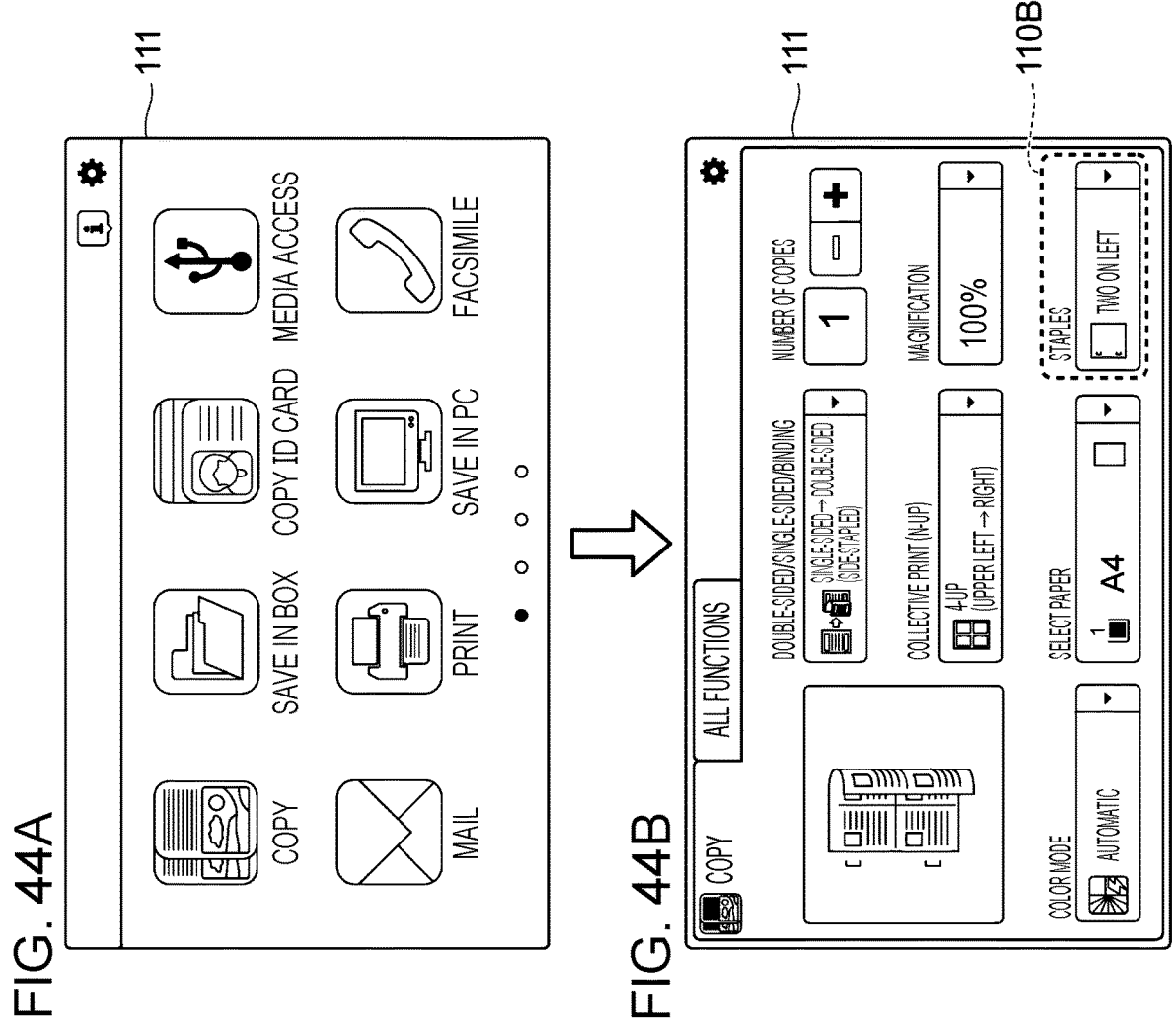

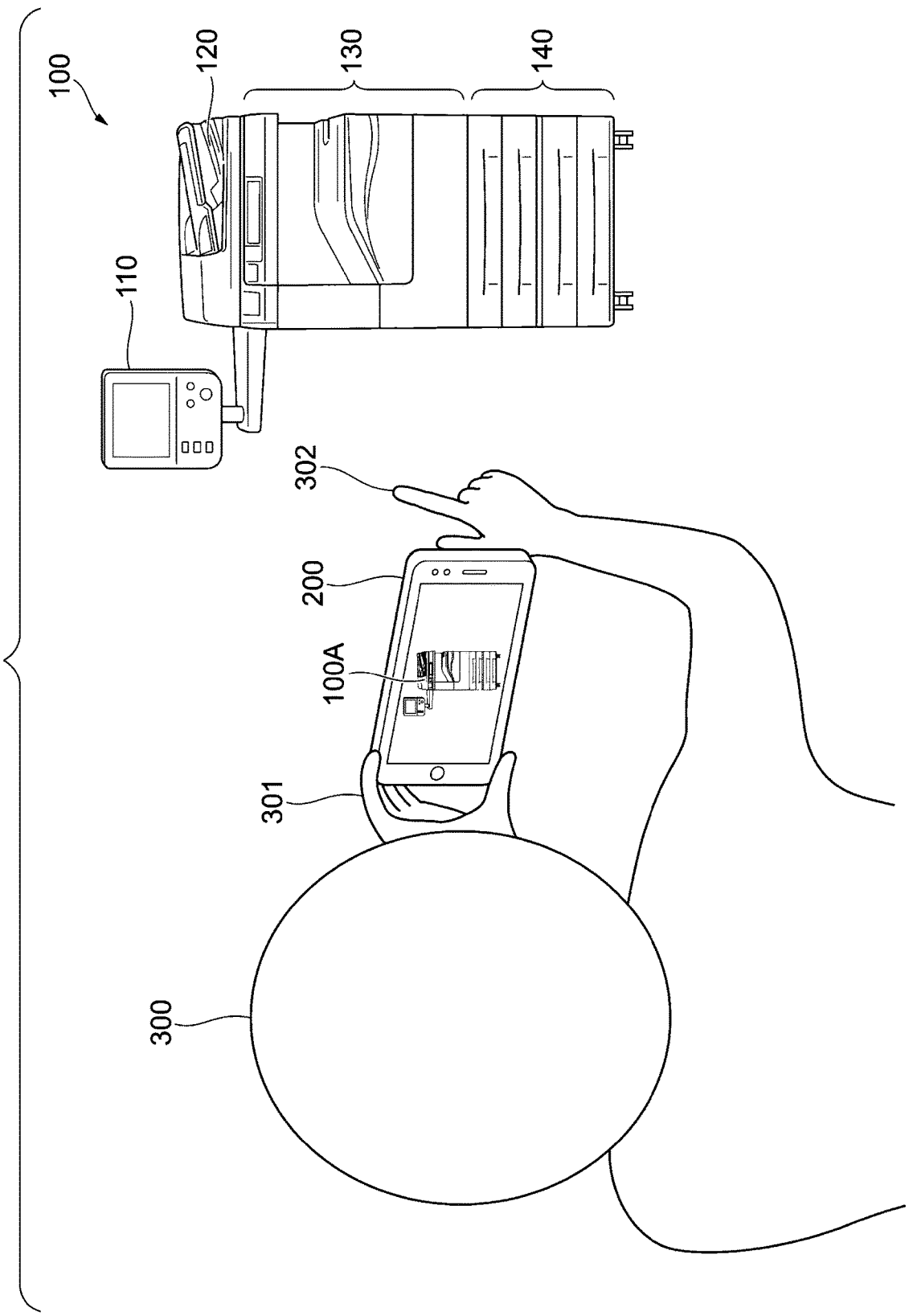

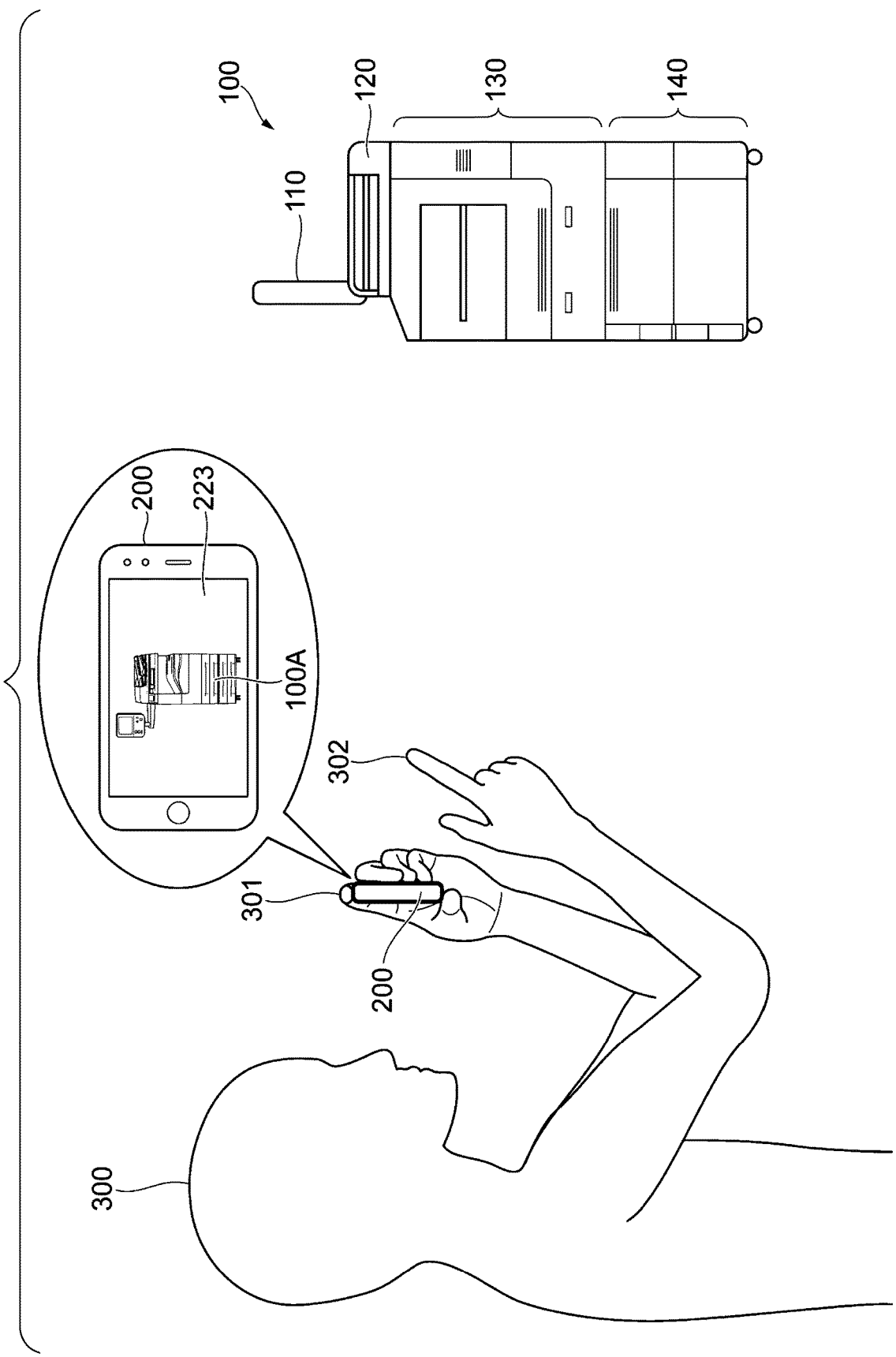

FIG. 52

| 223B | CLOSER SIDE (USER SIDE) | FARTHER SIDE (OBJECT SIDE) |
|---|---|---|
| FUNCTION A | VALID | VALID |
| FUNCTION B | INVALID | VALID |
| FUNCTION C | VALID | INVALID |
| FUNCTION D | VALID | VALID |
| FUNCTION E | VALID | INVALID |
| FUNCTION F | INVALID | VALID |

INFORMATION PROCESSING APPARATUS AND NON-TRANSITORY COMPUTER READABLE MEDIUM FOR OPERATING A TARGET OBJECT IN A REAL SPACE THROUGH A VIRTUAL INTERFACE BY DETECTING A MOTION OF A USER BETWEEN A DISPLAY SURFACE DISPLAYING THE VIRTUAL INTERFACE AND THE USER

CROSS-REFERENCE TO RELATED APPLICATIONS

This application is based on and claims priority under 35 USC 119 from Japanese Patent Application No. 2018-102770 filed May 29, 2018.

Background

(i) Technical Field

The present disclosure relates to an information processing apparatus and a non-transitory computer readable medium.

(ii) Related Art

There is provided a technique of recognizing a device whose image is included in an image captured using a camera built into a portable device operated by a user and displaying a virtual user interface corresponding to the recognized device in an augmented reality space to allow operating the device through the virtual user interface. (See, for example, Japanese Unexamined Patent Application Publication No. 2013-172432)

SUMMARY

The device is operated on the basis of an instruction given through contact by the user.

Aspects of non-limiting embodiments of the present disclosure relate to operating an object that is present in the real space without using an operation through contact by the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a detection unit that detects motion of a user made between a display surface that displays an image of an object to be operated and the user, the motion being made without contact with the display surface; and a control unit that instructs the object to execute an operation corresponding to the detected motion of the user.

BRIEF DESCRIPTION OF THE DRAWINGS

Exemplary embodiments of the present disclosure will be described in detail based on the following figures, wherein:

FIGS. 44A to 44C illustrate screen variations caused on a display section in the case where a post-processing apparatus image is selected by an index finger image, in which FIG. 44A illustrates display before a gesture by the index finger image is received, FIG. 44B illustrates display after a gesture by the index finger image is received, and FIG. 44C illustrates an example of a screen of the smartphone that receives an operation by a gesture;

FIG. 45 illustrates an example of a system according to a ninth exemplary embodiment;

FIG. 46 illustrates the positional relationship between the right hand and the smartphone;

FIGS. 47A and 47B illustrate switching between two types of operation methods, in which FIG. 47A illustrates a method in which the right hand is moved in the air between the liquid crystal display and the user, and FIG. 47B illustrates a method in which the right hand is moved in the air between the smartphone and the image forming apparatus;

FIGS. 48A and 48B illustrate a case where a portion of an object as the operation target is switched between a case where an operation is performed on the closer side with respect to the smartphone and a case where an operation is performed on the farther side with respect to the smartphone, in which FIG. 48A illustrates the relationship for a case where an operation by the user is performed between the liquid crystal display and the user, and FIG. 48B illustrates the relationship for a case where an operation by the user is performed between the smartphone and the image forming apparatus;

FIGS. 49A and 49B illustrate a case where an operation mode is switched between a case where an operation is performed on the closer side with respect to the smartphone and a case where an operation is performed on the farther side with respect to the smartphone, in which FIG. 49A illustrates the relationship for a case where an operation by the user is performed between the liquid crystal display and the user, and FIG. 49B illustrates the relationship for a case where an operation by the user is performed between the smartphone and the image forming apparatus;

FIGS. 50A and 50B illustrate a case where an operation is set to be valid and invalid in accordance with a case where an operation is performed on the closer side with respect to the smartphone and a case where an operation is performed on the farther side with respect to the smartphone, in which FIG. 50A illustrates a case where an operation by the user is performed between the liquid crystal display and the user, and FIG. 50B illustrates a case where an operation by the user is performed between the smartphone and the image forming apparatus;

FIG. 52 illustrates an example of a screen on which the setting of the position at which a gesture is to be detected is determined for each function;

FIGS. 55A and 55B illustrate an example in which an object is operated by moving the right hand at a position on the closer side with respect to the aerial image, in which FIG. 55A illustrates how the aerial image and the right hand look as seen from the user, and FIG. 55B illustrates the positional relationship among the user, the aerial image, and the right hand;

FIGS. 56A and 56B illustrate an example in which an object is operated by moving the right hand at a position on the farther side with respect to the aerial image, in which FIG. 56A illustrates how the aerial image and the right hand look as seen from the user, and FIG. 56B illustrates the positional relationship among the user, the aerial image, and the right hand;

FIGS. 57A and 57B illustrate the principle of an aerial image forming apparatus that forms an aerial image by allowing light output from a display device to pass through a dedicated optical plate, in which FIG. 57A illustrates the positional relationship between members and the aerial image, and FIG. 57B illustrates a part of the sectional structure of the optical plate, the display device and the optical plate here each being an example of an optical component;

FIGS. 59A and 59B illustrate the principle of an aerial image forming apparatus that forms an aerial image using a micro mirror array with a structure in which minute rectangular holes that constitute a two-face corner reflector are arranged at equal intervals in a plane, in which FIG. 59A illustrates the positional relationship between members and the aerial image, and FIG. 59B illustrates a part of the micro mirror array as enlarged;

DETAILED DESCRIPTION

Exemplary embodiments of the present disclosure will be described below with reference to the drawings.

<First Exemplary Embodiment>
<System Example>

The configuration of the entire system and the positional relationship between a user and devices according to a first exemplary embodiment will be described with reference to FIGS. 1 and 2.

Figure 1:
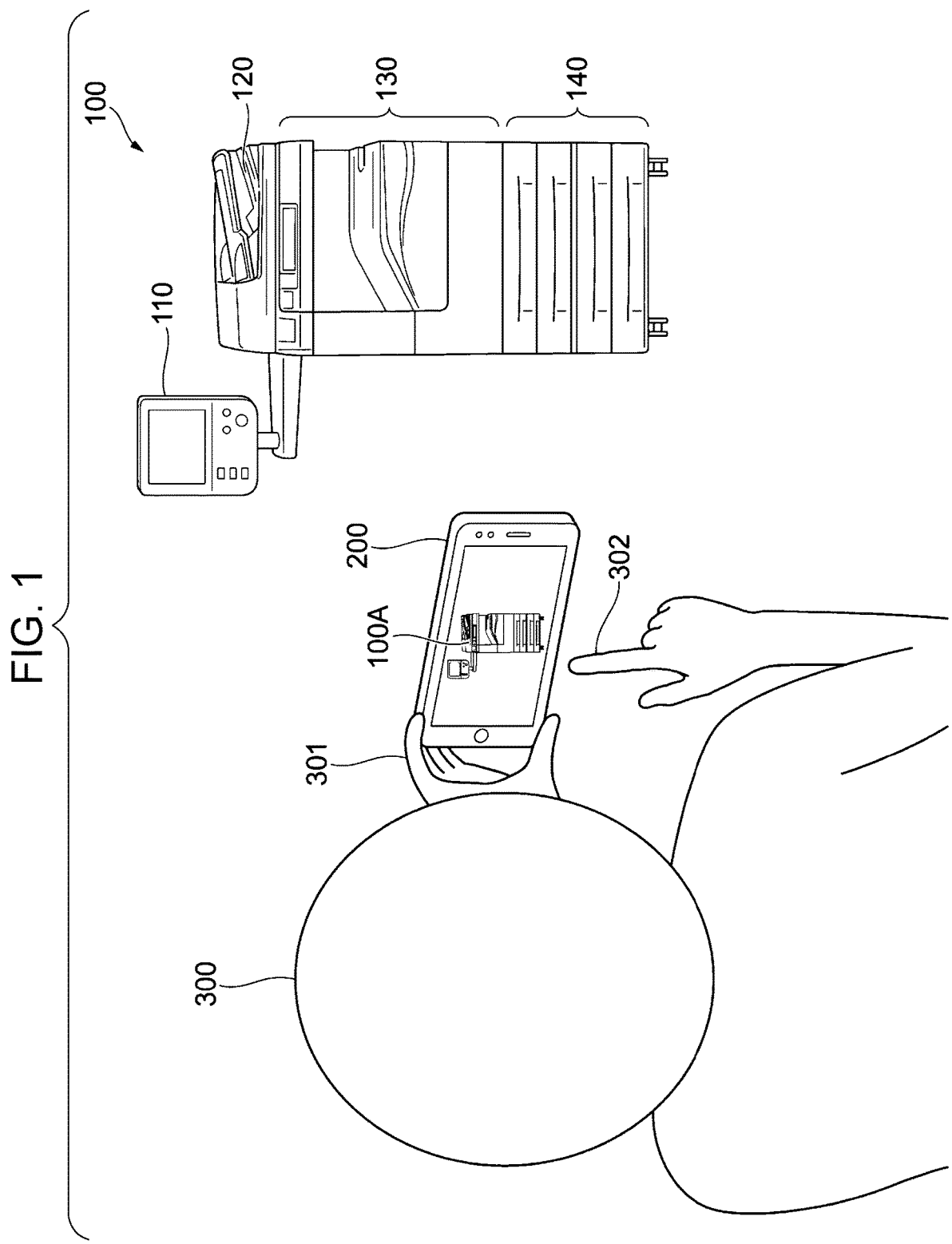
FIG. 1 illustrates an example of a system according to a first exemplary embodiment.

FIG. 1 illustrates an example of the system according to the first exemplary embodiment.

Figure 2:
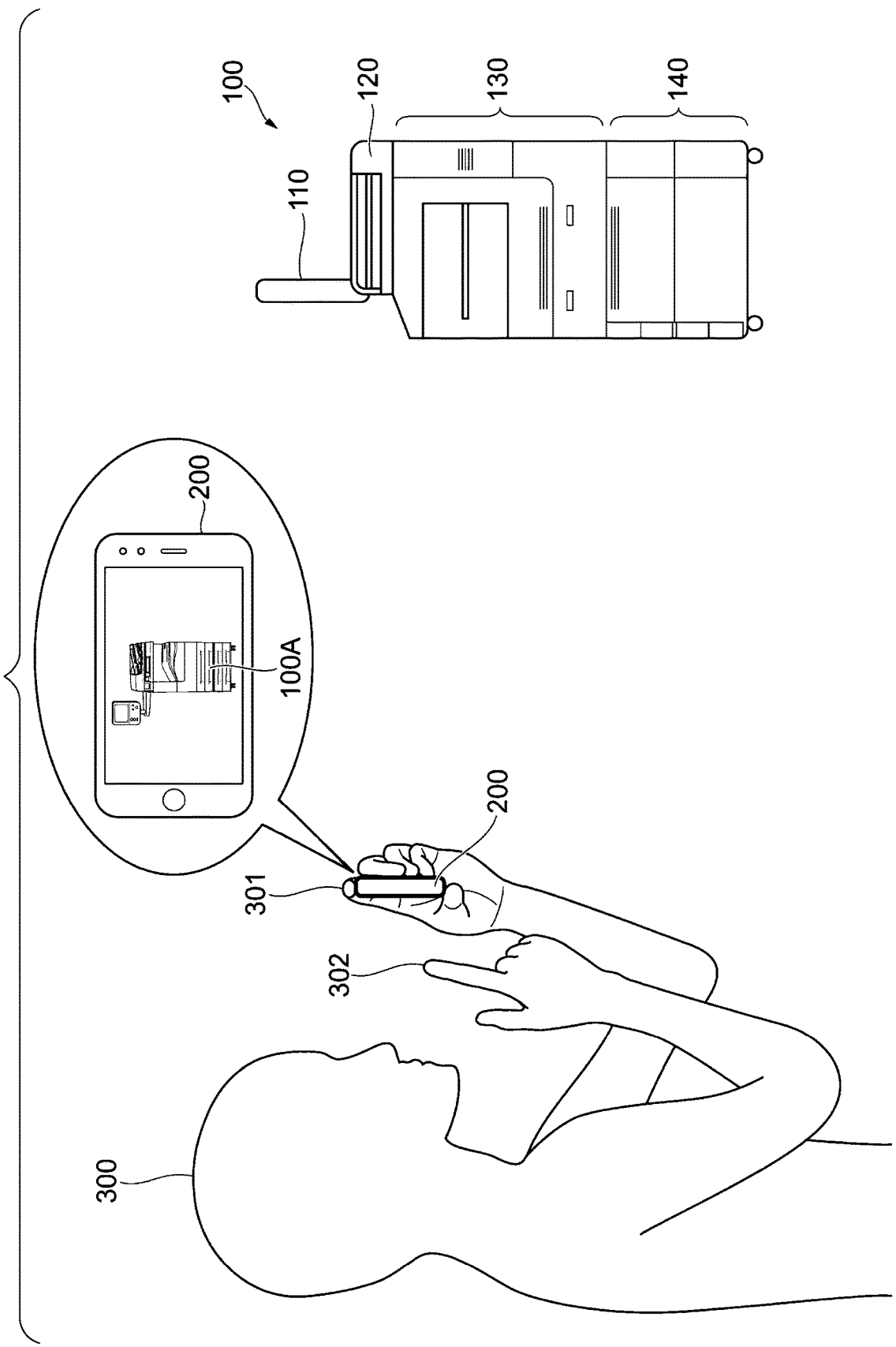
FIG. 2 illustrates the positional relationship between a right hand and a smartphone.

FIG. 2 illustrates the positional relationship between a right hand 302 and a smartphone 200.

The system according to the first exemplary embodiment includes an image forming apparatus 100 that forms an image on a recording material (hereinafter occasionally referred to representatively as "paper"), and the smartphone 200 which captures an image of the image forming apparatus 100.

In the case of the present exemplary embodiment, a user 300 operates the image forming apparatus 100 as an operation target through the smartphone 200.

In the case of the present exemplary embodiment, as illustrated in FIGS. 1 and 2, the user 300 inputs an operation on the image forming apparatus 100 to the smartphone 200 by moving the right hand 302 in the air with a left hand 301 holding the smartphone 200.

The user 300 may move the left hand 301 in the air with the right hand 302 holding the smartphone 200.

As illustrated in FIGS. 1 and 2, the right hand 302 which is used to input an operation is positioned between the head portion of the user 300 and the smartphone 200, and is not in contact with a display surface of the smartphone 200.

The smartphone 200 according to the present exemplary embodiment detects motion of the right hand 302 (e.g. an index finger) of the user, and instructs the image forming apparatus 100 to execute an operation corresponding to the detected motion. That is, the user 300 inputs an operation on the image forming apparatus 100 without touching either of an operation surface of the image forming apparatus 100 and an operation surface of the smartphone 200.

It should be noted, however, that the left hand 301 is in contact with the smartphone 200.

The image forming apparatus 100 has a copy function of generating a duplicate, a scan function of reading an image of a document, a facsimile transmission/reception function of transmitting and receiving a facsimile image to and from a different device, a print function of recording an image on paper, etc. The copy function is implemented by combining the scan function and the print function.

It is not necessary that the image forming apparatus 100 should have all of the copy function, the scan function, and the facsimile transmission/reception function, and the image forming apparatus 100 may be an apparatus that specializes in one of such functions such as a copier, a scanner, a facsimile transmitter/receiver, or a printer (including a three-dimensional printer), for example. The image forming apparatus 100 may also be an apparatus that has a combination of several functions selected from such functions.

The image forming apparatus 100 includes a user interface section 110 that is used to receive an operation from the user 300 and present various kinds of information to the user 300, an image reading unit 120 that reads an image of a document, an image forming unit 130 that records an image on paper, and a housing section 140 that houses the paper.

The smartphone 200 is a portable terminal apparatus, and includes a camera for image capture, a display screen, a communication function, etc. as discussed later.

An image 100A of the image forming apparatus 100 is displayed on the display screen of the smartphone 200 illustrated in FIG. 1.

Here, the image forming apparatus 100 is an example of an object that is present in the real space as the operation target, and the smartphone 200 is an example of an information processing apparatus that is used in contact with the user 300.

<Configuration of Image Forming Apparatus>

Figure 3:
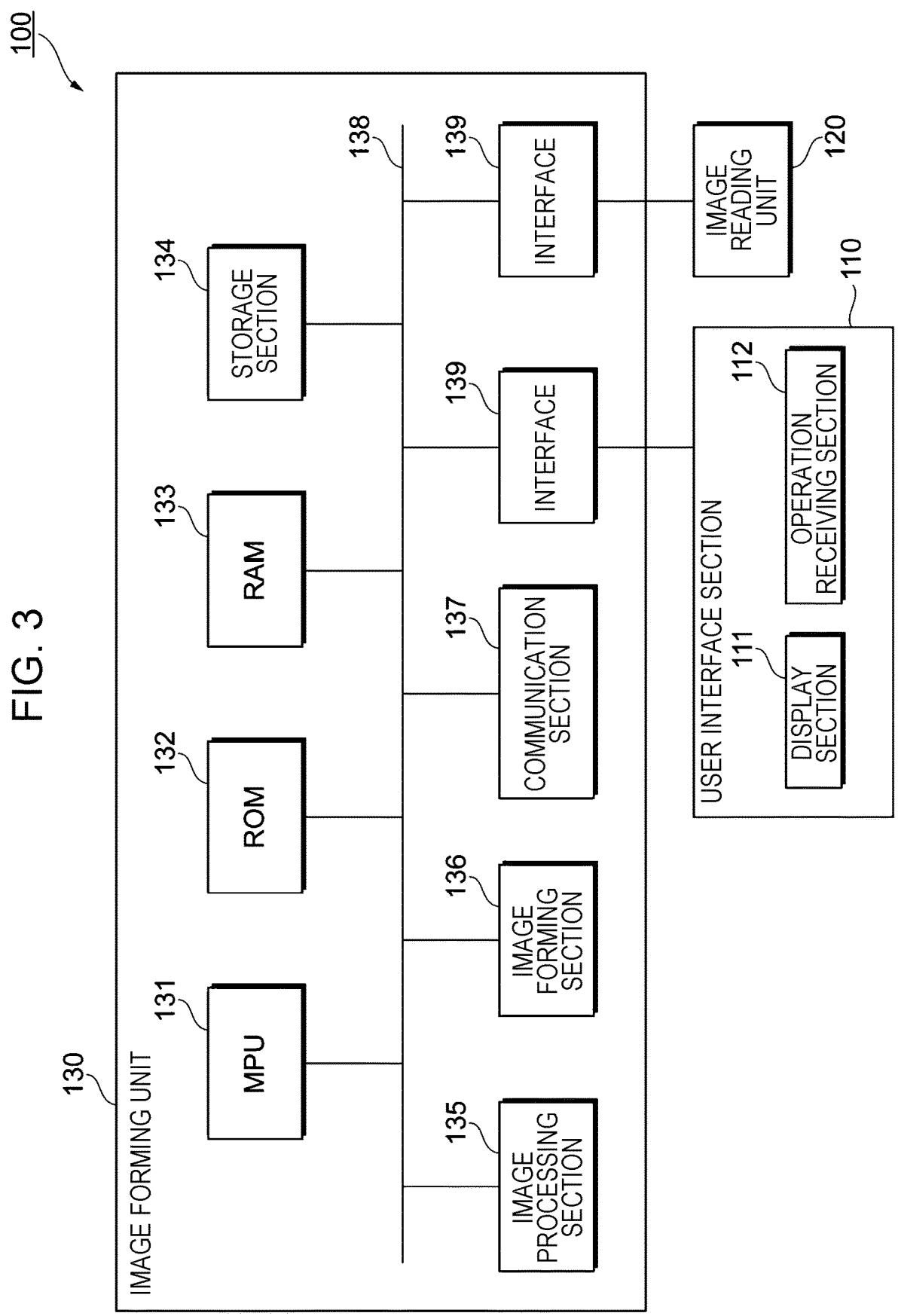
FIG. 3 illustrates an example of the hardware configuration of an image forming apparatus.

FIG. 3 illustrates an example of the hardware configuration of the image forming apparatus 100.

Portions in FIG. 3 corresponding to those in FIG. 1 are denoted by the corresponding reference numerals.

The user interface section 110 includes a display section 111 that is used to display an operation screen etc., and an operation receiving section 112 that receives an operation input by the user.

The display section 111 includes a liquid crystal display panel, an organic electro-luminescence (EL) display panel, or the like, for example.

The operation receiving section 112 includes a button, a touch pad, or the like that receives an operation input by the user.

The image reading unit 120 includes an image reading section that reads an image from a document, and a document transport section that transports the document to the image reading section. The image reading unit 120 is disposed on top of the image forming unit 130.

The image forming unit 130 includes a micro processing unit (MPU) 131 that functions as a control section, a read only memory (ROM) 132, and a random access memory (RAM) 133.

The MPU 131 provides various kinds of functions by executing a program such as firmware read from the ROM 132. The RAM 133 is used as a work area for the program.

Besides, the image forming unit 130 includes a storage section 134 that is used to store image data etc., an image processing section 135 that performs image processing such as color correction and tone correction on the image data, an image forming section 136 that forms an image on paper using an electrophotographic system or an inkjet system, a communication section 137 that is used for external communication, etc.

The storage section 134 includes a non-volatile storage medium such as a hard disk apparatus or a semiconductor memory. The storage section 134 stores image data on a document read by the image reading unit 120 and image data received through the communication section 137.

The image processing section 135 includes a dedicated processor or processing board, for example.

The communication section 137 includes a local area network (LAN) interface or an interface for a facsimile communication network service. The LAN interface is used for communication with the smartphone 200 (see FIG. 1) discussed earlier.

The MPU 131, the ROM 132, the RAM 133, the storage section 134, the image processing section 135, the image forming section 136, and the communication section 137 are connected to each other through a bus 138. The user interface section 110 and the image reading unit 120 discussed earlier are connected to the bus 138 through an interface 139.

<Configuration of Smartphone>

Figure 4:
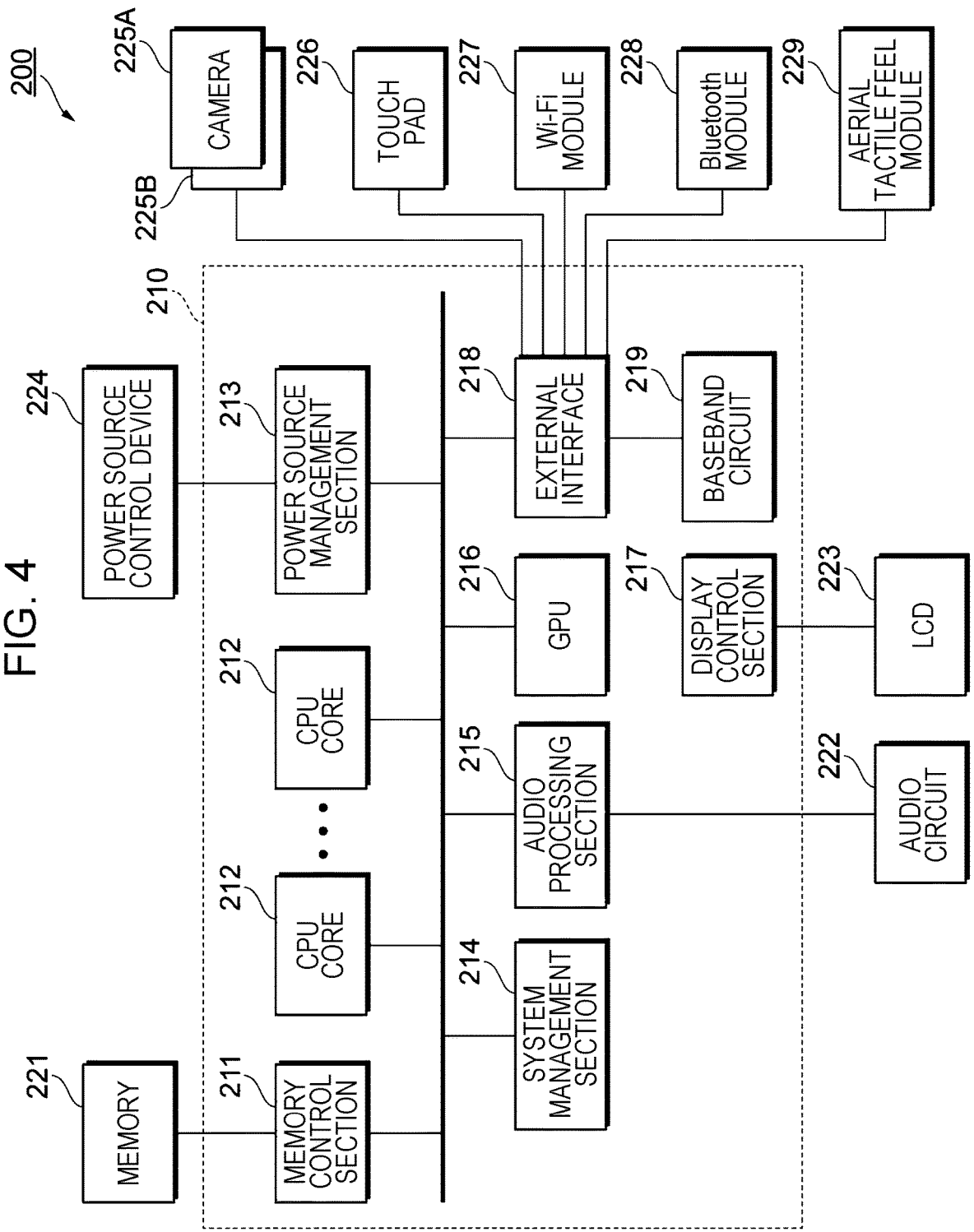
FIG. 4 illustrates an example of the hardware configuration of the smartphone.

FIG. 4 illustrates an example of the hardware configuration of the smartphone 200.

The smartphone 200 includes a processing circuit section 210 that processes data, a non-volatile memory 221 that stores a program and data, an audio circuit 222 that receives and outputs an audio signal, a liquid crystal display (LCD) 223 that displays an image, a power source control device 224, two cameras 225A and 225B that capture an image, a touch pad 226 that detects contact with an operation surface, a Wi-Fi (Wireless Fidelity) module 227 that transmits and receives a wireless signal that conforms to the Wi-Fi (registered trademark) standard, a Bluetooth (registered trademark) module 228 that transmits and receives a wireless signal that conforms to the Bluetooth (registered trademark) standard which is one of near-field communication standards, and an aerial tactile feel module 229 that gives an artificial tactile feel to a portion of a body that is not in contact with an object.

In the case of the present exemplary embodiment, a surface provided with the camera 225A, which is used to capture an image of the image forming apparatus 100, and a surface provided with the liquid crystal display 223 are a front surface and a back surface, respectively.

This enables the user to capture an image of an object (e.g. the image forming apparatus) that is present in the real space and a part (e.g. a finger, a hand, and a foot) of the body of the user himself/herself using the camera 225A while confirming the image on the liquid crystal display 223.

On the other hand, the camera 225B which captures an image of the user 300 who operates the smartphone 200 is provided on the same surface as the liquid crystal display 223. The camera 225A and the camera 225B are provided on opposite surfaces.

In the case where an image captured by the camera 225A is displayed on the liquid crystal display 223, an image captured by the camera 225B is used to detect a gesture (motion of a part of the body) by the user 300. In this case, the image captured by the camera 225B is not displayed on the liquid crystal display 223, or is displayed as an image that supplements the image captured by the camera 225A.

With an instruction from the user, the image captured by the camera 225B may be displayed on the liquid crystal display 223 in place of the image captured by the camera 225A or an image reproduced from the memory 221.

In the case where the smartphone 200 is used in a selfie mode, the image captured by the camera 225B is displayed on the liquid crystal display 223.

In the present exemplary embodiment, the liquid crystal display 223 is used. However, a different display unit such as an organic electro-luminescence (EL) display may also be used as the display surface.

The aerial tactile feel module 229 according to the present exemplary embodiment includes an ultrasonic transducer array in which a plurality of ultrasonic transducers are arranged in a grid shape, for example. This type of the aerial tactile feel module 229 is capable of generating the focal point of ultrasonic waves at a desired position in the air. A tactile feel perceived by the user is varied by adjusting the distribution of the focal points or the intensity of vibration.

For example, the generated tactile feel may be varied in accordance with the function as the operation target. A tactile feel is generated in the case where motion of the user is detected, in the case where an operation for a specific function is received, or the like, for example. Motion of a different user and the intensity of such motion may be transmitted through a tactile feel. The aerial tactile feel module 229 is an example of an application unit that applies a tactile feel.

The processing circuit section 210 includes a memory control section 211 that controls reading and writing of data from and into the memory 221, a plurality of central processing unit (CPU) cores 212 that execute processing, a power source management section 213 that manages supply of power, a system management section 214 that manages operation of a built-in system, an audio processing section 215 that processes an audio signal, a graphics processing unit (GPU) 216 that processes an image in real time, a display control section 217 that displays an image on the liquid crystal display 223, an external interface 218 that is used for connection with an external module, and a baseband circuit 219 that processes a baseband signal.

Figure 5:
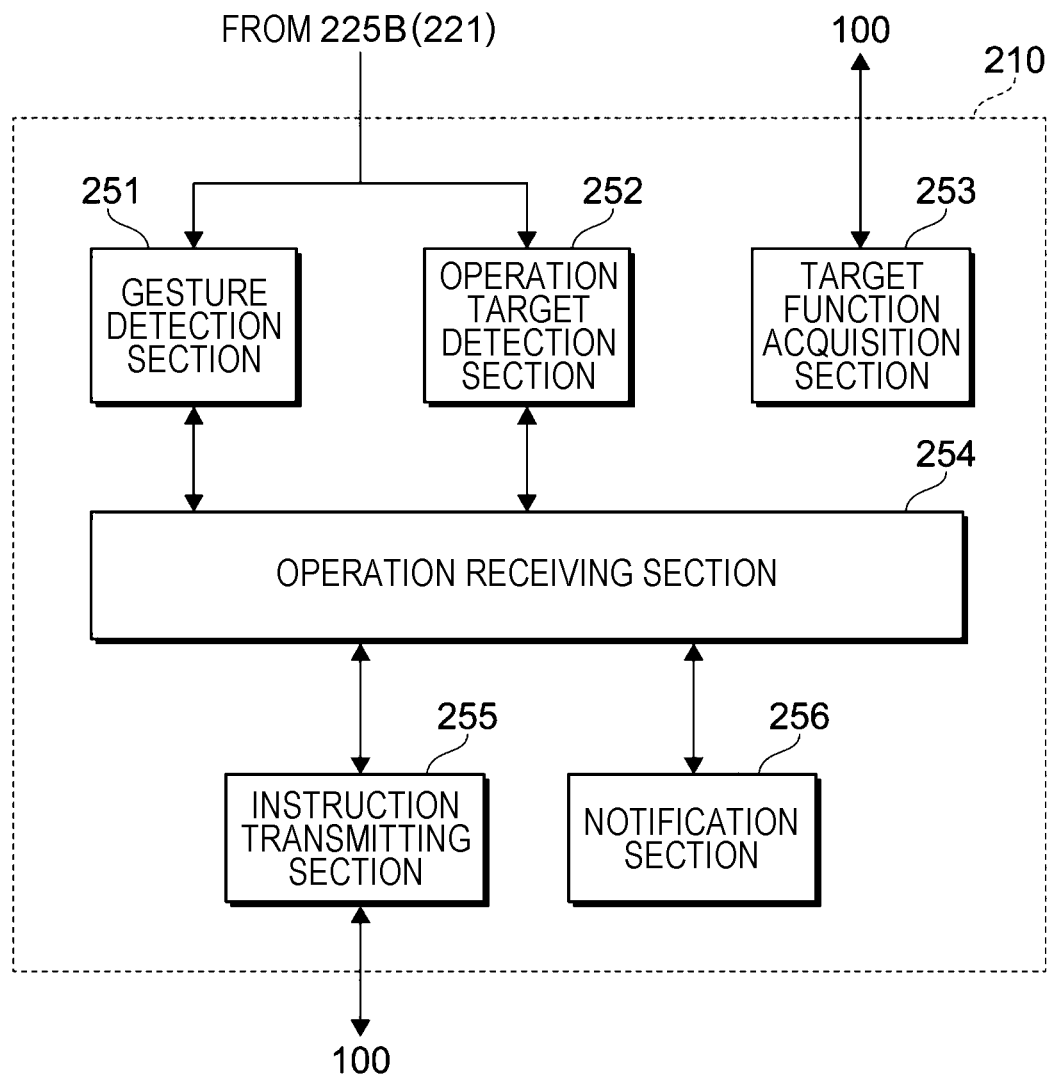
FIG. 5 illustrates an example of the functional configuration implemented by a processing circuit section through execution of a program.

FIG. 5 illustrates an example of the functional configuration implemented by the processing circuit section 210 through execution of a program.

The processing circuit section 210 here is an example of a detection unit, and is also an example of a control unit.

The processing circuit section 210 functions as a gesture detection section 251 that detects a gesture by the user by processing image data, an operation target detection section 252 that detects an operation target object, a target function acquisition section 253 that acquires information on a function of the object from the operation target object (the image forming apparatus 100 in the present exemplary embodiment), an operation receiving section 254 that receives a gesture by the user as an operation, an instruction transmitting section 255 that transmits an instruction corresponding to the received operation to the target object, and a notification section 256 that notifies the user of reception of the operation.

The gesture detection section 251 according to the present exemplary embodiment detects motion of a part (e.g. a finger, a hand, and a foot) of the body of the user from an image captured by the camera 225B, for example, as a gesture. The meaning of motion differs for each object detected as the operation target. Even the meaning of motion for the same object differs among different functions as the operation target.

Examples of the gesture according to the present exemplary embodiment include pushing, pulling, rotating, grasping, kicking, stepping on, clicking, double-clicking, dragging, tapping, flicking, and swiping. The gesture may be specified using a deep learning function.

A different method may be employed to detect a gesture. For example, a gesture may be detected by a Time-of-Flight (ToF) method in which the distance to an object is measured by measuring the time until semiconductor laser or light emitted from a light emitting diode (LED) is returned after being reflected by the object for each pixel, a Structured Light (SL) chronological pattern projection method in which the distance to an object, onto which a vertical stripe pattern that is varied chronologically is projected, is measured on the basis of variations in brightness that appear in pixels obtained by capturing images of the object, a method of measuring the distance to an object using ultrasonic waves or millimeter waves, etc., either singly or in combination thereof. The combination may include a technique of recognizing a gesture by processing captured images.

The operation target detection section 252 according to the present exemplary embodiment executes a process of correlating a part of the body of the user detected from the image captured by the camera 225B with an object (e.g. the image forming apparatus 100) as the operation target to be captured in an image by the camera 225A, an operation element of the object, or the like.

This is because, in the case of the present exemplary embodiment, as illustrated in FIG. 2, the object as the operation target and a part of the body of the user that is used to input an operation are positioned on opposite sides of the smartphone 200.

The operation target detection section 252 extracts a part (e.g. a fingertip, a hand, and a foot) of the body determined in advance by processing an image captured by the camera 225B, and specifies the position of the extracted part of the body in the liquid crystal display 223.

After that, the operation target detection section 252 detects an object as the operation target in the image captured by the camera 225A, an operation element of the object, or the like using the specified position (pixel) in the liquid crystal display 223.

Examples of the operation element according to the present exemplary embodiment include a physical structure (e.g. a button and a switch) to be operated and an indication (e.g. a button and a switch) on a screen reproduced in a software manner.

The image that is used in the processing is not limited to real-time image data acquired from the camera 225A provided on the surface on the opposite side from the liquid crystal display 223, and may be image data acquired from the memory 221 or acquired externally.

In the case where a plurality of objects are included in a screen, the operation target detection section 252 may detect, as the target, an object that is close to the center of the screen in the image captured by the camera 225A.

The operation target detection section 252 may detect a device selected by the user from a list of devices being connected with the smartphone 200 through a wireless LAN or the like as the operation target.

The target function acquisition section 253 according to the present exemplary embodiment acquires information on an operation element that is operable through communication with an object detected by the operation target detection section 252, for example. The target function acquisition section 253 acquires information on an operation element using a wireless LAN, for example.

The target function acquisition section 253 may also acquire information on an operation element that is operable from each of communicable devices, for example.

The operation target is not limited to an object that has a communication function. Examples of such an operation target include a plant and a natural object. Also in this case, the target function acquisition section 253 may acquire information on an operation that is executable through communication with a different device such as a robot that is capable of making motion on behalf of a person.

The operation receiving section 254 according to the present exemplary embodiment receives a detected gesture as an operation in association with a specific function of the operation target object.

As illustrated in FIG. 2, the operation target object is present at a position facing the user. The direction in which the camera 225A captures an image of the operation target object and the direction in which the camera 225B (see FIG. 4) captures an image of a part of the body of the user are opposite directions.

It is not necessary that the opposite directions here should be exactly opposite to each other.

The instruction transmitting section 255 according to the present exemplary embodiment transmits an instruction corresponding to the received operation to the target object (e.g. the image forming apparatus 100). The instruction transmitting section 255 also has a function of acquiring a response to an instruction (e.g. reception of an instruction) from the target object.

In the case where a particular gesture and an instruction of a function are associated with each part of the operation target object, the instruction transmitting section 255 may transmit an instruction received through a gesture. In this case, an operation on an operation screen is not necessary.

In the case where it is necessary to perform an operation on an operation screen, it is necessary to perform an operation to select one of a plurality of choices disposed in the operation screen or reach a choice that is positioned in a deep hierarchy.

In the case where a specific gesture and a specific function are allocated to a specific portion of the operation target object, however, it is possible to transmit an instruction with fewer operations. As a result, it is possible to selectively execute a plurality of functions quickly.

The notification section 256 according to the present exemplary embodiment makes various kinds of notifications that assist the user in performing an operation by a gesture through the audio circuit 222 or the liquid crystal display 223.

<Processing Operation Performed by Processing Circuit Section>

Figure 6:
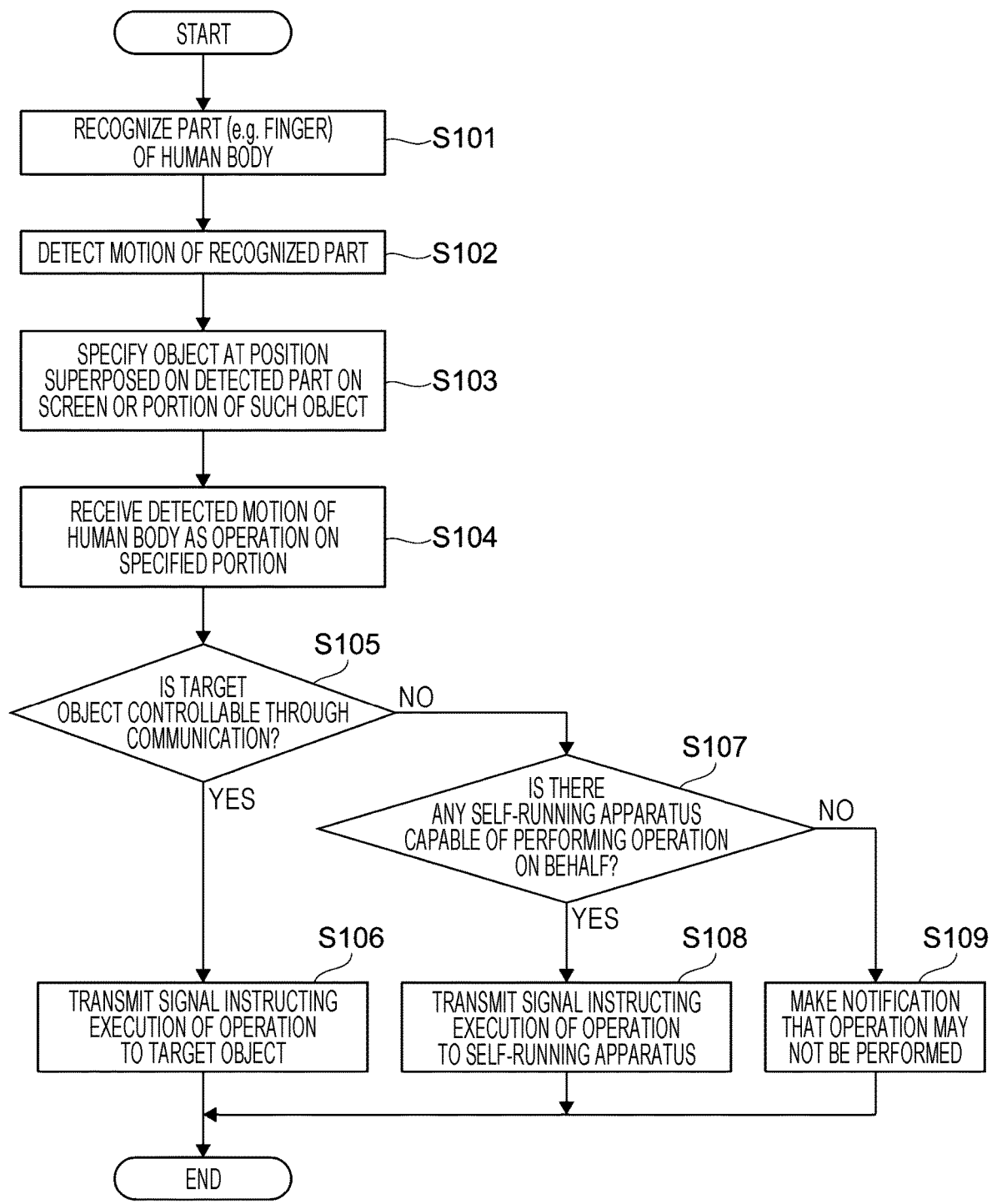
FIG. 6 is a flowchart illustrating an example of processing operation executed by the processing circuit section.

FIG. 6 is a flowchart illustrating an example of processing operation executed by the processing circuit section 210 (see FIG. 5). In FIG. 6, steps are denoted by the symbol S.

The processing circuit section 210 according to the present exemplary embodiment recognizes a part (e.g. a finger, a hand, and a foot) of a human body included in an image captured by the camera 225B which is provided on the same surface as the liquid crystal display 223 (see FIG. 4) (step 101).

Next, the processing circuit section 210 detects motion of the recognized part (e.g. a fingertip) (step 102).

The above processes are executed by the gesture detection section 251 (see FIG. 5), for example.

After that, the processing circuit section 210 specifies an object at a position (pixel) superposed on the detected part on the screen or a portion of the object (step 103). This process is executed by the operation target detection section 252 (see FIG. 5), for example.

The processing circuit section 210 also recognizes an operation target object beforehand or concurrently. In the case where an operation target object may not be specified, the processing circuit section 210 makes a notification that an operation target object may not be specified, that an image that includes a model or the like should be captured, etc. This process is executed by the notification section 256 (see FIG. 5), for example.

Subsequently, the processing circuit section 210 receives the detected motion of the human body as an operation on the specified object or portion (step 104). This process is executed by the operation receiving section 254, for example.

The processing circuit section 210 occasionally does not receive the detected motion as an operation in the case where no function is correlated with the specified portion or in the case where the detected motion is not related to execution of the correlated function.

Next, the processing circuit section 210 determines whether or not the target object is controllable through communication (step 105). This process is also executed by the operation receiving section 254, for example.

In the case where a positive result is obtained in step 105, the processing circuit section 210 transmits a signal that instructs execution of the operation to the target object (step 106).

In the case where a negative result is obtained in step 105, the processing circuit section 210 determines whether or not there is any self-running apparatus that is capable of performing an operation on behalf (step 107).

In the case where a positive result is obtained in step 107, the processing circuit section 210 transmits a signal that instructs execution of the operation to the self-running apparatus (step 108).

In the case where a negative result is obtained in step 107, the processing circuit section 210 makes a notification that the operation may not be performed (step 109).

<Operation Examples>

Operation examples implemented using the functions discussed earlier will be described below.

<Operation Example 1>

Figure 7:
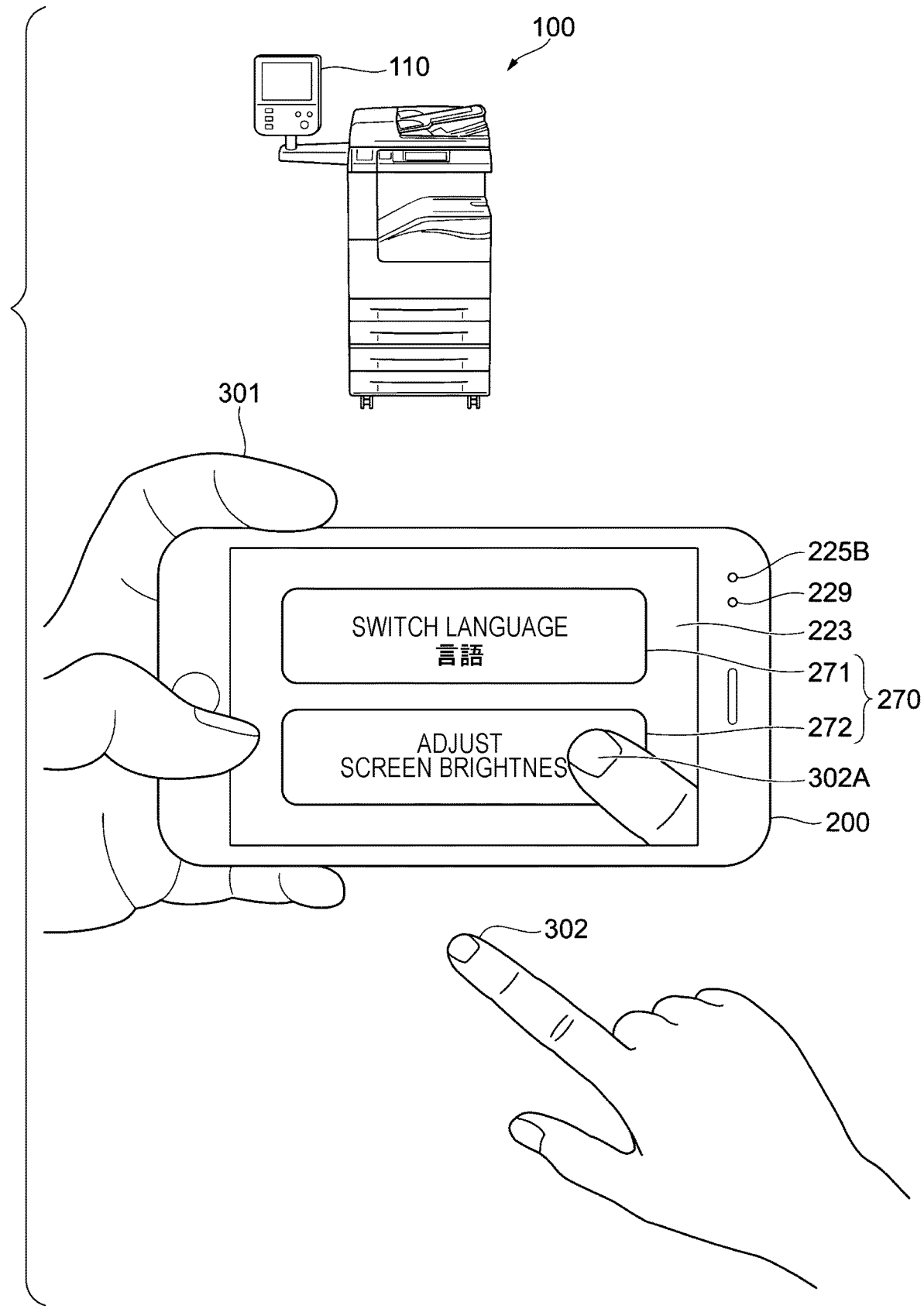
FIG. 7 illustrates an example in which the image forming apparatus is operated without touching a liquid crystal display that displays an image of the image forming apparatus as an operation target.

FIG. 7 illustrates an example in which the image forming apparatus 100 is operated without touching the liquid crystal display 223 which displays an image of the image forming apparatus 100 as the operation target.

When capturing an image, the user holds the smartphone 200 with the left hand 301. Meanwhile, the right hand 302 is moved between the liquid crystal display 223 and the user without contacting the liquid crystal display 223.

This operation example is different from the existing manner of use in that the right hand 302 is not in contact with the display surface of the liquid crystal display 223.

In the case of FIG. 7, a portion of the user interface section 110 is displayed as enlarged on the liquid crystal display 223 of the smartphone 200.

This display state is obtainable by executing a zooming operation with an image of the image forming apparatus 100 displayed on the liquid crystal display 223. For example, the smartphone 200 is provided with a function of enlarging or reducing the screen by tapping on the screen several times. Thus, the enlargement ratio of the screen is changeable by tapping on the screen several times with the index finger of the left hand 301 which holds the smartphone 200 without touching the liquid crystal display 223 with the right hand 302. The enlargement ratio is also changeable without touching the liquid crystal display 223 with the right hand 302 if a voice recognition technique is used.

In the case of FIG. 7, an image 270 (a button 271 for language switching and a button 272 for screen brightness adjustment) in which a portion of the user interface section 110 that is present in the real space is captured and an index finger image 302A are displayed on the liquid crystal display 223.

The index finger image 302A is not the image captured by the camera 225B itself, but an image for display, an icon, or the like prepared in advance.

This is because the index finger of the right hand 302 captured in an image by the camera 225B is the side of the ball of the finger (palm) and an unnatural image would be obtained if the captured image were displayed, as it is, on the liquid crystal display 223.

In the present exemplary embodiment, an image of a finger captured in advance from the side of the back of the hand or an icon is read from the memory 221 (see FIG. 4), and composed at a position detected from the image captured by the camera 225B to be displayed.

In the case where the right hand 302 which is used for operation and the display surface of the liquid crystal display 223 are close to each other (e.g. in the case where the index finger is located about one centimeter from the display surface), display of the index finger image 302A is not always necessary.

In order to operate the image forming apparatus 100 using motion of the index finger, it is necessary that the image forming apparatus 100 should be specified beforehand as the operation target.

In order to specify the image forming apparatus 100, it is possible to use a technique of specifying a model by processing an image of the image forming apparatus 100, a technique of detecting character information such as a model number included in an image, a technique of allowing selecting one from candidates displayed on the liquid crystal display 223, or the like, for example.

The candidates here are given as a list of devices being connected with the smartphone 200 through a wireless LAN or the like, for example.

It is assumed that the image forming apparatus 100 has already been specified as the operation target.

In the case of FIG. 7, two operation elements (the button 271 for language switching and the button 272 for screen brightness adjustment) that are operable are displayed on the liquid crystal display 223. However, three or more operation elements may be displayed, or only one operation element may be displayed.

In the case of FIG. 7, two operation elements are displayed on the liquid crystal display 223, and thus it is necessary to move the right hand 302 in the air such that an image of the operation element as the operation target and the index finger image 302A are superposed on each other.

Movement of the right hand 302 in the air is also detected by the smartphone 200 as motion of the user. It should be noted, however, that motion in the horizontal direction is not correlated with motion of an operation on the operation element captured in an image.

Therefore, motion made before the index finger image 302A is superposed on the button 272 for screen brightness adjustment is not received as an operation on the operation element.

In the present exemplary embodiment, motion of the index finger image 302A is detected since the operation target includes buttons. However, a portion of the body as the detection target may be determined in accordance with the operation target. For example, a part of a human body such as a hand, an arm, or a foot may be determined as the detection target.

Figure 8:
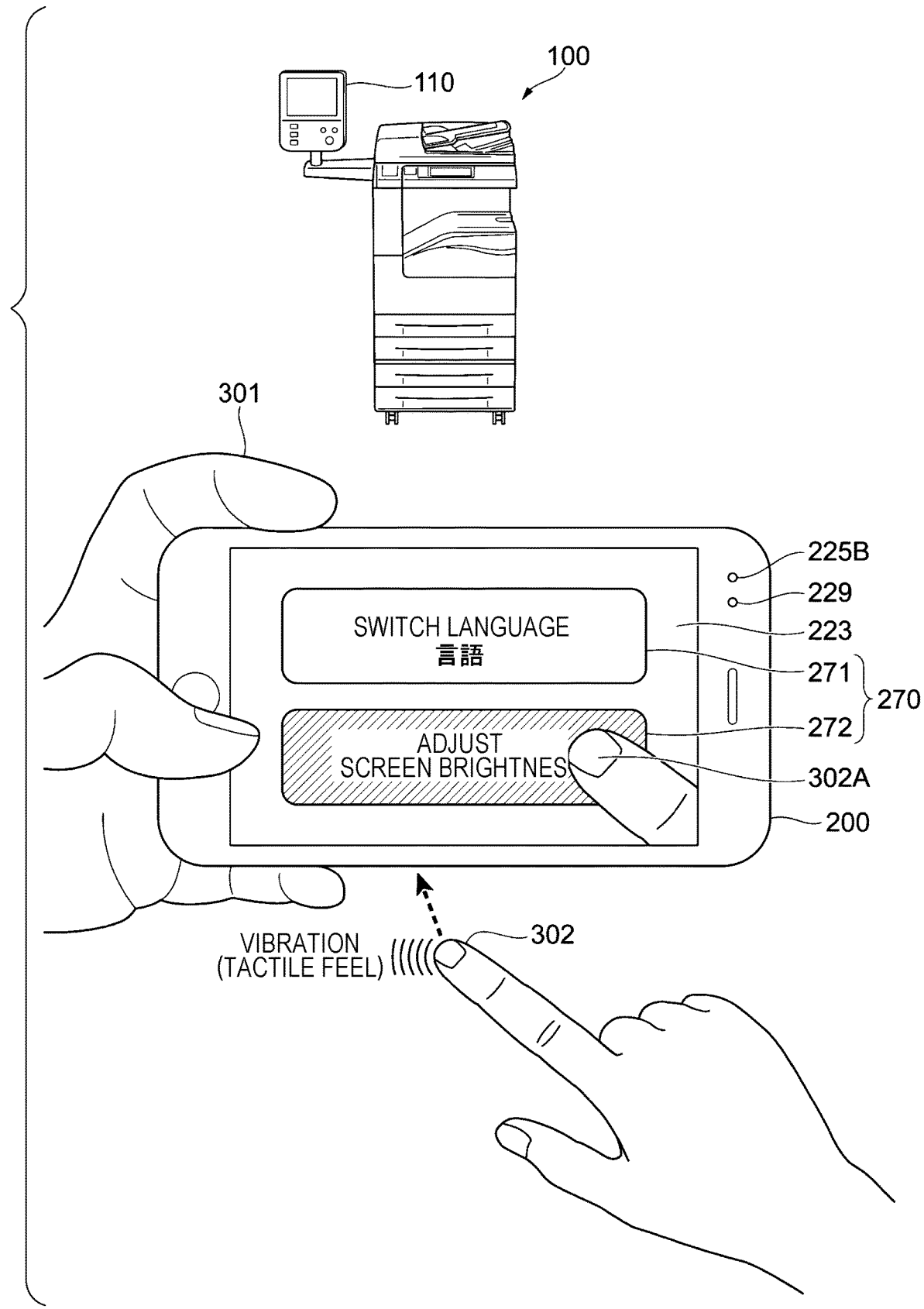
FIG. 8 illustrates an example in which the image forming apparatus is operated by moving an index finger forward in the air without touching the liquid crystal display which displays an image of the image forming apparatus as the operation target.

FIG. 8 illustrates an example in which the image forming apparatus 100 is operated by moving the index finger forward in the air without touching the liquid crystal display 223 which displays an image of the image forming apparatus 100 as the operation target.

Portions in FIG. 8 corresponding to those in FIG. 7 are denoted by the corresponding reference numerals.

The pushing operation here refers to motion in the direction in which the right hand 302 is moved toward the display surface of the smartphone 200.

Specifically, the pushing operation corresponds to motion to push an operation element displayed on the user interface section 110 in the actual space.

The index finger image 302A is superposed on the button 272 for screen brightness adjustment on the liquid crystal display 223 illustrated in FIG. 8, and thus the smartphone 200 detects the pushing operation as an operation to push the button 272 for screen brightness adjustment.

In the case of the present exemplary embodiment, the smartphone 200 stores the relationship between the operation elements and motion in the memory 221 (see FIG. 4). The memory 221 may store the relationship between some of the operation elements provided to the image forming apparatus 100 and motion.

The relationship between images of the operation elements provided to the image forming apparatus 100 and motion recognized as operations may be stored in the image forming apparatus 100, and a process of specifying an operation element as the operation target may be executed by the image forming apparatus 100.

In FIG. 8, the smartphone 200 is able to communicate with the image forming apparatus 100, and thus transmits a signal that instructs an operation of the button 272 for screen brightness adjustment to the image forming apparatus 100.

The smartphone 200 according to the present exemplary embodiment is prepared for a function of notifying the user of reception of an operation.

Therefore, in FIG. 8, the user is notified of reception of an operation by varying the manner of display of the button 272 for screen brightness adjustment.

Examples of the method of varying the manner of display include increasing the brightness of a region in which the button as the operation target is displayed, flashing the region, and varying the region to a different color.

In the case of FIG. 8, additionally, vibration is applied to the side of the ball (palm) of the index finger of the right hand 302 by ultrasonic waves generated from the aerial tactile feel module 229. The vibration gives the user a tactile feel that an operation on the button has been received.

The function of notifying the user of reception of an operation is not necessary.

<Operation Example 2>

Figure 9:
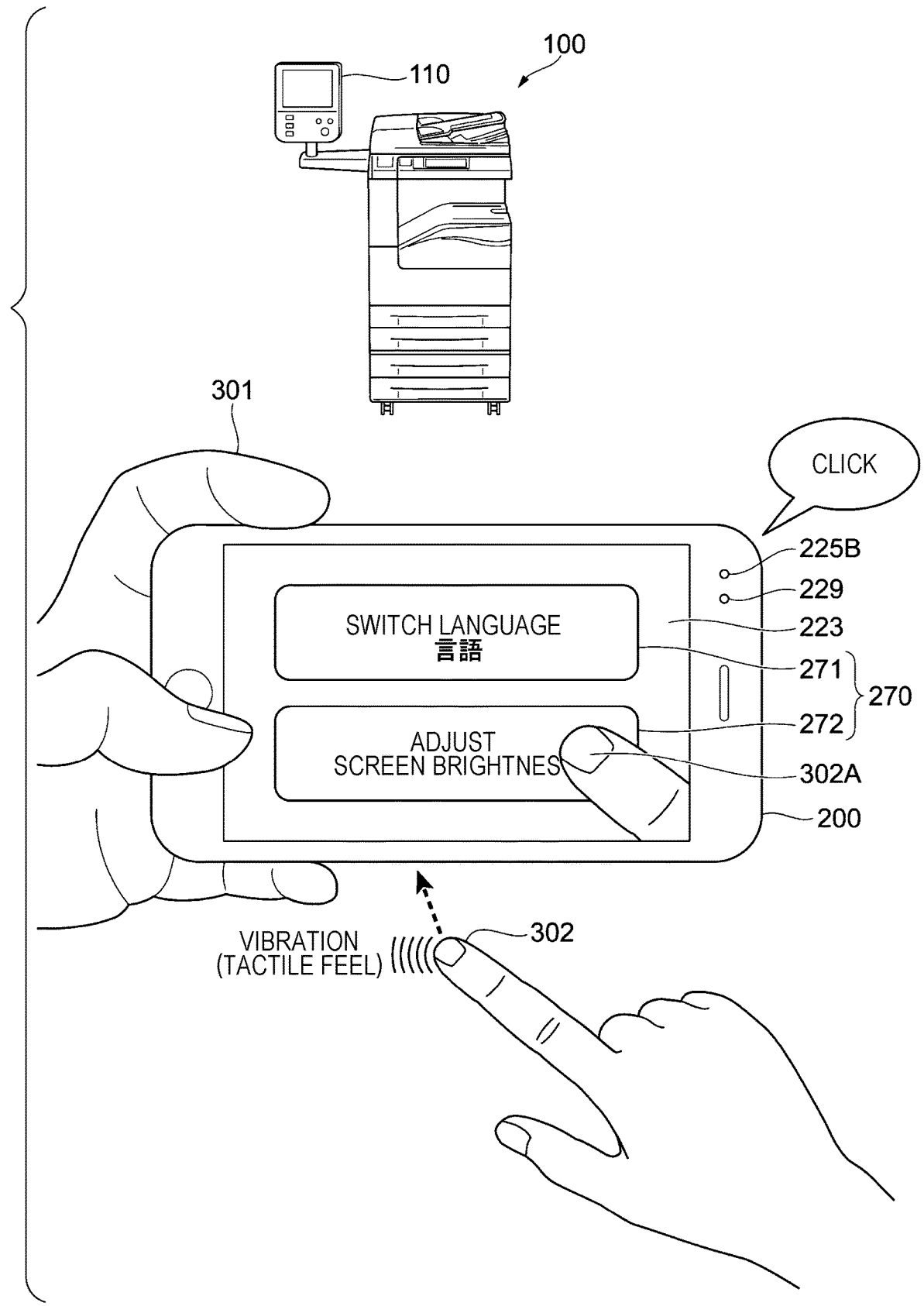
FIG. 9 illustrates a different method of notifying the user of reception of an operation.

FIG. 9 illustrates a different method of notifying the user of reception of an operation.

Portions in FIG. 9 corresponding to those in FIG. 8 are denoted by the corresponding reference numerals.

In the case of FIG. 9, a "click" sound is output from a speaker (not illustrated) although display of the button 272 for screen brightness adjustment is not varied.

Generation of this sound enables the user to confirm that his/her own motion has been received as an operation.

A speech such as "Operation has been received" may be generated in the notification method which uses a sound.

Also in this case, vibration is applied to the index finger by ultrasonic waves generated from the aerial tactile feel module 229.

<Operation Example 3>

Figure 10:
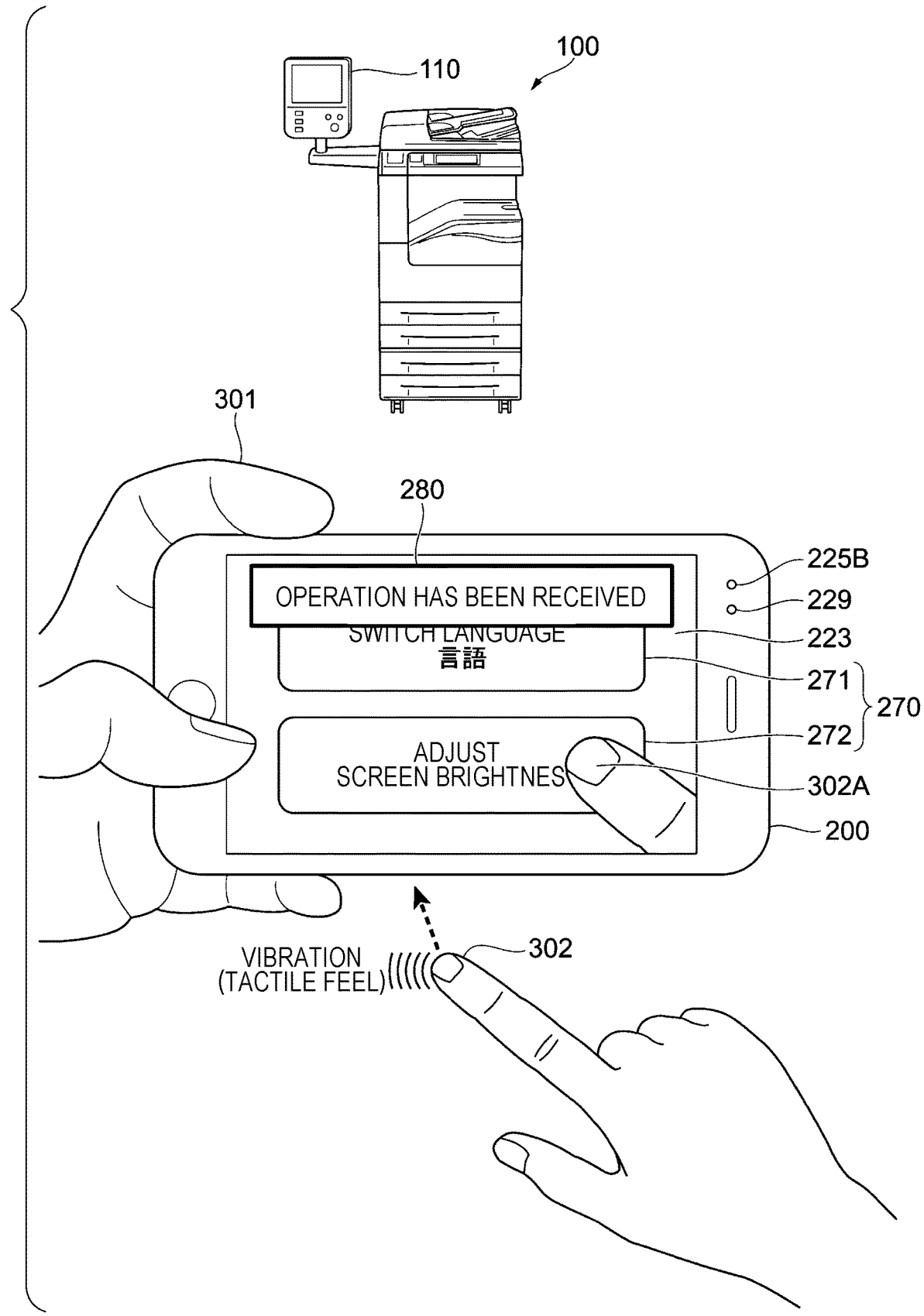
FIG. 10 illustrates a different method of notifying the user of reception of an operation.

FIG. 10 illustrates a different method of notifying the user of reception of an operation.

Portions in FIG. 10 corresponding to those in FIG. 8 are denoted by the corresponding reference numerals.

In the case of FIG. 10, a small screen 280 that indicates reception of an operation is additionally displayed although display of the button 272 for screen brightness adjustment is not varied.

A character string "Operation has been received" is written in the screen 280 illustrated in FIG. 10. As a matter of course, this character string is exemplary.

Also in this case, vibration is applied to the index finger by ultrasonic waves generated from the aerial tactile feel module 229.

<Operation Example 4>

Figure 11:
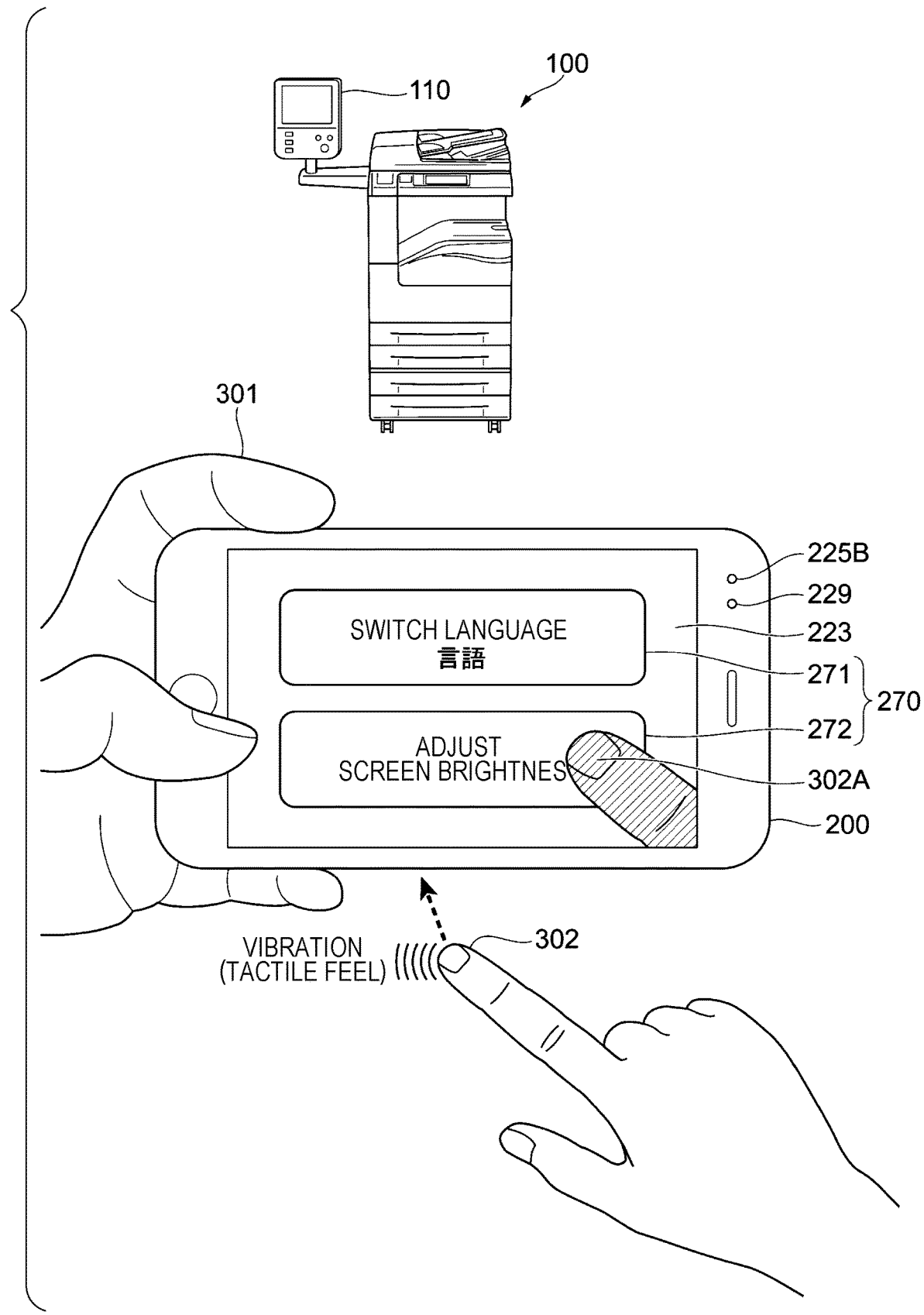
FIG. 11 illustrates a different method of notifying the user of reception of an operation.

FIG. 11 illustrates a different method of notifying the user of reception of an operation.

Portions in FIG. 11 corresponding to those in FIG. 8 are denoted by the corresponding reference numerals.

In the case of FIG. 11, the manner of display of the index finger image 302A has been varied from the manner before reception of an operation although display of the button 272 for screen brightness adjustment is not varied.

Examples of the method of varying the manner of display include increasing the brightness of a region in which the index finger image 302A is displayed, flashing the region, and varying the region to a different color.

Also in this case, vibration is applied to the index finger by ultrasonic waves generated from the aerial tactile feel module 229.

<Operation Example 5>

Figure 12:
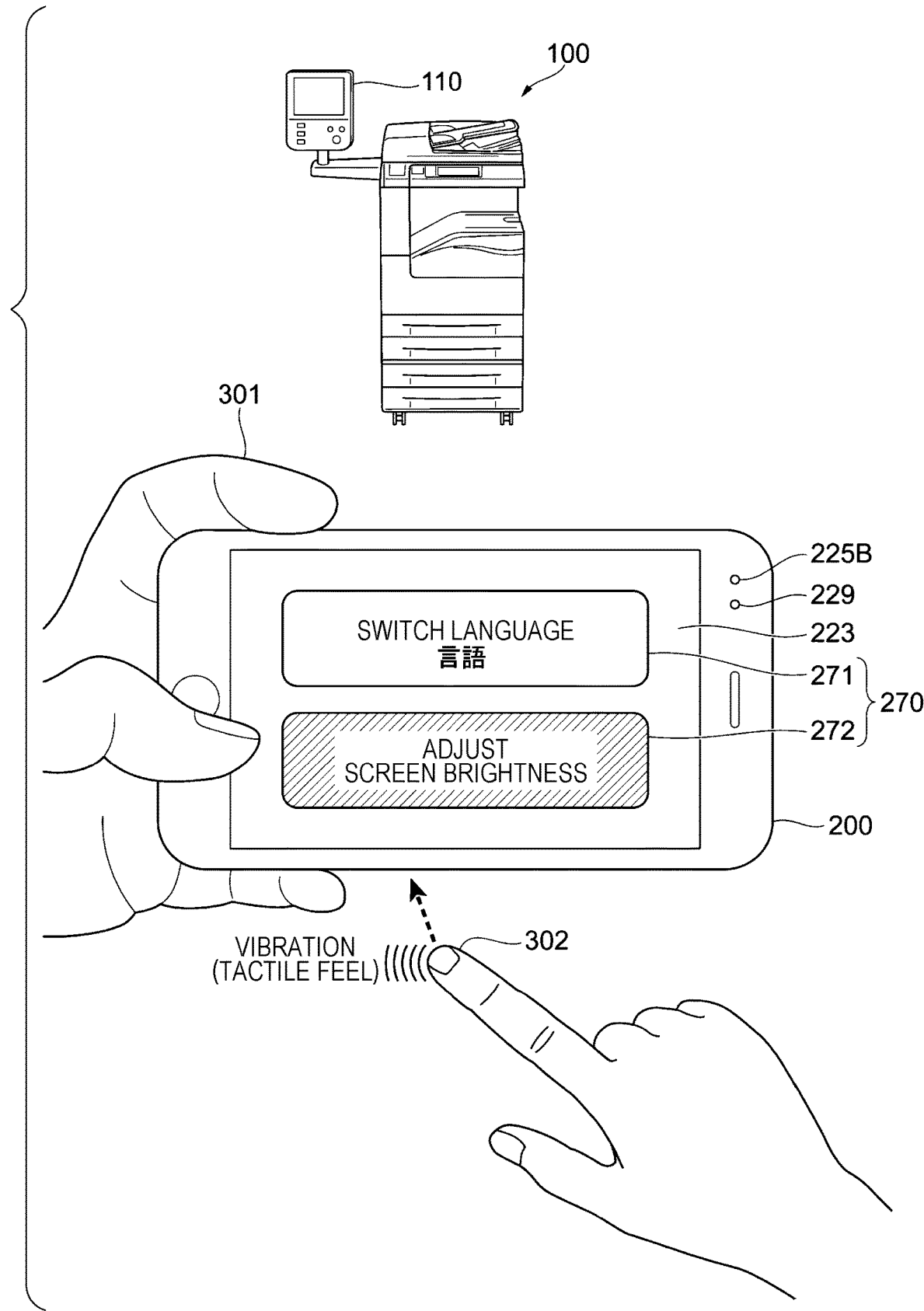
FIG. 12 illustrates a method in which an index finger image is not displayed on the liquid crystal display.

FIG. 12 illustrates a method in which the index finger image 302A is not displayed on the liquid crystal display 223.

Portions in FIG. 12 corresponding to those in FIG. 8 are denoted by the corresponding reference numerals.

In the method in which a part of a human body that has entered the range of an image captured by the camera 225B which is provided on the same surface as the liquid crystal display 223 is always displayed, for example, a large portion of an operation element may be hidden by the part of the human body. For example, characters written on the operation element may be hidden by an image of a hand or an arm.

In such a case, the user may not be able to confirm the operation element as the operation target on the screen, or may be able to confirm only a part thereof, which may hinder an operation.

If characters written on an operation element may not be confirmed, the user may not be able to see what operation element he/she is operating, and may perform an erroneous operation.

Thus, in FIG. 12, the index finger image 302A has been erased from the screen through image processing. In this case, it is possible for the user to confirm what operation element he/she is operating as the operation target on the screen during the operation.

It should be noted, however, that the user is unable to know what position on the screen his/her index finger is pointing to without display of the index finger image 302A. Thus, the manner of display of an operation element (in FIG. 12, the button 272 for screen brightness adjustment) at which the fingertip is positioned is varied not to cause an erroneous operation. In the case where an operation by the user is received, the manner of display of an operation element that has been operated may be varied from that before the operation is received.

<Operation Example 6>

Figure 13:
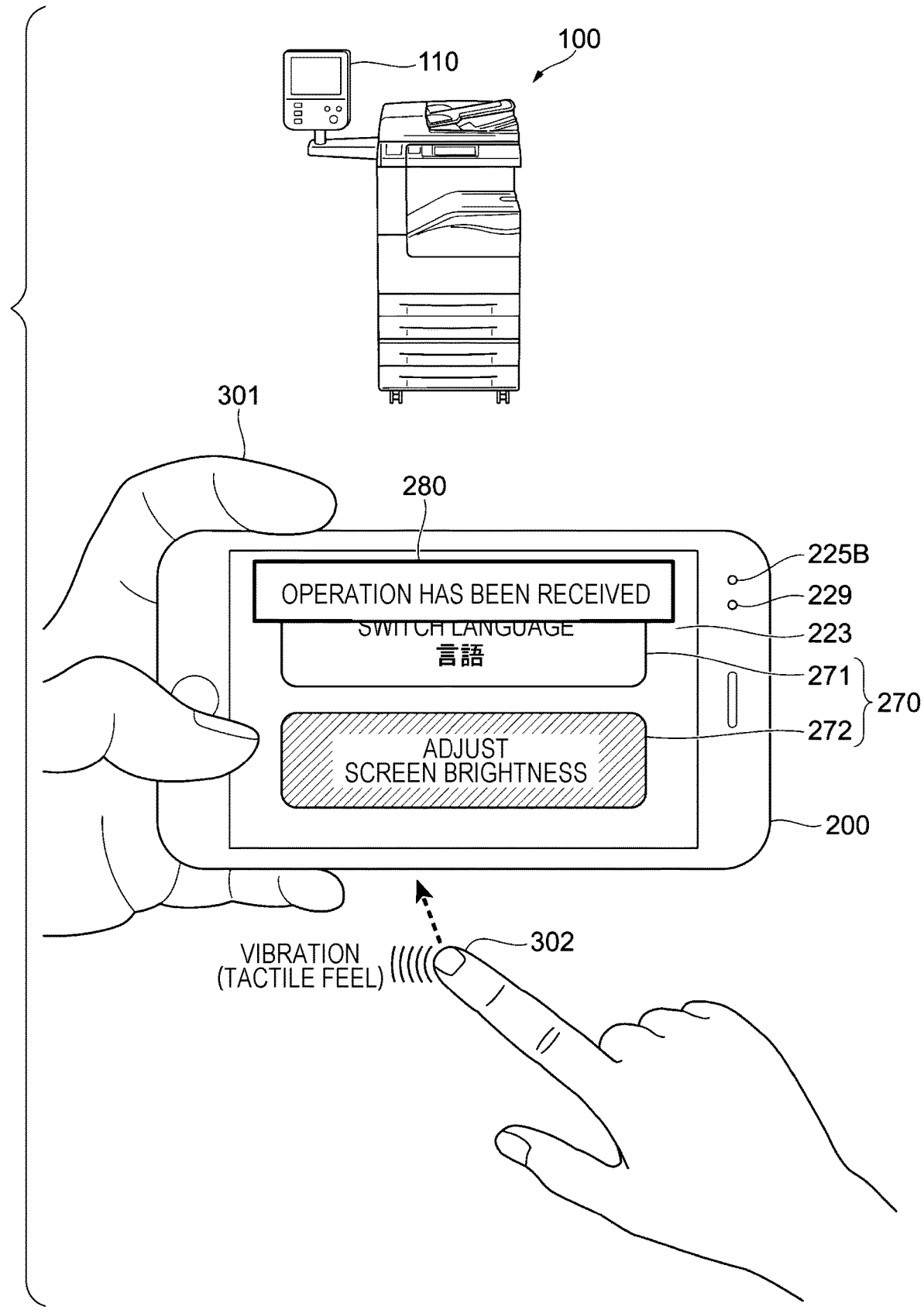
FIG. 13 illustrates a different method in which an index finger image is not displayed on the liquid crystal display.

FIG. 13 illustrates a different method in which the index finger image 302A is not displayed on the liquid crystal display 223.

Portions in FIG. 13 corresponding to those in FIG. 12 are denoted by the corresponding reference numerals.

Also in the case of FIG. 13, the manner of display of an operation element (the button 272 for screen brightness adjustment) at which the index finger detected by the smartphone 200 is positioned is varied to assist confirmation by the user.

In FIG. 13, in addition, the screen 280 with a character string indicating that an operation has been received is also displayed.

<Operation Example 7>

Figure 14:
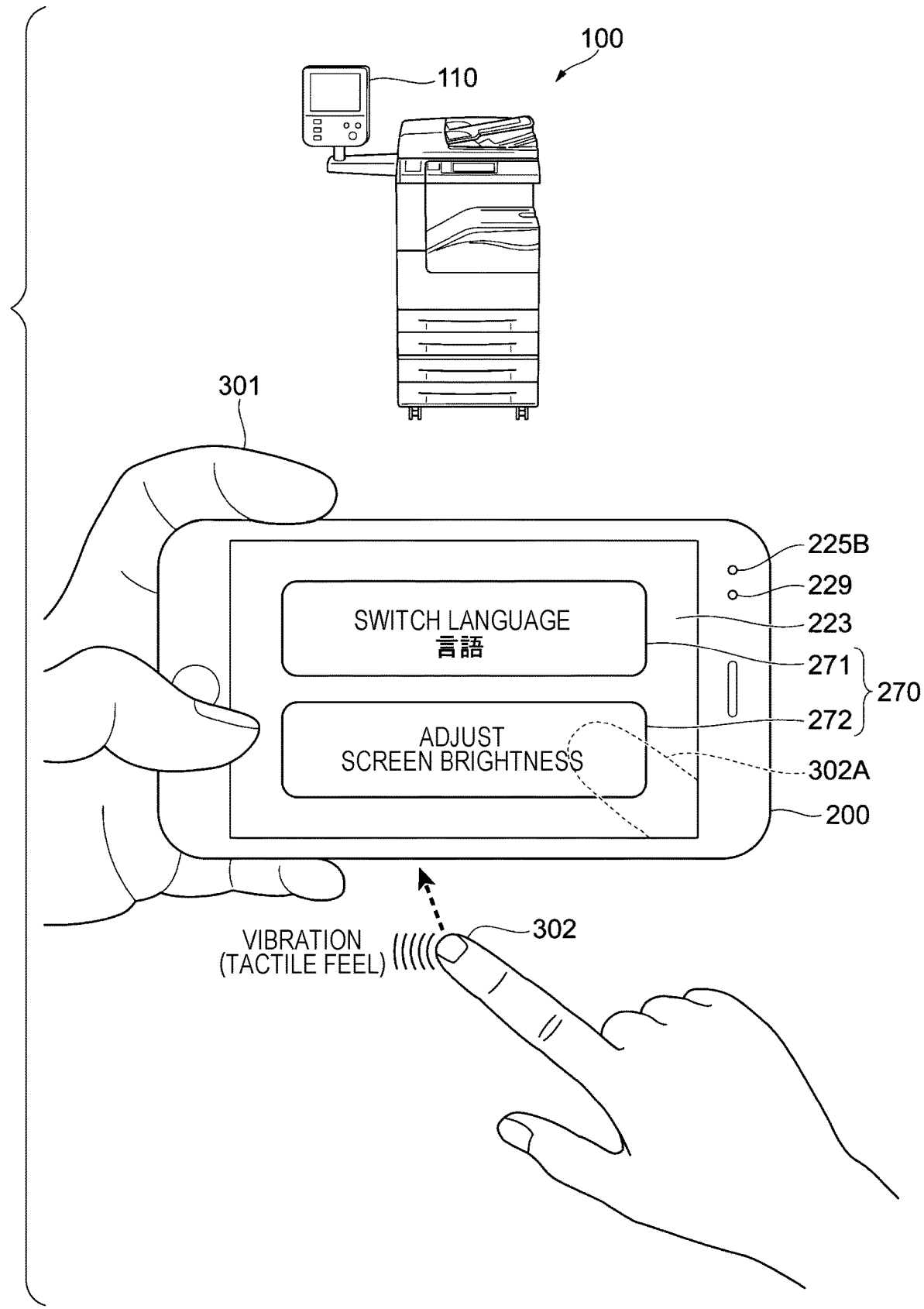
FIG. 14 illustrates an example of a method of suggesting the position of the index finger detected by the smartphone.

FIG. 14 illustrates an example of a method of suggesting the position of the index finger detected by the smartphone 200.

Portions in FIG. 14 corresponding to those in FIG. 13 are denoted by the corresponding reference numerals.

While the index finger image 302A is not displayed at all in Operation Example 6, it is also conceivable that there is a request to confirm a position on the screen.

FIG. 14 illustrates a display method provided in consideration of such a request, and illustrates the contour line of a region in which the index finger image 302A is positioned. The contour line enables the user to easily confirm the relationship between the position of the index finger detected by the smartphone 200 and the position of the operation element. The contour line here is an example of an indication that suggests a portion of the body of the user.

In FIG. 14, the contour line of the index finger image 302A is indicated by the broken line. However, a transparent image obtained through image processing may be displayed in place of an actual image. The transparent image here is also an example of an indication that suggests a portion of the body of the user.

Only a fingertip portion may be selectively displayed by a contour line or as a transparent image while other portions are displayed as an actual image. On the contrary, only a fingertip portion may be selectively displayed as an actual image.

<Operation Example 8>

Figure 15:
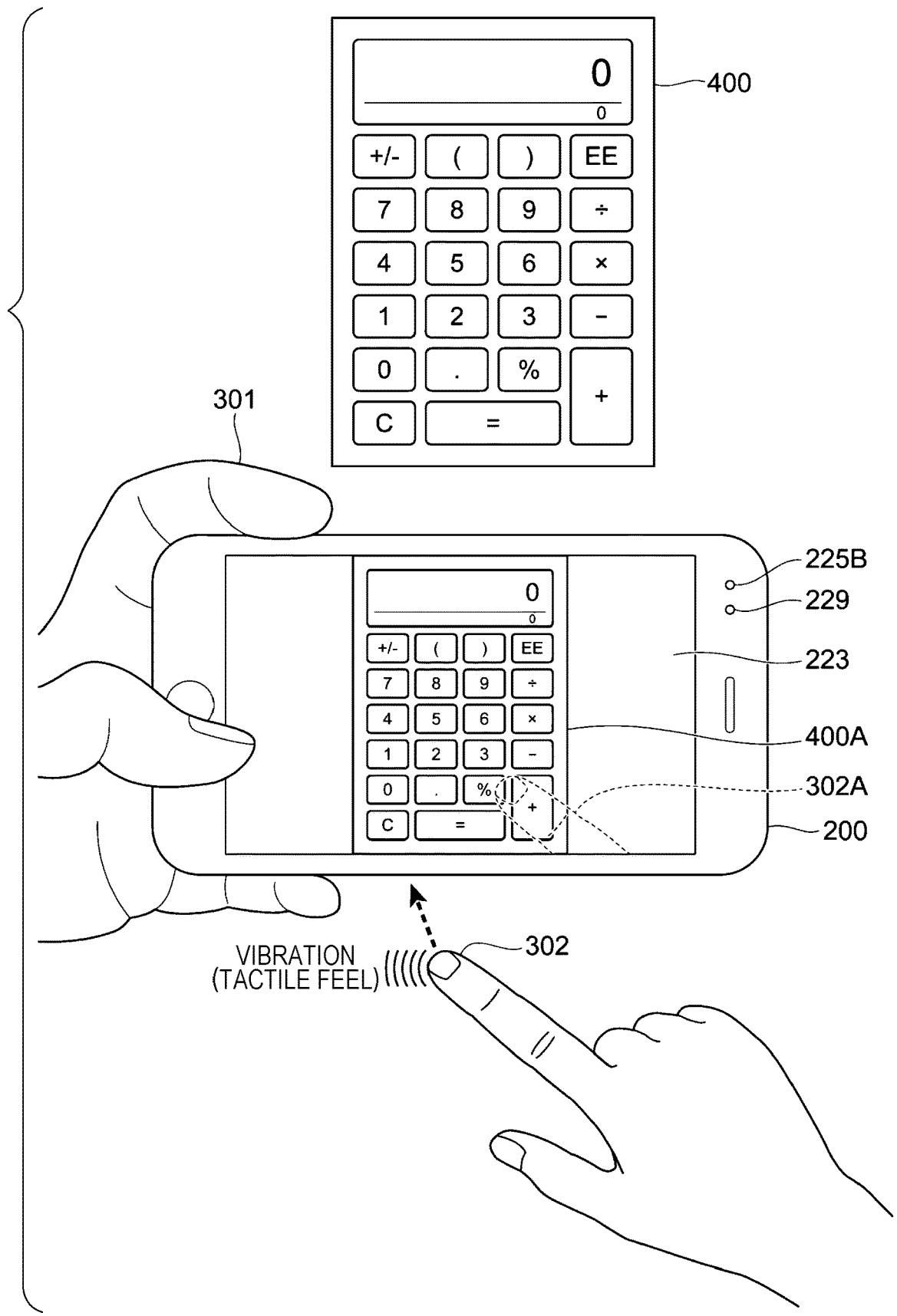
FIG. 15 illustrates a case where the operation target is a calculator that has a communication function.

FIG. 15 illustrates a case where the operation target is a calculator 400 that has a communication function.

In the case of this example, the user may operate the calculator 400 to confirm the computation result without soiling the calculator 400 even if the fingertip of the right hand is soiled.

In the case of FIG. 15, the user's index finger image 302A is displayed as a transparent image as superposed on a calculator image 400A. Unlike a contour line, a transparent image is displayed such that an actual image is seeable therethrough.

In the case where operation elements are small in dimensions such as those of the calculator 400, however, there remains a possibility of a push error.

Thus, the size of a part of the body displayed on the liquid crystal display 223 may be selectable. For example, the size of such a part of the body may be increased or reduced compared to the actual image. The size of such a part of the body may be adjustable stepwise.

<Operation Example 9>

Figure 16:
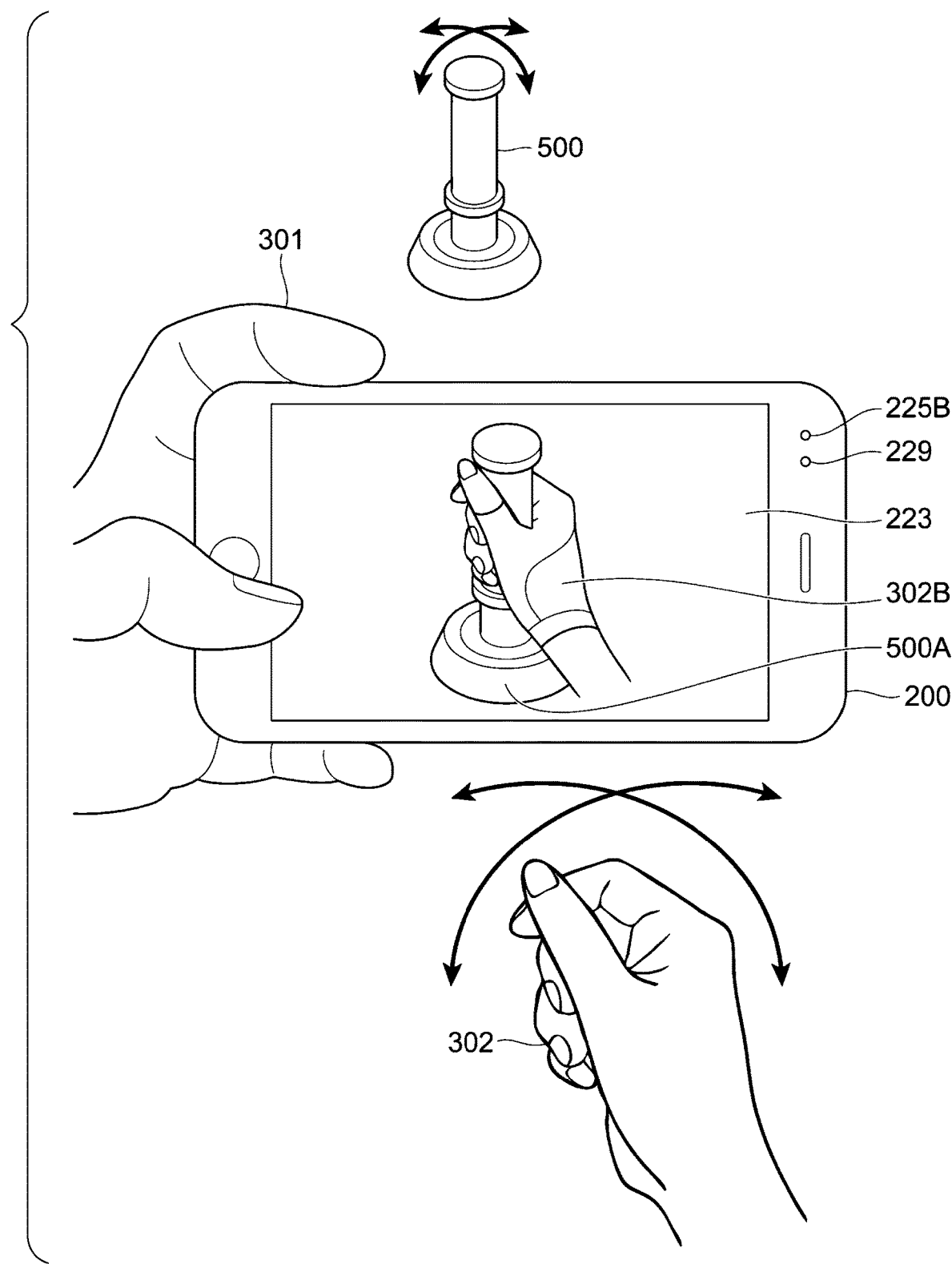
FIG. 16 illustrates a case where the operation target is a lever.

FIG. 16 illustrates a case where the operation target is a lever 500.

Examples of the lever 500 according to the present exemplary embodiment include a control column, a joystick, a shift lever, a blinker lever, a brake lever, and a vehicle controller.

In the case of FIG. 16, the operation target is the lever 500, and thus the user sticks out the right hand 302 in the air as if grasping something. In the case of this example, when the right hand 302 is moved back and forth and right and left, the lever 500 makes the same motion in accordance with an instruction from the smartphone 200 which detects the motion of the right hand 302.

The liquid crystal display 223 displays a right hand image 302B grasping a lever image 500A. The right hand image 302B may be displayed simply as superposed on the lever image 500A.

It is not necessary to move the lever 500 in conjunction with the right hand 302, and it is only necessary that the target to be controlled by the lever 500 should be controlled in accordance with the motion of the right hand 302.

This is because the lever 500 is an input apparatus, not the final control target. Thus, communication between the lever 500 and the smartphone 200 is not necessary. It is only necessary that the smartphone 200 should be able to communicate with a device to be controlled in accordance with an operation of the lever 500, even if the smartphone 200 is not able to communicate with the lever 500.

The smartphone 200 according to this operation example is prepared for a function of decorating a part of the body of the user displayed on the liquid crystal display 223 in accordance with the attribute of the user or the environment of use.

For example, while an image for display or an icon corresponding to a part of the body captured in an image by the camera 225B (see FIG. 4) is displayed in the case of Operation Example 1 (see FIG. 7), the right hand image 302B wearing a thin glove is displayed in the example in FIG. 16. The glove is an example of equipment.

The type of decoration to be used may be selected by the user beforehand, or stored in the memory 221 (see FIG. 4) of the smartphone 200. Alternatively, a notification of the type of decoration to be used may be provided from the lever 500 (or a device that includes the lever 500), an external server, or the like.

Image data to be used for decoration may be stored in the memory 221 of the smartphone 200, or may be given from a device that includes the lever 500, an external server, or the like.

The shape and the size of the right hand image 302B displayed on the liquid crystal display 223 differs in accordance with the manner of image capture. Thus, the smartphone 200 also has a function of deforming an image for decoration in accordance with the shape or the size of the right hand image 302B.

In the case of the present exemplary embodiment, this function is implemented through execution of an application program by the smartphone 200. Image processing may be executed using a different computer such as a server provided externally to the smartphone 200 so that the result of the processing is reflected in the display on the liquid crystal display 223.

Figure 17:
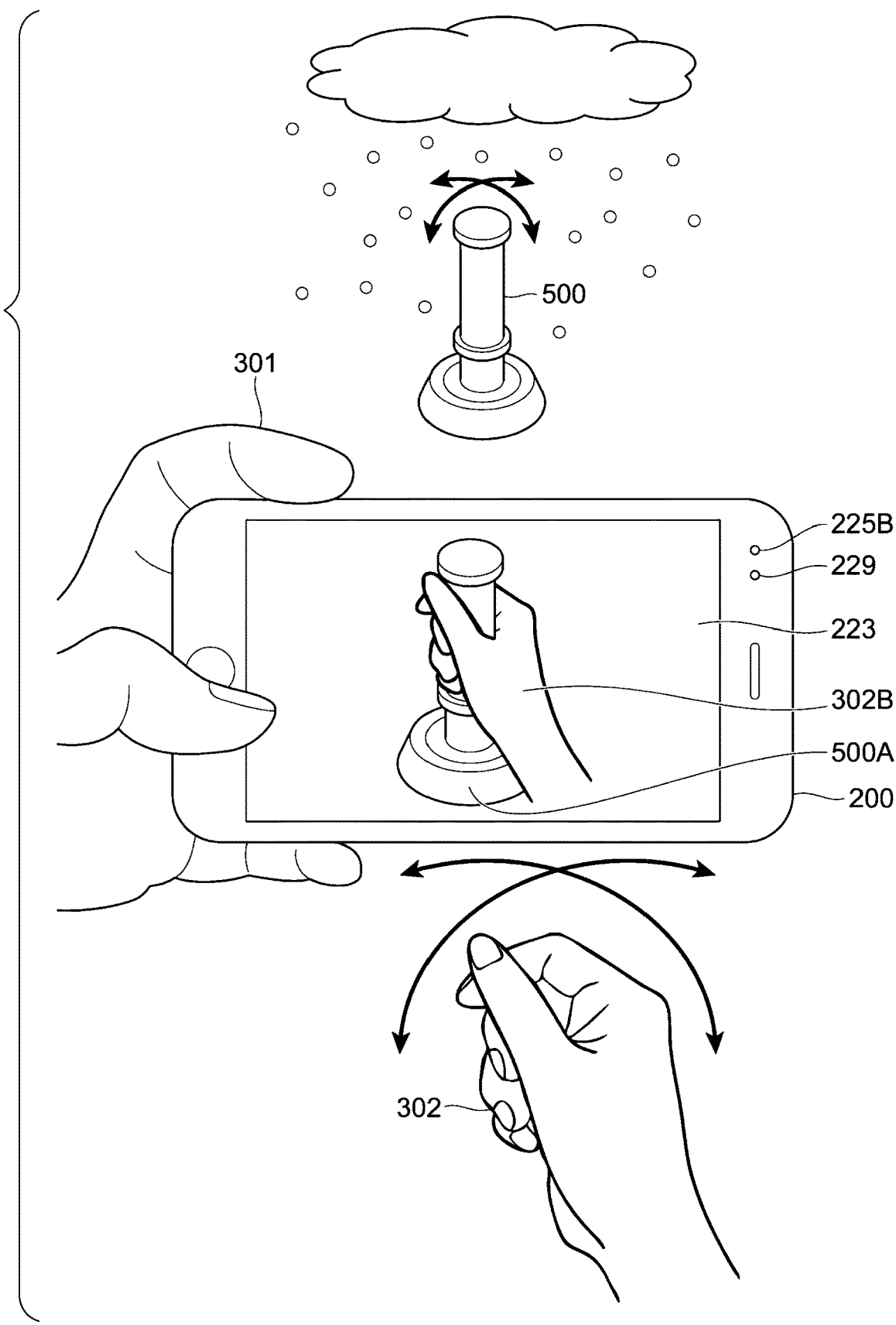
FIG. 17 illustrates a different example of the case where the operation target is a lever.

FIG. 17 illustrates a different example of the case where the operation target is the lever 500.

Portions in FIG. 17 corresponding to those in FIG. 16 are denoted by the corresponding reference numerals.

FIG. 17 assumes a case where the lever 500 is operated outdoors in winter. Therefore, in the case of FIG. 17, a thick glove is added as a decoration to the right hand image 302B.

<Operation Example 10>

Figure 18:
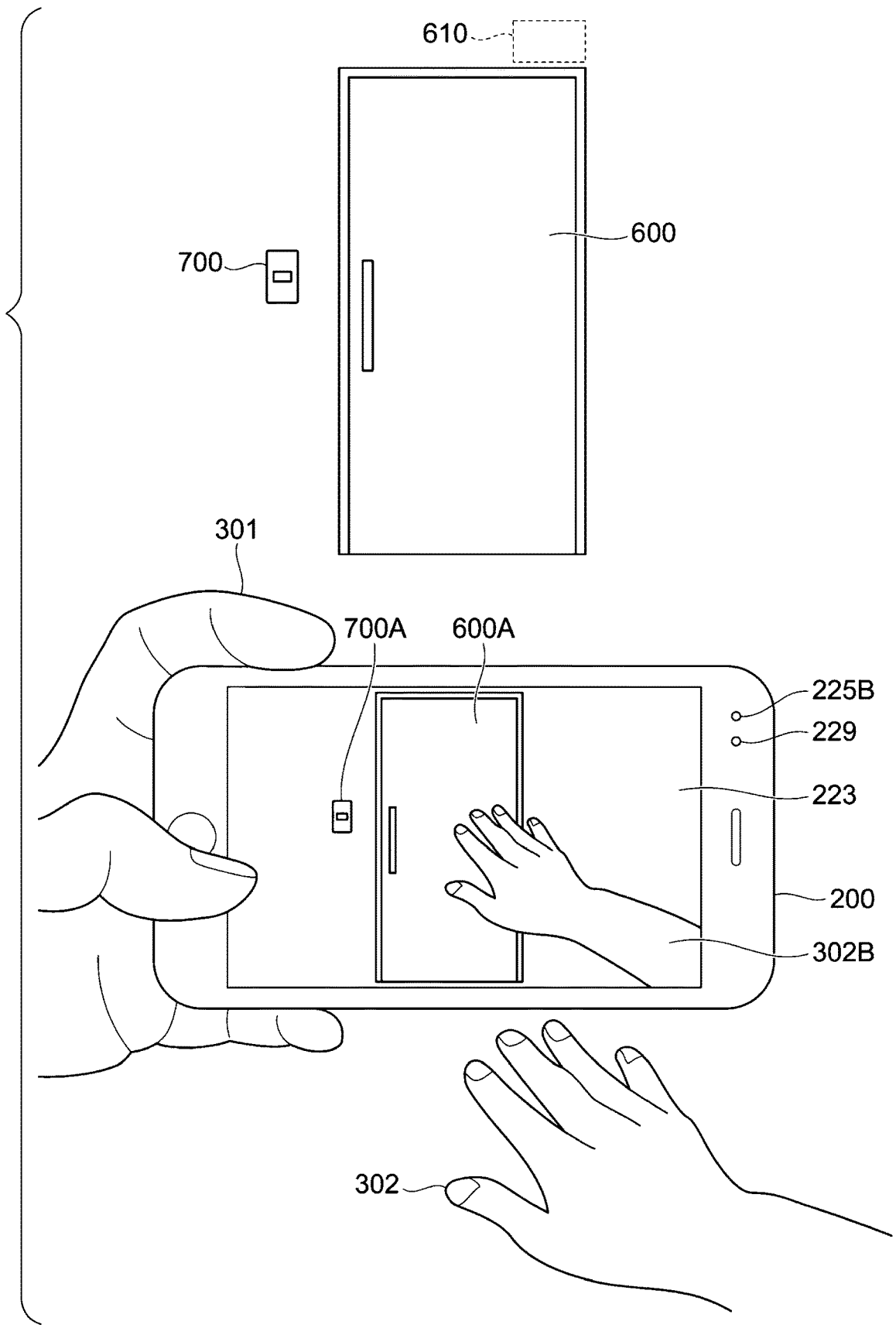
FIG. 18 illustrates a case where the operation target is a single-swing door that opens and closes about a hinged portion.

FIG. 18 illustrates a case where the operation target is a single-swing door 600 that opens and closes about a hinged portion.

The single-swing door 600 includes an opening/closing mechanism 610 that electrically opens and closes the single-swing door 600. The opening/closing mechanism 610 is attached to a wall surface provided with a doorway. In addition, the opening/closing mechanism 610 here is capable of directly or indirectly communicating with the smartphone 200 through a wireless LAN or the like.

A switch 700 that is used to turn on and off a lighting fixture (not illustrated) is attached to the wall surface near the doorway.

Therefore, a single-swing door image 600A and a switch image 700A are displayed on the liquid crystal display 223 of the smartphone 200.

In the case of FIG. 18, the right hand 302 of the user is positioned in the space between the liquid crystal display 223 and the user, and is not in contact with the display surface of the liquid crystal display 223.

As a matter of course, the right hand 302 of the user is not in contact with the single-swing door 600.

The single-swing door 600 illustrated in FIG. 18 opens toward the farther side when pushed, and closes when pulled toward the closer side.

Figure 19:
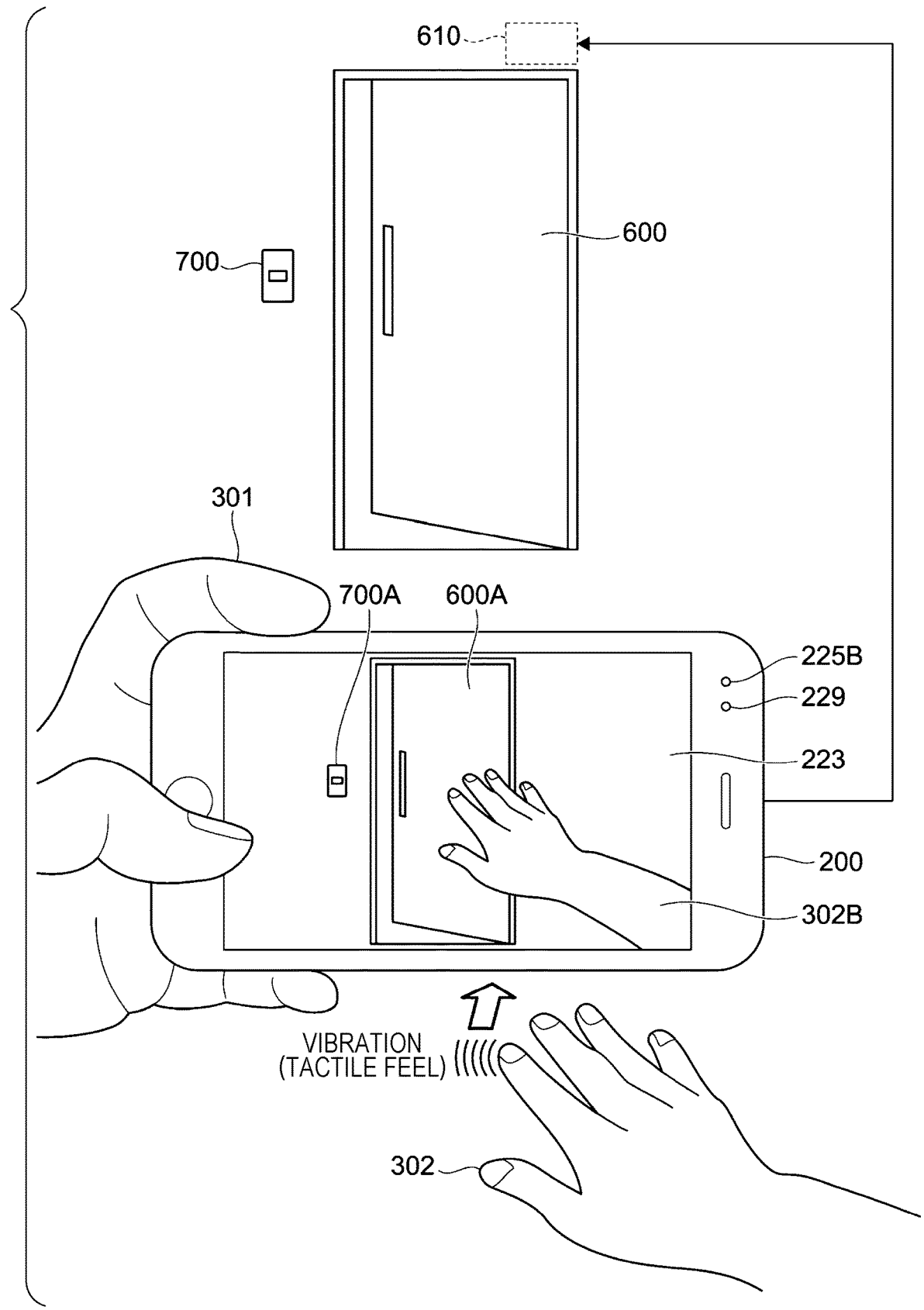
FIG. 19 illustrates a state in which the single-swing door is slightly opened by capturing an image in which the user makes motion to push out his/her right hand in the air using the smartphone.

FIG. 19 illustrates a state in which the single-swing door 600 is slightly opened by capturing an image in which the user makes motion to push out his/her right hand 302 in the air using the smartphone 200.

In FIG. 19, the direction of motion of the right hand 302 is indicated by an arrow. This motion of the right hand 302 is detected by the smartphone 200 as an operation to open the single-swing door 600. The smartphone 200 transmits a signal that instructs execution of the detected operation to the opening/closing mechanism 610.

In this event, the smartphone 200 may transmit the speed of motion of the right hand 302 detected on an image to the opening/closing mechanism 610. In this case, the opening/closing mechanism 610 is able to reflect the given speed in the speed at which the opening/closing mechanism 610 opens the single-swing door 600.

Figure 20:
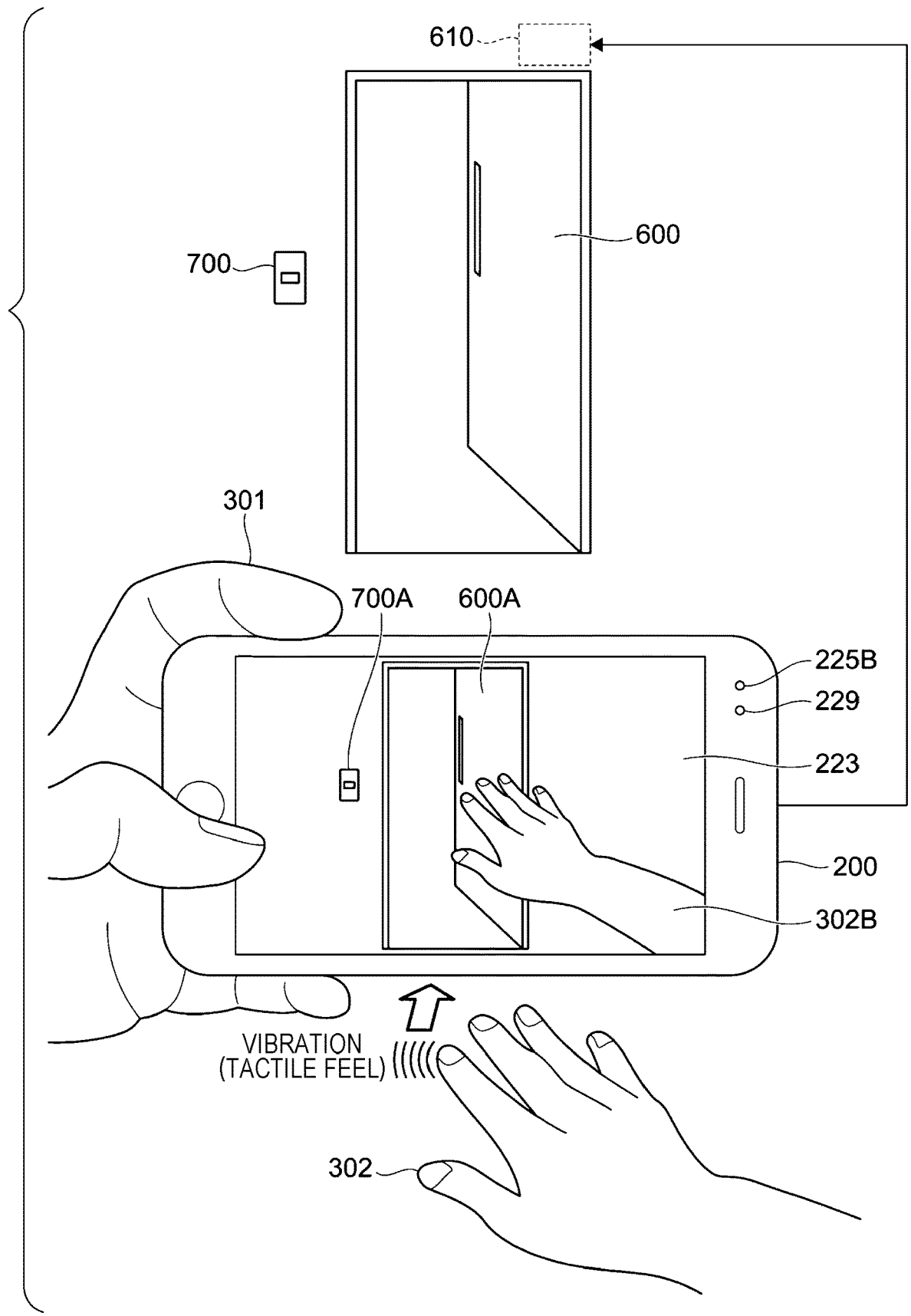
FIG. 20 illustrates a state in which the single-swing door is greatly opened by capturing an image in which the user makes motion to push out his/her right hand in the air using the smartphone.

FIG. 20 illustrates a state in which the single-swing door 600 is greatly opened by capturing an image in which the user makes motion to push out his/her right hand 302 in the air using the smartphone 200.

In FIG. 20, motion of the right hand 302 is continued, and drive by the opening/closing mechanism 610 is also continued.

Control may be performed such that, after operation to open the single-swing door 600 is detected, drive of the single-swing door 600 is continued even if motion of the right hand 302 is stopped. This is because the range in which the right hand 302 is movable during image capture by the smartphone 200 is narrower than the range in which the single-swing door 600 as the drive target is movable. This control may be implemented as a function of the smartphone 200, or may be implemented as a function of the opening/closing mechanism 610.

In the case where motion to pull the right hand 302 toward the closer side is detected, the smartphone 200 detects the motion as an operation to close the single-swing door 600.

Figure 21:
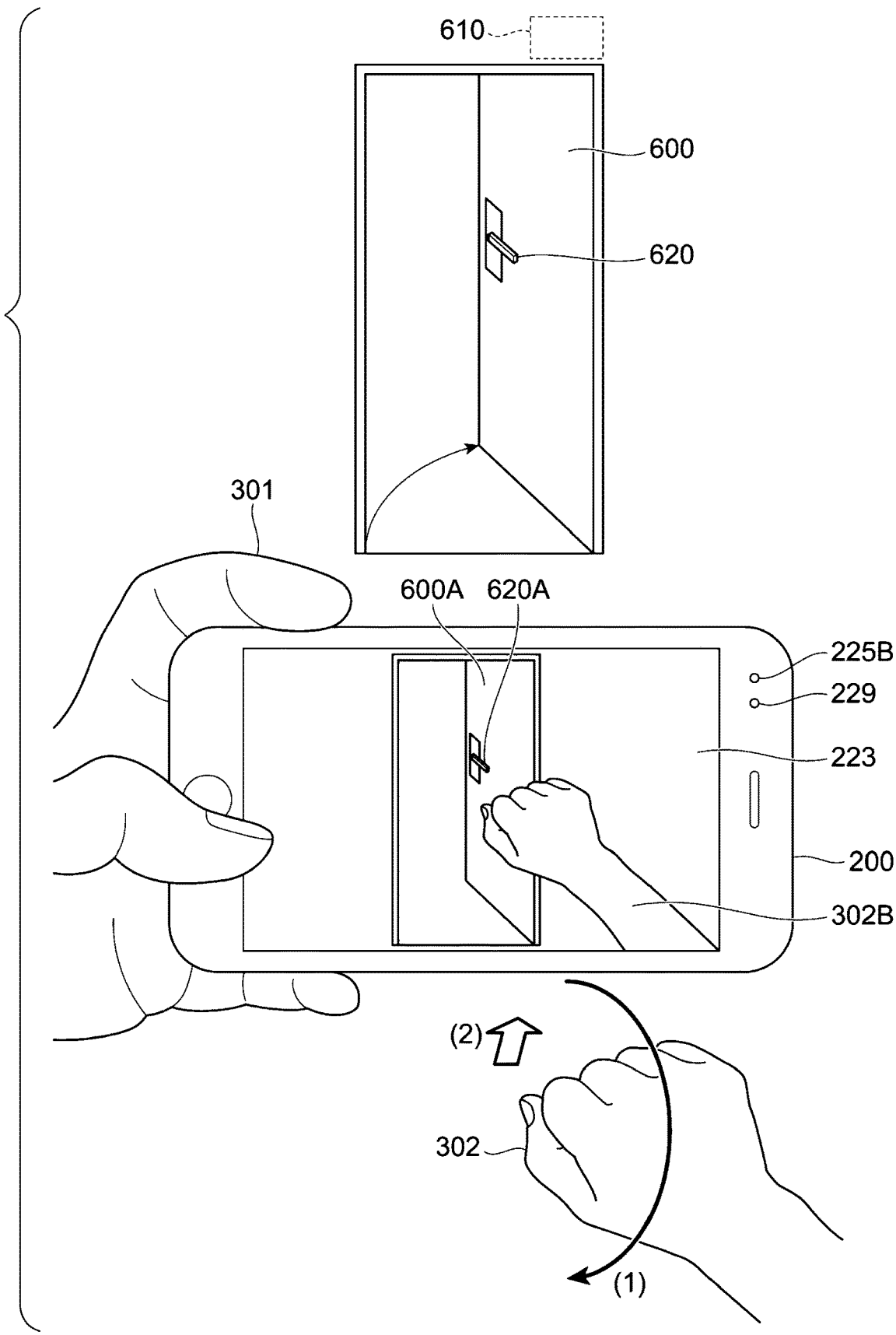
FIG. 21 illustrates a case where the single-swing door is provided with a lever-type handle (lever handle)

FIG. 21 illustrates a case where the single-swing door 600 is provided with a lever-type handle (lever handle) 620.

In order to open such a single-swing door 600, it is necessary to make pushing motion after grasping and rotating the lever-type handle 620.

In FIG. 21, the right hand image 302B is displayed as superposed on the single-swing door image 600A and a handle image 620A.

The smartphone 200 illustrated in FIG. 21 detects an operation to open the single-swing door 600 in the case where such motions in two stages are detected sequentially. Operation after the detection is the same as that described in relation to FIGS. 19 and 20.

In FIGS. 18 to 21, the single-swing door 600 is illustrated as an example. However, the present disclosure is not limited to a swinging door that opens and closes with a door surface drawing an arc, and may also be applied to a sliding door guided by a groove or a rail to open and close linearly, a glide sliding door obtained by combining a swinging door and a sliding door, a folding door, a revolving door, etc.

The door is not limited to a single-swing door, and may be a double-swing door.

<Operation Example 11>

A function of warning the user of reception of an erroneous operation or an unexpected operation will be described.

Figure 22:
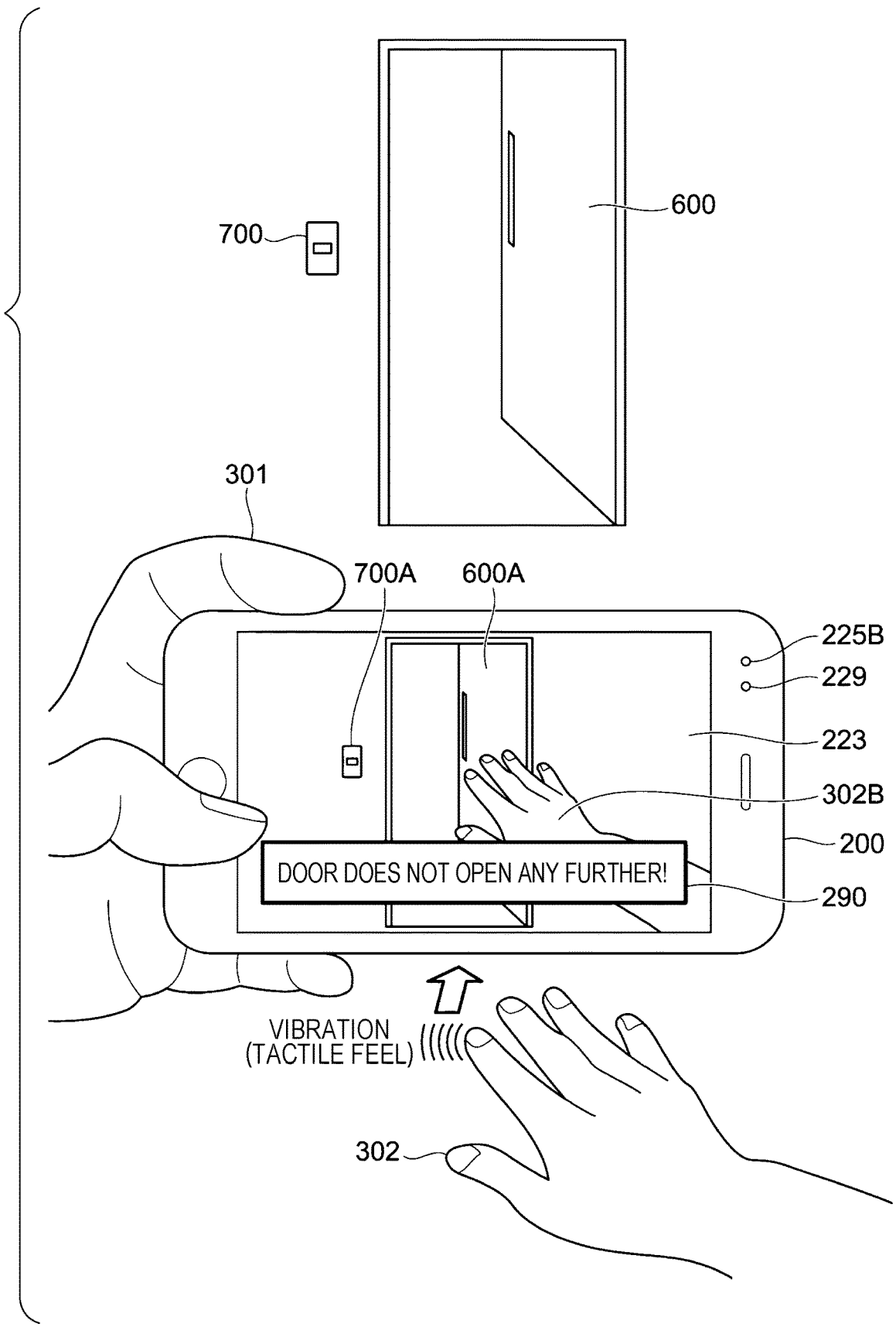
FIG. 22 illustrates an example of a function of notifying the user that a gesture of continuously pushing is detected even after the single-swing door is opened to a maximum allowable angle.

FIG. 22 illustrates an example of a function of notifying the user that a gesture of continuously pushing is detected even after the single-swing door 600 is opened to a maximum allowable angle.

Portions in FIG. 22 corresponding to those in FIG. 19 are denoted by the corresponding reference numerals.

In the case of FIG. 22, a small screen 290 that includes a warning statement "Door does not open any further!" is displayed at the lower portion of the liquid crystal display 223.

The notification may be made by a voice. The notification is not limited to characters and a sound, and an image of the object recognized as the operation target may be changed etc.

While the user is informed of the upper limit of the movable range in this example, the user may be notified of detection of an operation in an immovable direction. In addition, the user may be notified of how to perform a correct operation.

It should be noted, however, that it is not necessary to always notify the user of a correct operation.

Examples of such a case include a case where the operation target is a safe. This is because people other than a specific person are not permitted to unlock a safe. An operator (such as an authorized person or an owner) that is authenticated from the user account or the like of the smartphone 200 sending an instruction for an operation may be notified of how to perform a correct operation.

<Operation Example 12>

Figure 23:
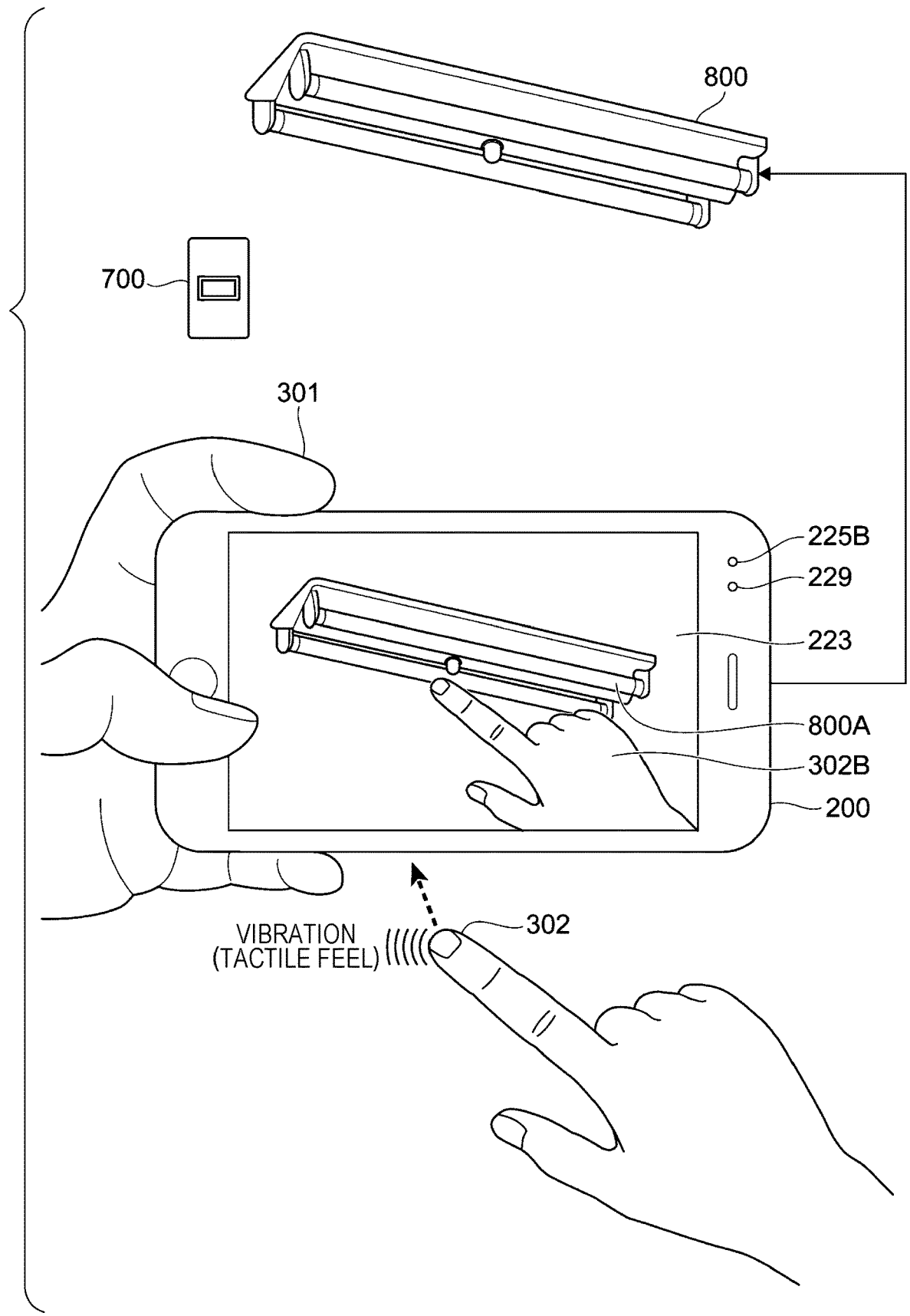
FIG. 23 illustrates a case where an image capture target is a lighting fixture.

FIG. 23 illustrates a case where an image capture target is a lighting fixture 800.

The lighting fixture 800 illustrated in FIG. 23 is electrically connected to the switch 700 of a position holding type through a wire (not illustrated). The lighting fixture 800 is turned on when the switch 700 is operated on. The lighting fixture 800 is turned off when the switch 700 is operated off.

In the case of FIG. 23, the lighting fixture 800 is provided with a function of receiving operation to push out the right hand 302 in the air with the lighting fixture 800 turned off as an operation to turn on, and receiving operation to push out the right hand 302 in the air with the lighting fixture 800 turned on as an operation to turn off.

Thus, when motion to push out the right hand 302 in the air is made with the right hand image 302B superposed on a lighting fixture image 800A displayed on the liquid crystal display 223 of the smartphone 200, a signal that switches the state is output from the smartphone 200 which has detected such motion to the lighting fixture 800.

Specifically, a signal that instructs turn-off is output when the lighting fixture 800 is turned on, and a signal that instructs turn-on is output when the lighting fixture 800 is turned off.

Switching of the state of the lighting fixture 800 is not limited to two stages. For example, when the lighting fixture 800 is turned on, switching may be made among states in which the brightness differs in several stages through motion of the user. In the case where the color of illumination light from the lighting fixture 800 is switchable, the color may be switched through motion of the user.

In the earlier description, motion to push out the right hand 302 in the air is detected as an operation. However, motion with one finger and motion with two fingers may be detected as an operation for turn-on and an operation for turn-off, respectively, and motion to hold up a finger and motion to keep a finger horizontal may be detected as an operation for turn-on and an operation for turn-off, respectively. That is, the number of fingers or the direction of a finger in an image captured by the camera 225B which is provided on the same surface as the liquid crystal display 223 may be associated with a specific operation.

In any way, the state of operation of the lighting fixture 800 may be operated without directly touching the lighting fixture 800.

Figure 24:
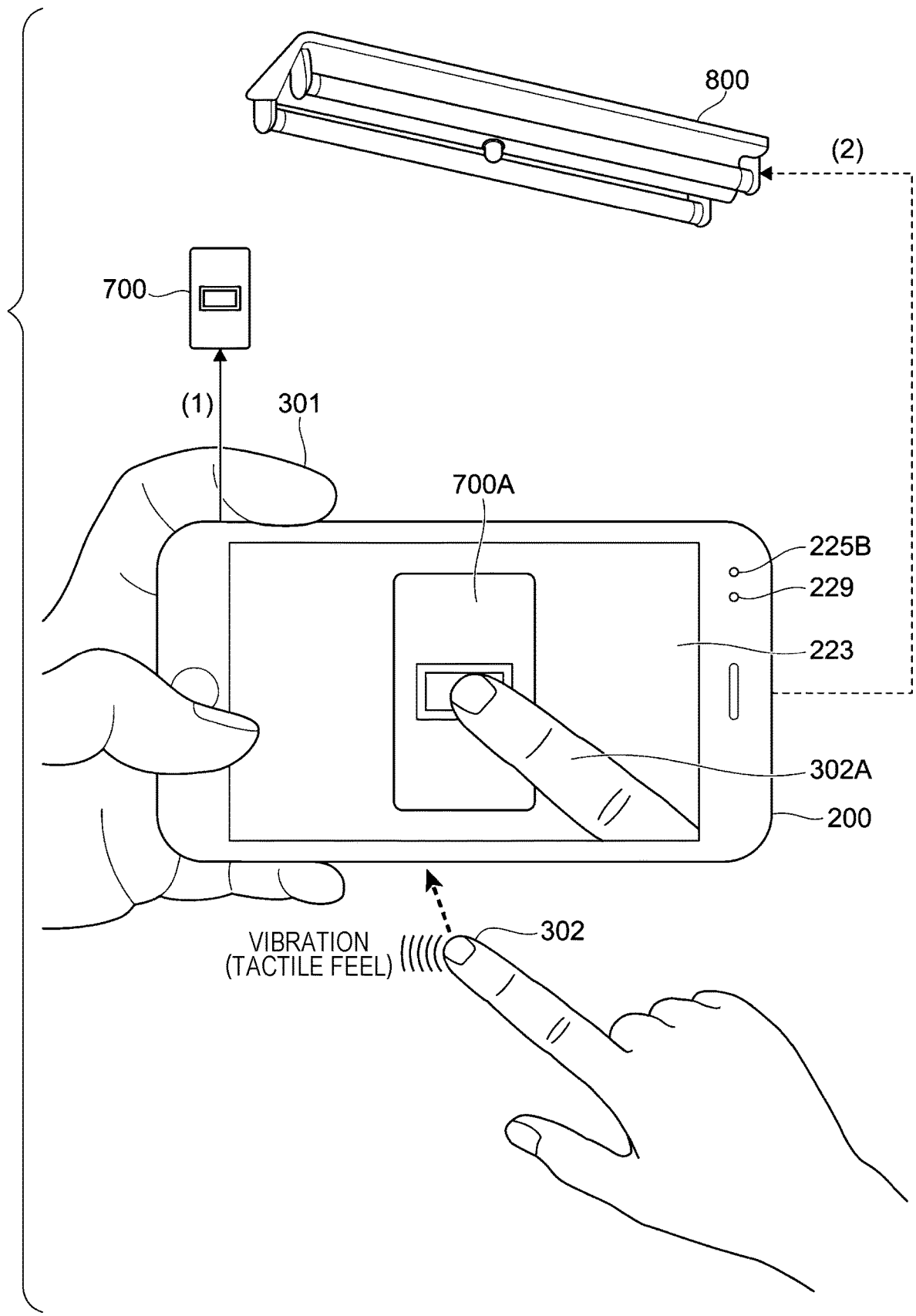
FIG. 24 illustrates a case where the image capture target is a switch that is used to turn on the lighting fixture.

FIG. 24 illustrates a case where the image capture target is the switch 700 that is used to turn on the lighting fixture 800.

Portions in FIG. 24 corresponding to those in FIG. 23 are given the corresponding reference numerals.

As discussed earlier, the lighting fixture 800 is turned on by an operation to turn on the switch 700, and turned off by an operation to turn off the switch 700.

FIG. 24 differs from FIG. 23 in that only the tip of the index finger is selectively displayed as the image 302A while other portions are not displayed.

In the case where the switch 700 has a function of communicating with the smartphone 200, the smartphone 200 outputs a signal that switches on and off the switch 700 when there is an operation to push out the right hand 302 in the air with the index finger image 302A superposed on the switch image 700A.

In some cases, the switch 700 does not have a function of communicating with the smartphone 200. Also in such cases, if the relationship between the switch 700 and the lighting fixture 800 has been given to the smartphone 200, motion to push out the right hand 302 in the air with the index finger image 302A superposed on the switch image 700A may be received as an operation on the lighting fixture 800.

The control target may alternatively be an air-conditioner, an audio device, a home electric appliance, or the like.

<Operation Example 13>

In the operation example discussed earlier, the smartphone 200 captures an image of an object that is present in the real space. However, the image capture target may be an image of an object that actually exists.

Figure 25:
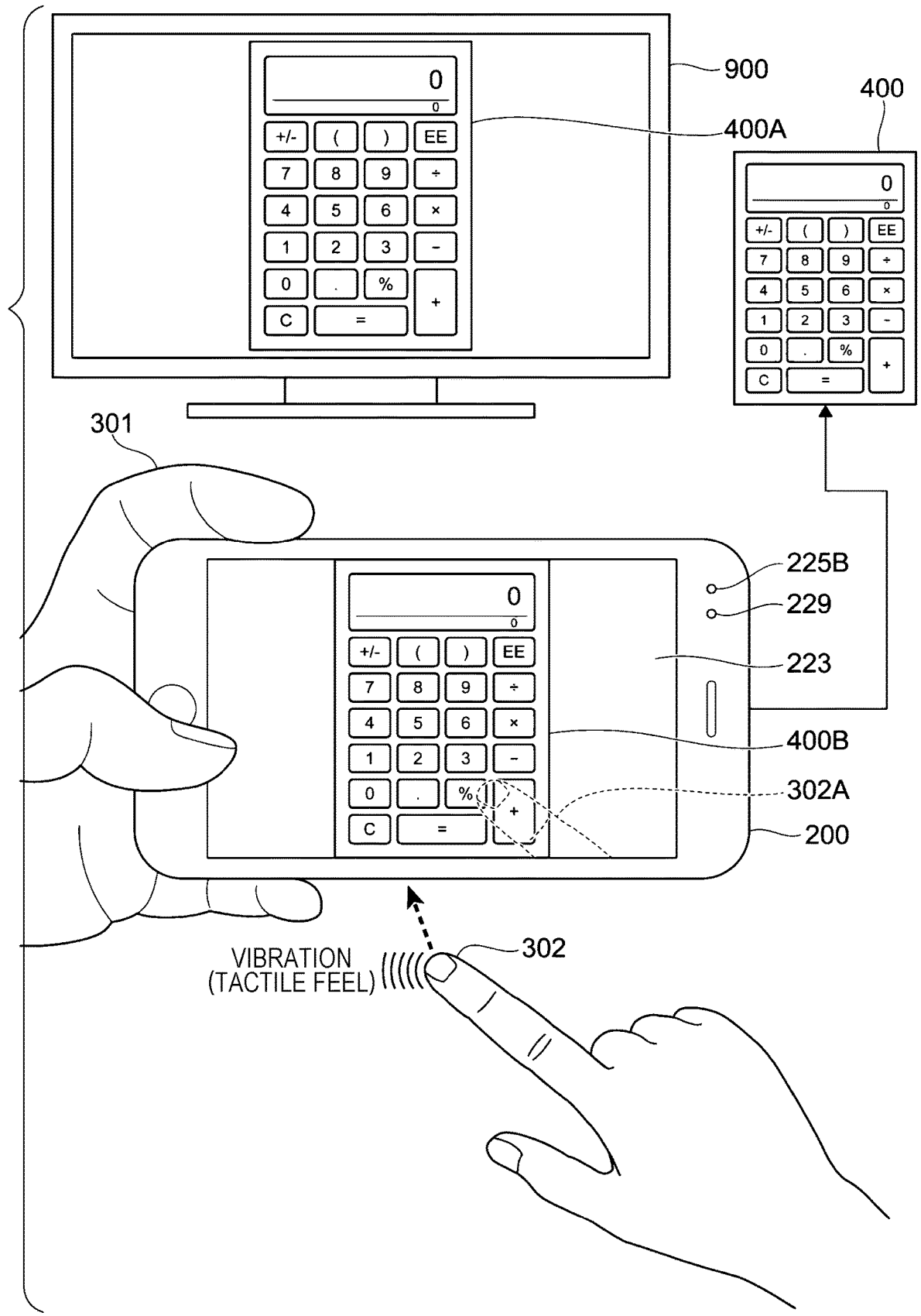
FIG. 25 illustrates a case where the image capture target is a calculator image displayed on a display apparatus.

FIG. 25 illustrates a case where the image capture target is the calculator image 400A displayed on a display apparatus 900.

Portions in FIG. 25 corresponding to those in FIG. 15 are denoted by the corresponding reference numerals.

The display apparatus 900 is a television receiver or a monitor, for example. The calculator image 400A is an image reproduced from image data obtained by capturing an image of the calculator 400 that actually exists.

A calculator image 400B obtained by capturing an image of the display apparatus 900 and the index finger image 302A are displayed on the liquid crystal display 223 of the smartphone 200. As a matter of course, the right hand 302 is not touching the display apparatus 900.

This operation example is the same as Operation Example 8 described with reference to FIG. 15 except that the target of image capture by the smartphone 200 differs from the calculator 400 that actually exists as the operation target.

Also in this case, it is possible to operate the calculator 400 in the same manner as in Operation Example 8 if the calculator 400 as the operation target is specified beforehand from a list of devices being connected with the smartphone 200 through a wireless LAN or the like.

The smartphone 200 is able to detect that the image capture target is a calculator through a technique of recognizing an image, even if the relationship between the calculator image 400A and the calculator 400 that actually exists is unknown. In this case, the smartphone 200 may designate the calculator 400 which actually exists and is communicable therewith to instruct execution of an operation corresponding to motion of the user.

It should be noted, however, that the calculator 400 which is communicable may not be operated through capturing an image of a gesture in the case where the calculator 400 is not prepared for an operation detected by the smartphone 200.

<Operation Example 14>

The operation example discussed earlier assumes a case where a part of the body of the user is captured in an image by the camera 225B while the camera 225A (see FIG. 4) is capturing an image of an object as the operation target or an image of the object. However, the target of image capture may be an image of an object as the operation target.

Figure 26:
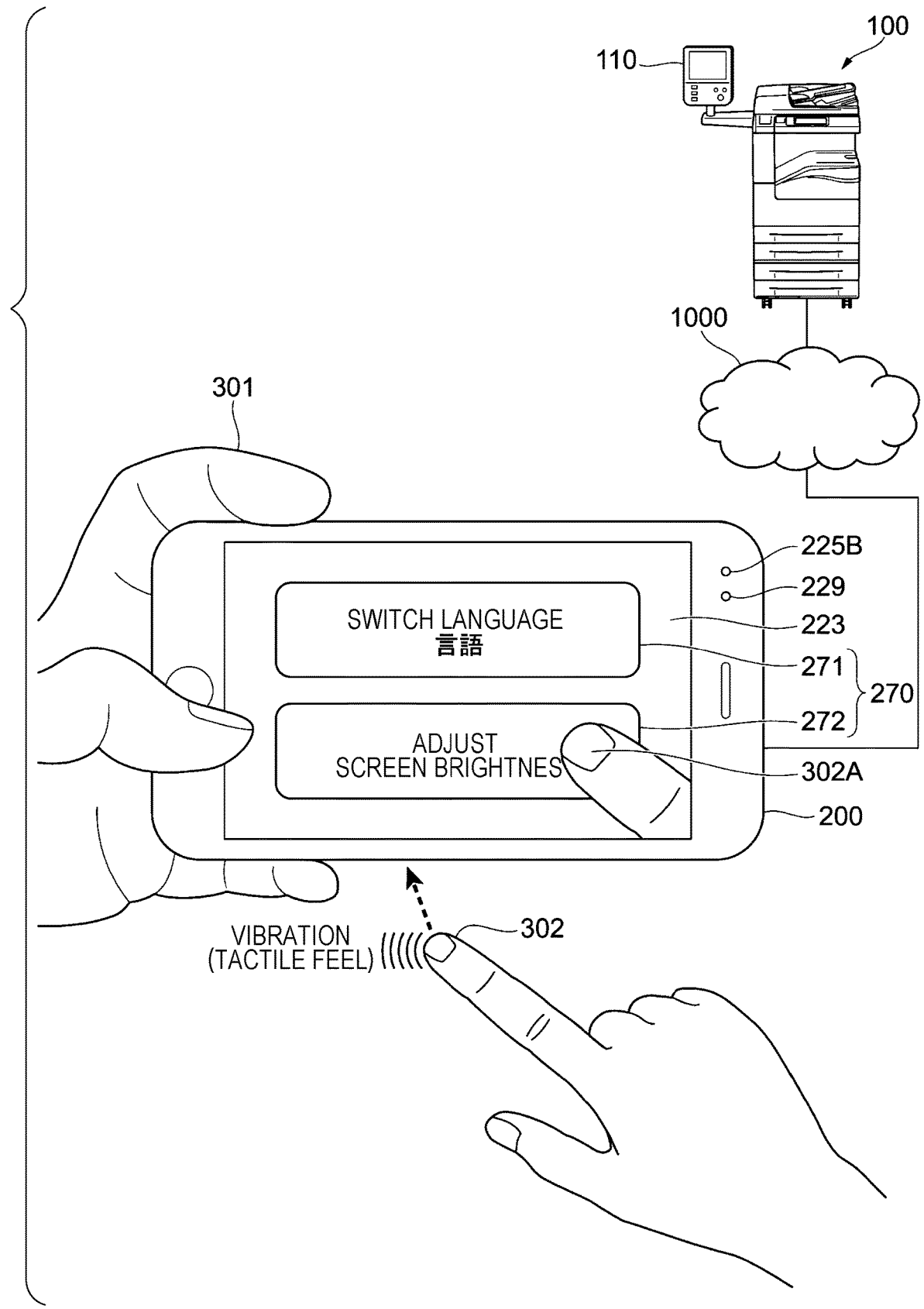
FIG. 26 illustrates an example in which motion of the user captured in an image using the smartphone is associated with an operation on an operation element displayed on the liquid crystal display.

FIG. 26 illustrates an example in which motion of the user captured in an image using the smartphone 200 is associated with an operation on an operation element displayed on the liquid crystal display 223.

Portions in FIG. 26 corresponding to those in FIG. 7 are denoted by the corresponding reference numerals.

In the case of FIG. 26, the liquid crystal display 223 displays an image 270 (a button 271 for language switching and a button 272 for screen brightness adjustment) obtained by capturing an image of a portion of the user interface section 110 of the image forming apparatus 100 that actually exists. However, the image forming apparatus 100 is not present in front of the camera 225A.

It should be noted, however, that the image forming apparatus 100 as the operation target is connected so as to be communicable with the smartphone 200 via a network 1000 such as the Internet or a LAN.

In FIG. 26, an image (e.g. the image 302A of the index finger of the right hand 302) of a part of the body of the user captured by the camera 225B which is provided side by side with the liquid crystal display 223 is composed on the display screen to be displayed.

Specifically, the index finger image 302A which indicates the position of the index finger is composed at the position of the button 272 for screen brightness adjustment, of the image 270 obtained by capturing an image of a portion of the user interface section 110.

The smartphone 200 performs image processing on the composed image. When the smartphone 200 receives motion of the index finger as an operation, the smartphone 200 transmits a signal that instructs execution of the operation to the corresponding image forming apparatus 100.

<Second Exemplary Embodiment>

In the case of the first exemplary embodiment discussed earlier, a gesture by the user is captured in an image using the smartphone 200 (see FIG. 1), and used to operate the image forming apparatus 100 (see FIG. 1) that actually exists. However, a gesture by the user is not limited to being captured in an image by the smartphone 200.

Figure 27:
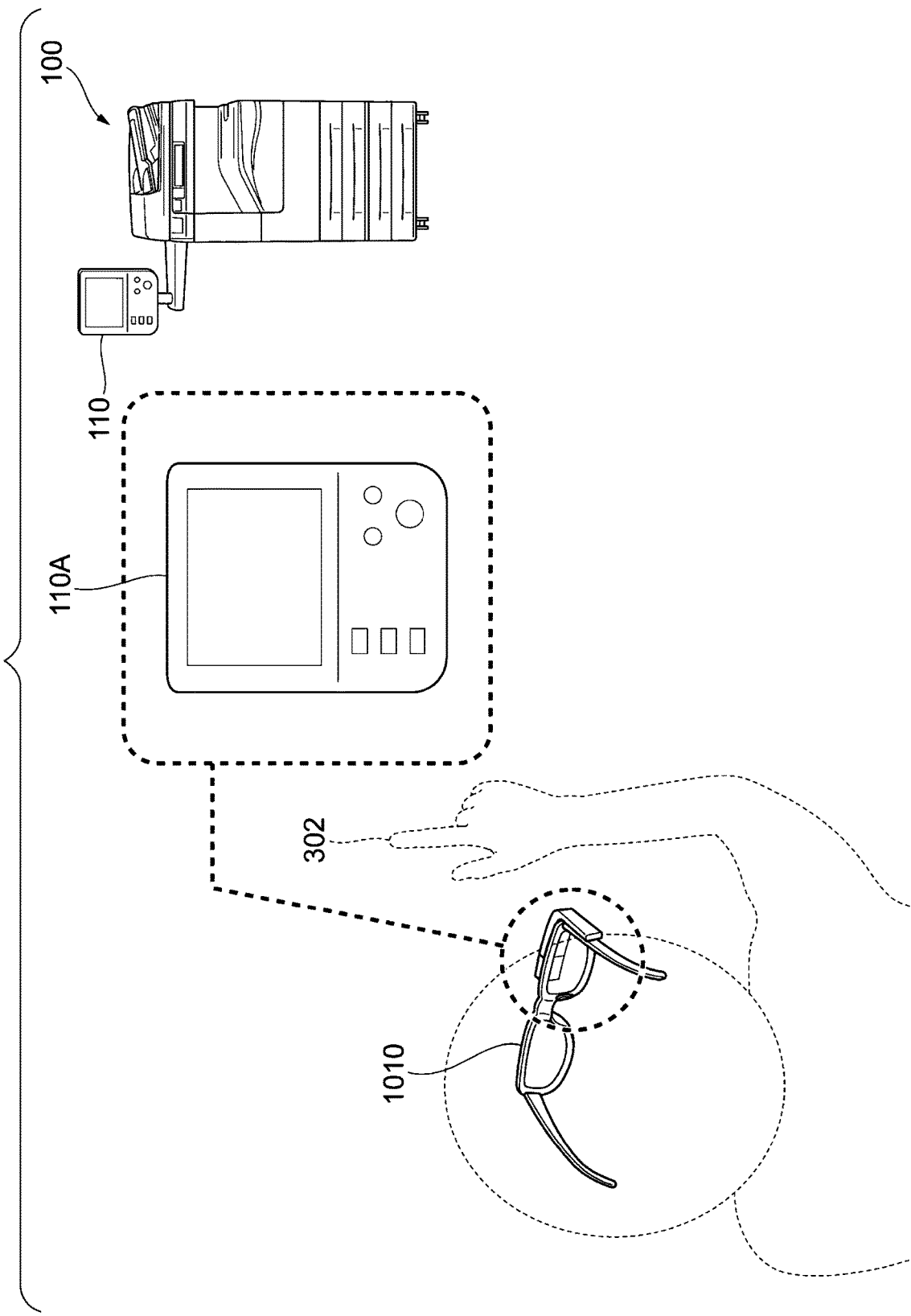
FIG. 27 illustrates an example of a system according to a second exemplary embodiment.

FIG. 27 illustrates an example of a system according to a second exemplary embodiment.

Portions in FIG. 27 corresponding to those in FIG. 1 are denoted by the corresponding reference numerals.

In the case of FIG. 27, the user wears a glass-type terminal 1010.

The glass-type terminal 1010 is configured such that highly transparent optical elements are disposed at the eyes of the user wearing the glass-type terminal 1010.

This enables the user wearing the glass-type terminal 1010 to directly visually recognize the image forming apparatus 100 that is located in the real space through the highly transparent optical elements.

Figure 28:
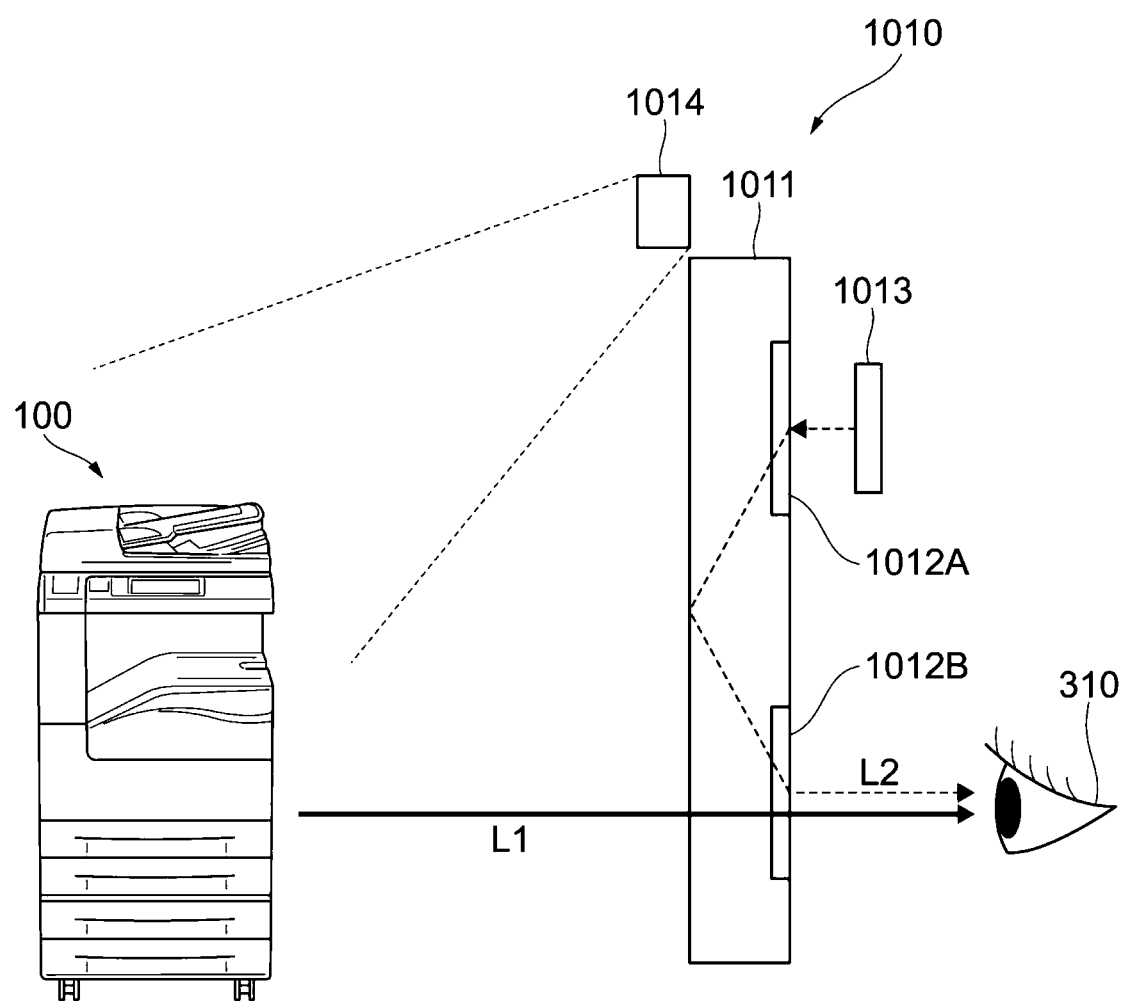
FIG. 28 illustrates an example of the structure of a glass-type terminal that is used in the second exemplary embodiment.

FIG. 28 illustrates an example of the structure of the glass-type terminal 1010 that is used in the second exemplary embodiment.

The glass-type terminal 1010 is already put into practical use by a plurality of manufacturers. This type of glass-type terminal 1010 is also called a transmissive device, a retinal projection device, or the like.

The glass-type terminal 1010 illustrated in FIG. 28 includes a highly transparent light guide plate 1011, visible-light transmitting diffraction gratings 1012A and 1012B, a small display section 1013 that displays an image of a portion as the operation target, and a camera 1014 that captures an image of a scene in front of the user.

The light guide plate 1011 has a transparency of 85% or more, for example. This allows the user to directly visually recognize a scene in front through the light guide plate 1011. The light guide plate 1011 is an example of a transparent member.

In FIG. 28, external light L1 reflected by the image forming apparatus 100 passes straight through the light guide plate 1011 and the visible-light transmitting diffraction grating 1012B to be guided to an eyeball 310. The visible-light transmitting diffraction grating 1012B has a flat plate shape, and is disposed in front of the eyeball 310.

The visible-light transmitting diffraction grating 1012B here also achieves a function of refracting light L2, which is propagated while being reflected inside the light guide plate 1011, in the direction of the eyeball 310.

The light L2 is a light ray projected from the display section 1013 to the light guide plate 1011 and thereafter refracted by the visible-light transmitting diffraction grating 1012A.

The visible-light transmitting diffraction gratings 1012A and 1012B may be holographic diffraction gratings, for example. The visible-light transmitting diffraction grating 1012B functions as a so-called half mirror. Thus, the eyeball 310 sees a user interface section image 110A (see FIG. 27) as a virtual image as superposed on a scene that actually exists. In other words, the user 300 visually recognizes an augmented reality or a mixed reality.

Figure 29:
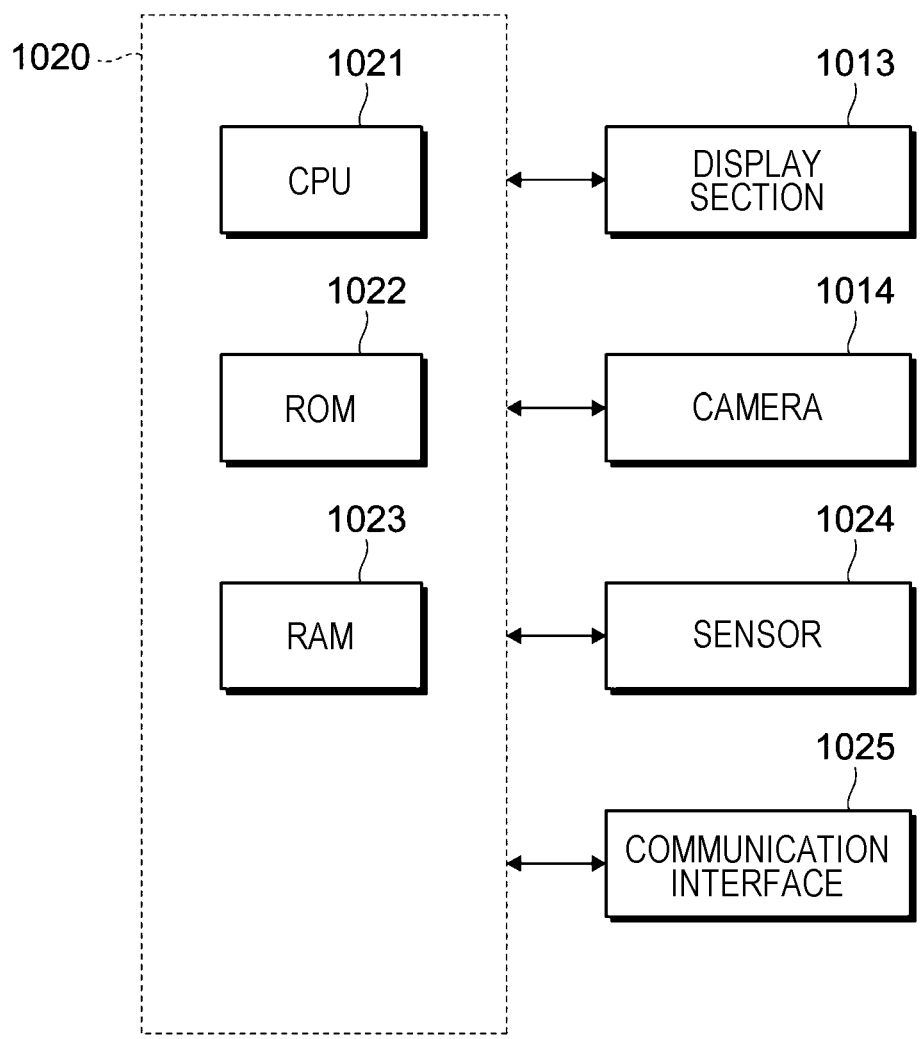
FIG. 29 illustrates an example of the hardware configuration of the glass-type terminal which is used in the second exemplary embodiment.

FIG. 29 illustrates an example of the hardware configuration of the glass-type terminal 1010 which is used in the second exemplary embodiment.

The glass-type terminal 1010 includes a CPU 1021 that controls the entire apparatus through execution of a program (including firmware), a ROM 1022 that stores programs such as a BIOS and firmware, and a RAM 1023 that is used as an area for execution of the programs.

The CPU 1021, the ROM 1022, and the RAM 1023 function as a computer 1020.

A camera 1014 that captures an image of the outside world, a display section 1013 that displays an image etc. captured by the camera 1014, a sensor 1024 that detects various physical amounts, and a communication interface 1025 that is used for external communication are connected to the computer 1020.

Examples of the sensor 1024 include a gyro sensor that detects tilt of a body, a distance sensor that measures the distance to a target object, a global positioning system (GPS) sensor that detects the position of the glass-type terminal 1010, and a line-of-sight detection sensor.

The glass-type terminal 1010 here is used as being mounted to the head portion of the user, and therefore is an example of an information processing apparatus that is used in contact with the user.

The glass-type terminal 1010 may be used to input an operation using two hands.

The user wearing the glass-type terminal 1010 perceives that the user interface section image 110A is floating in the air in front (e.g. 2.5 meters ahead) of the user himself/herself.

Therefore, also in the case of the present exemplary embodiment, the image forming apparatus 100 as the operation target, the user interface section image 110A (virtual display surface), and the right hand 302 are arranged sequentially in this order from the farther side.

<Third Exemplary Embodiment>

A physical operation and an operation by a gesture are not differentiated from each other for the operation target devices (e.g. image processing apparatus, calculator, lever, door, and lighting fixture) according to the exemplary embodiment discussed earlier.

A device that receives only an operation by a gesture will be described in relation to the third exemplary embodiment.

Figure 30:
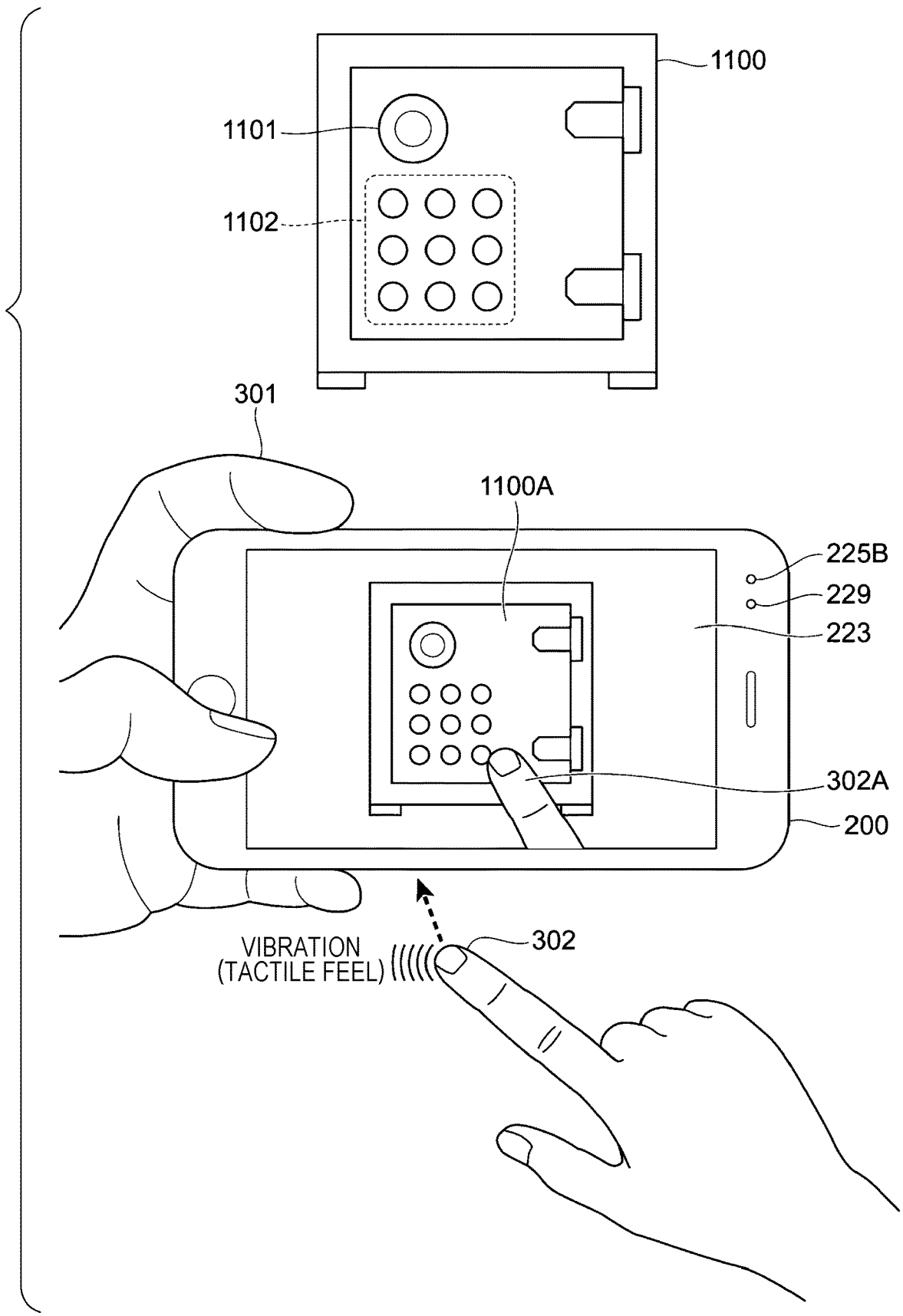
FIG. 30 illustrates a case where a safe is captured in an image as the operation target.

FIG. 30 illustrates a case where a safe 1100 is captured in an image as the operation target.

The safe 1100 illustrated in FIG. 30 has not only a function of being unlocked on condition that a cylinder 1101 or push buttons 1102 disposed on the front surface thereof are physically operated correctly, but also a function of disabling a physical operation on the cylinder 1101 and the push buttons 1102.

In the case where a physical operation is disabled, the safe 1100 is unlocked in the case where a signal corresponding to an operation of the push buttons 1102 is received from the smartphone 200.

In this exemplary embodiment, a safe image 1100A and the index finger image 302A are displayed on the liquid crystal display 223. As a matter of course, the index finger image 302A corresponds to the index finger of the right hand 302. The right hand 302 is not touching the safe 1100 or the liquid crystal display 223, and is moved in the air.

Figure 31:
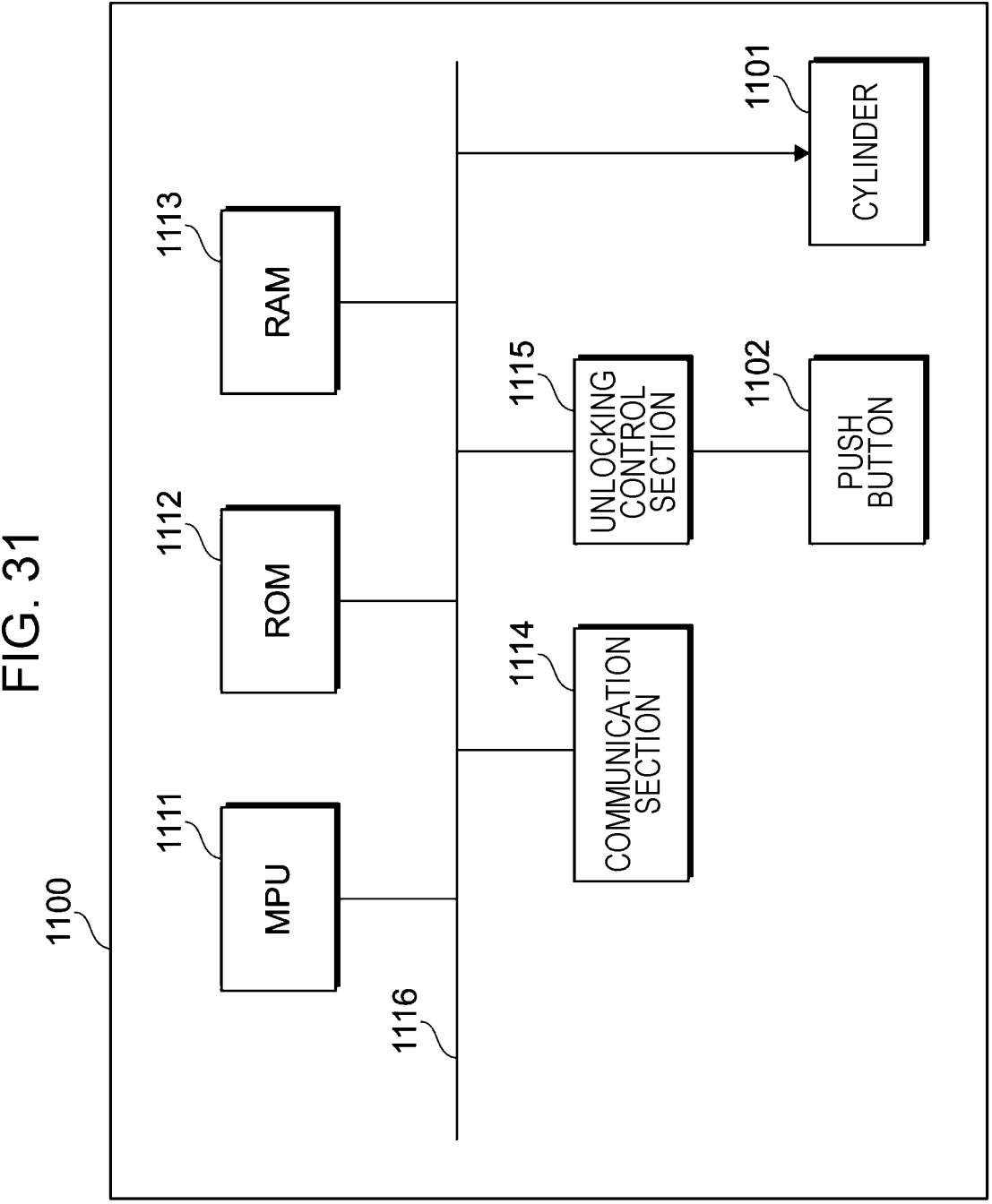
FIG. 31 illustrates an example of the hardware configuration of the safe.

FIG. 31 illustrates an example of the hardware configuration of the safe 1100.

The safe 1100 includes the cylinder 1101, the plurality of push buttons 1102 on operation surfaces of which alphanumeric characters are printed, an MPU 1111, a ROM 1112 that stores data such as firmware, a RAM 1113 that is used as a work area for a program, a communication section 1114 that is used for communication with an external device such as the smartphone 200 (see FIG. 30), and an unlocking control section 1115 that electrically unlocks and locks the cylinder 1101. Such sections are connected to each other via a bus 1116, for example.

Figure 32:
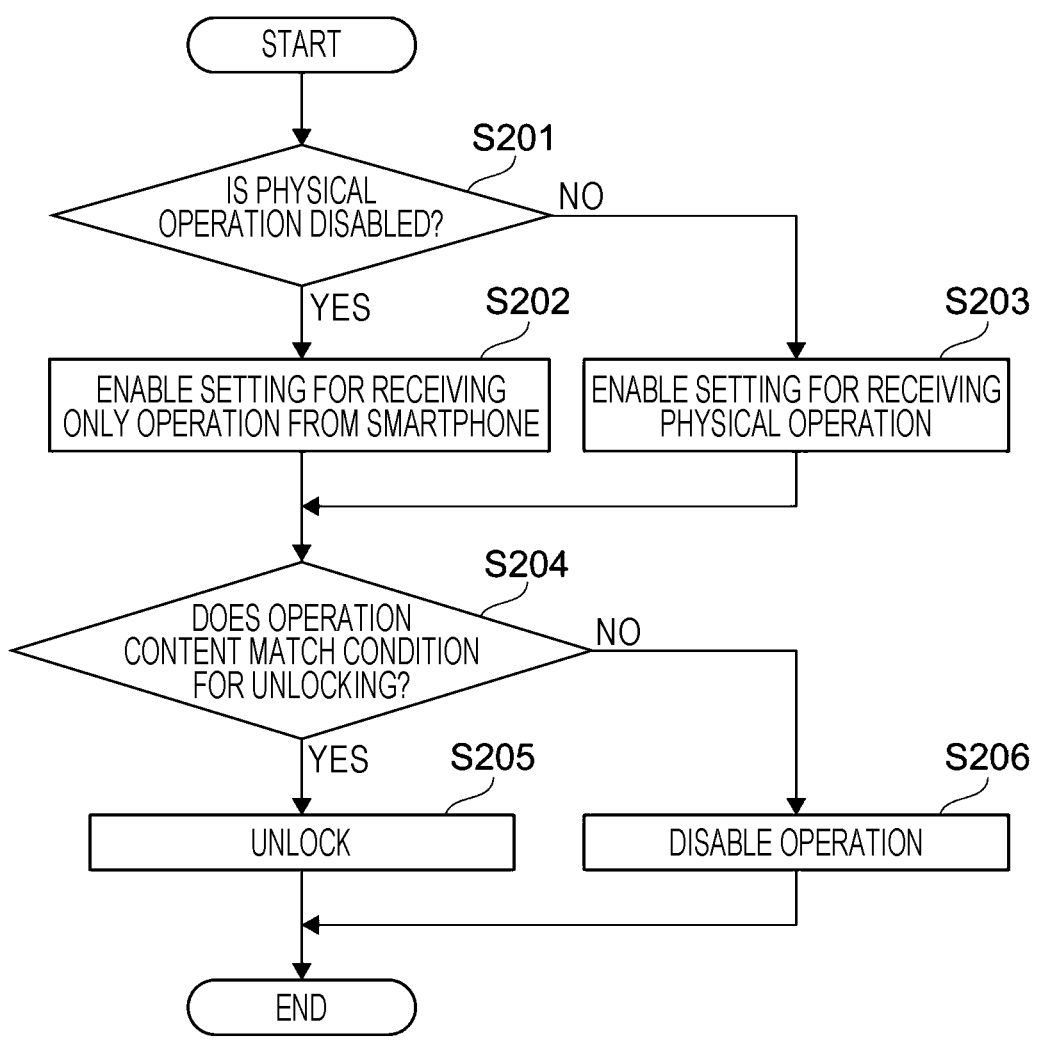
FIG. 32 is a flowchart illustrating an example of processing operation executed by a micro processing unit (MPU)

FIG. 32 is a flowchart illustrating an example of processing operation executed by the MPU 1111. In FIG. 32, steps are denoted by the symbol S.

First, the MPU 1111 determines whether or not a physical operation has been disabled (step 201).

In the case where a positive result is obtained in step 201, the MPU 1111 enables a setting for receiving only an operation from the smartphone 200 (step 202).

In the case where a negative result is obtained in step 201, on the other hand, the MPU 1111 enables a setting for receiving a physical operation (step 203). In the case where a setting for receiving a physical operation is enabled, an operation from the smartphone 200 is also enabled.

After such a setting is made, the MPU 1111 determines whether or not the content of an operation matches a condition for unlocking (step 204).

In the case where a positive result is obtained in step 204, the MPU 1111 unlocks the cylinder 1101 (step 205).

In the case where a negative result is obtained in step 204, on the other hand, the MPU 1111 disables the operation (step 206).

For example, in the case where a physical operation is disabled, a locked state is maintained even if a correct key is inserted into the cylinder 1101 (see FIG. 31) or the push buttons 1102 (see FIG. 31) are operated in the correct order. In the case where an instruction to operate the push buttons 1102 in the correct order is given from the smartphone 200, on the other hand, unlocking is permitted.

In addition, the user who is able to unlock the safe 1100 is limited to a specific individual (the user who is able to operate the smartphone 200) by combining an individual authentication function implemented using the smartphone 200.

<Fourth Exemplary Embodiment>

A method of operating by a gesture a subject captured in an image by a web camera or the like as if the subject were present right in front of the eyes will be described.

This exemplary embodiment is the same as Operation Example 10 (FIGS. 18 to 22) except that the operation target does not actually exist in front of the user.

Figure 33:
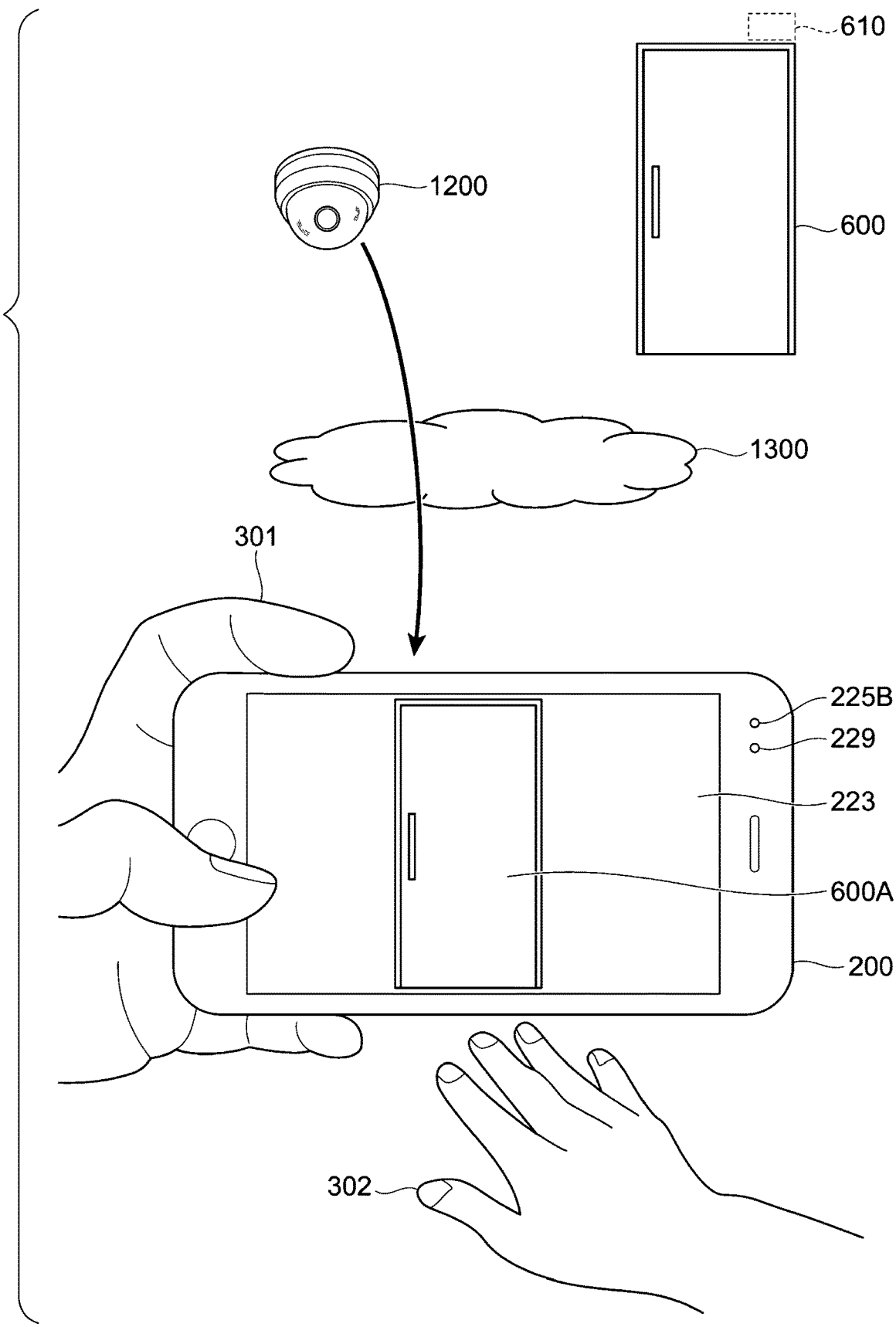
FIG. 33 illustrates an example of a system according to a fourth exemplary embodiment.

FIG. 33 illustrates an example of a system according to a fourth exemplary embodiment.

In the system illustrated in FIG. 33, image data output from a web camera 1200 are transmitted to the smartphone 200 by way of a network 1300, and displayed on the liquid crystal display 223.

An image 600A of the single-swing door 600 is displayed on the liquid crystal display 223 illustrated in FIG. 33.

In the case of FIG. 33, an image corresponding to the right hand 302 of the user is not displayed on the liquid crystal display 223.

Figure 34:
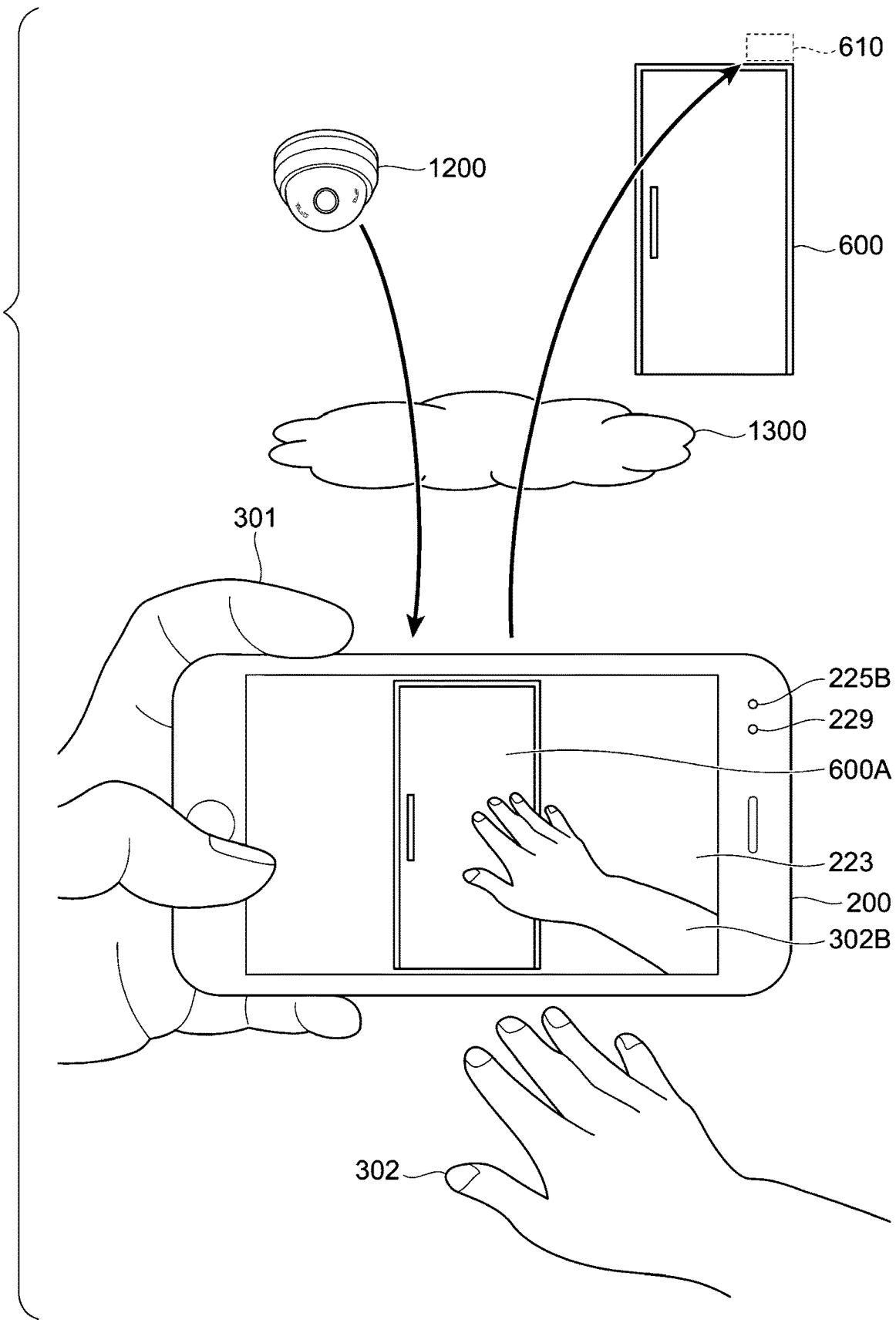
FIG. 34 illustrates a case where the smartphone receives motion of a part of the body of the user as an operation on the single-swing door as described in relation to the exemplary embodiment discussed earlier.

FIG. 34 illustrates a case where the smartphone 200 receives motion of a part (right hand 302) of the body of the user as an operation on the single-swing door 600 as described in relation to the exemplary embodiment discussed earlier.

Portions in FIG. 34 corresponding to those in FIG. 33 are given the corresponding reference numerals.

In FIG. 34, the right hand image 302B captured by the camera 225B of the smartphone 200 is superposed on the single-swing door image 600A.

In this state, when the right hand 302 is moved so as to push out in the air, a signal that instructs an opening operation of the single-swing door 600 is output to the opening/closing mechanism 610 connected by way of the network 1300.

Figure 35:
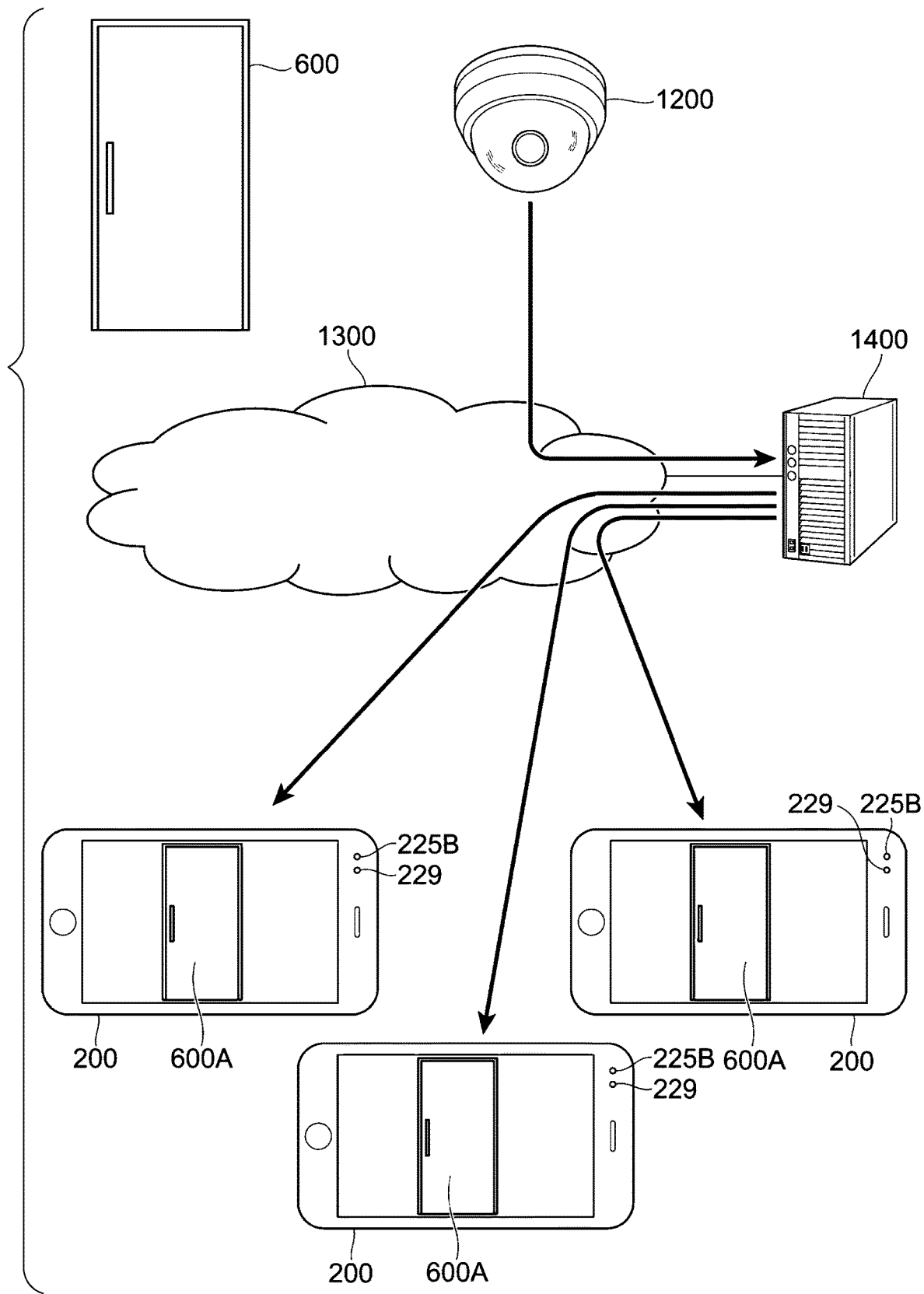
FIG. 35 illustrates a scheme in which a plurality of users share information on an operation via a network.

FIG. 35 illustrates a scheme in which a plurality of users share information on an operation via the network 1300. Portions in FIG. 35 corresponding to those in FIG. 34 are given the corresponding reference numerals.

FIG. 35 illustrates a case where image data output from the web camera 1200 are acquired by a server 1400 and thereafter distributed to three smartphones 200. The function of the server 1400 may be built in the web camera 1200.

In the case of FIG. 35, all the smartphones 200 display the single-swing door image 600A.

Figure 36:
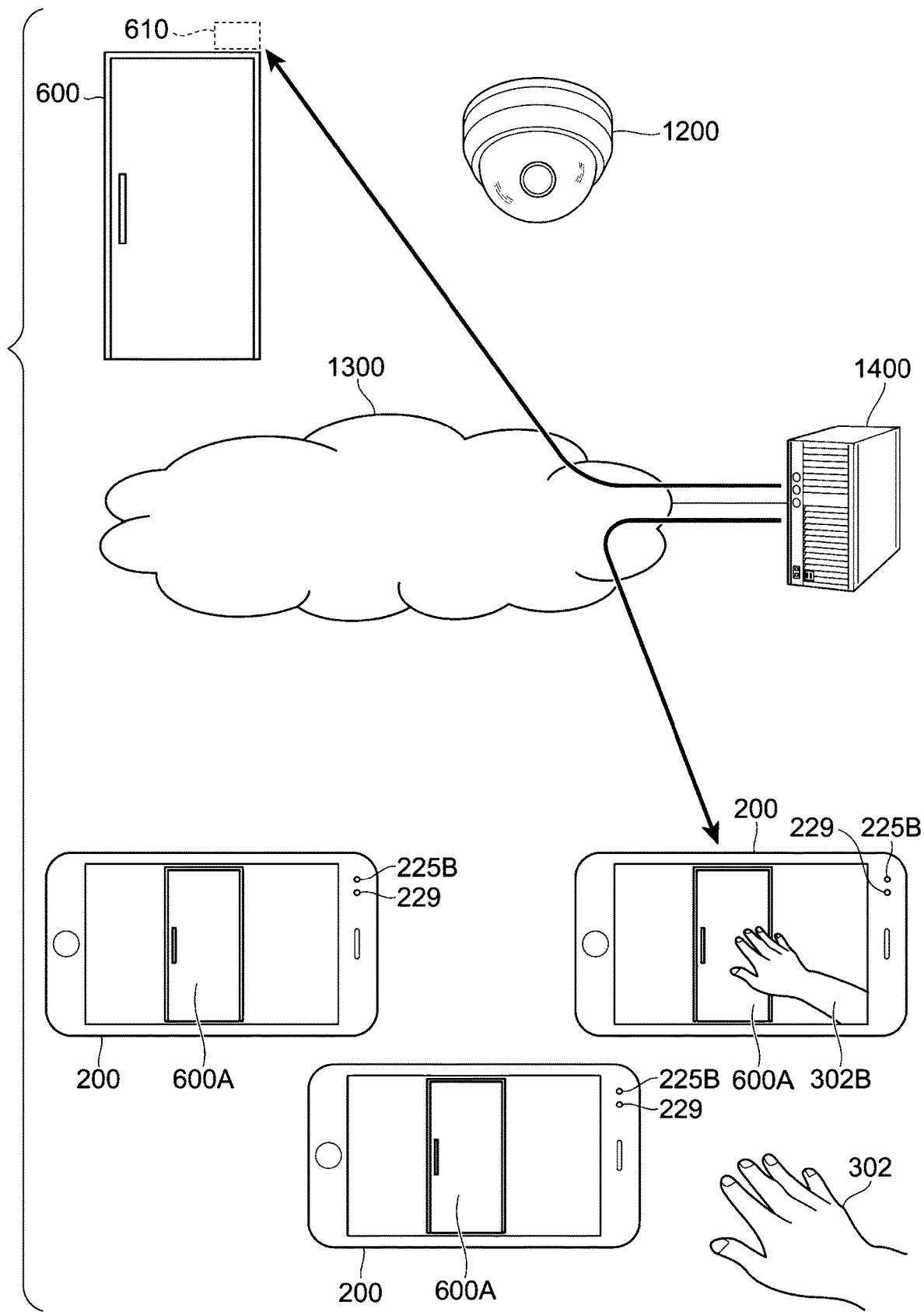
FIG. 36 illustrates a case where the single-swing door is pushed open using one of three smartphones.

FIG. 36 illustrates a case where the single-swing door 600 is pushed open using one of the three smartphones 200. Portions in FIG. 36 corresponding to those in FIG. 35 are denoted by the corresponding reference numerals.

In the case of FIG. 36, an operation received through one of the three smartphones 200 is transmitted to the opening/closing mechanism 610 of the single-swing door 600 through the server 1400. In the case where a plurality of operations on the single-swing door 600 are performed at a time, the server 1400 according to the present exemplary embodiment gives priority to an operation that arrives the earliest. In the case where contradictory operations arrive at a time, execution of such operations may be suspended. The phrase "at a time" means that operations arrive within a period determined in advance.

Figure 37:
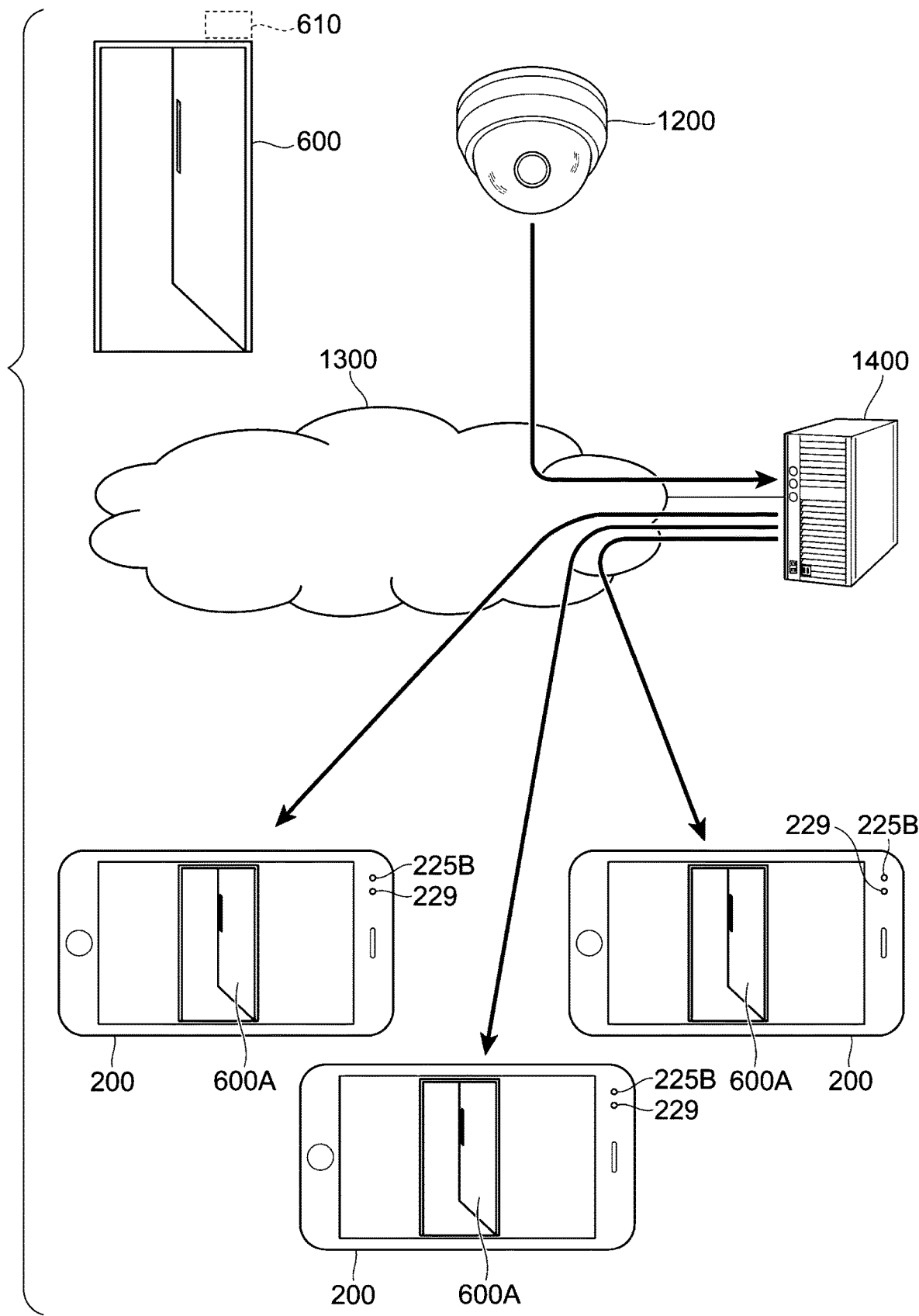
FIG. 37 illustrates a scene in which a state in which the single-swing door is open is shared among the three smartphones.

FIG. 37 illustrates a scene in which a state in which the single-swing door 600 is open is shared among the three smartphones 200. Portions in FIG. 37 corresponding to those in FIG. 36 are denoted by the corresponding reference numerals.

<Fifth Exemplary Embodiment>

While the operation target displayed on the smartphone 200 is a device in the exemplary embodiment discussed earlier, a case where the operation target is not provided with a communication function will be described.

Figure 38:
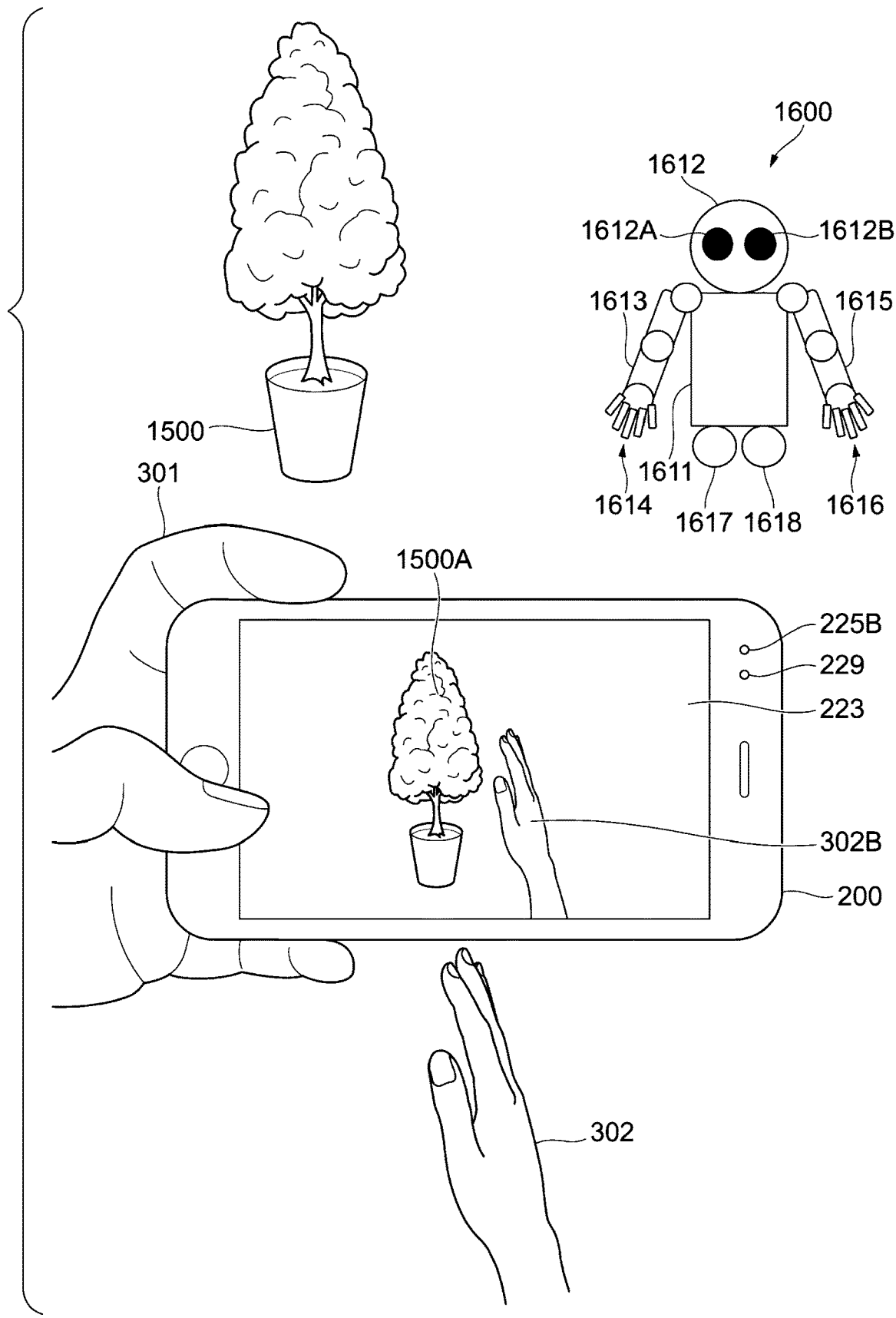
FIG. 38 illustrates a case where an instruction to move a potted plant is provided by a gesture.

FIG. 38 illustrates a case where an instruction to move a potted plant 1500 is provided by a gesture. In FIG. 38, the user's right hand image 302B and a potted plant image 1500A are displayed on the screen of the smartphone 200. Also in this case, the right hand 302 in the actual space is not touching the potted plant 1500 or the liquid crystal display 223.

The potted plant 1500 is not provided with a communication function or a self-running apparatus. Therefore, unlike the exemplary embodiment discussed earlier, even if motion of the right hand 302 is captured in an image by the camera 225B of the smartphone 200, the potted plant 1500 may not be moved in accordance with the motion.

In the present exemplary embodiment, a humanoid robot 1600 that has a self-running function is designated as the destination of transmission of an operation by a gesture. The robot 1600 as the destination of transmission of an instruction may be designated from a list of devices that are communicable with the smartphone 200, for example.

Although the robot 1600 illustrated in FIG. 38 has a humanoid appearance, the robot may have any appearance as long as a necessary function is provided. For example, the robot may look like an animal such as a dog or a cat, a plant such as a flower or a tree, or a vehicle or a craft such as a car (including a train) or an airplane.

The robot 1600 illustrated in FIG. 38 includes a body portion 1611, a head portion 1612, arms 1613 and 1615, hands 1614 and 1616, and legs 1617 and 1618.

The body portion 1611 stores an electronic component for signal processing. The body portion 1611 may be provided with a display device or an acoustic device.

The head portion 1612 is coupled to the body portion 1611 via a joint mechanism provided at a neck portion. In the case of the present exemplary embodiment, the joint mechanism is rotatable about three axes. Rotations about three axes include yaw (rotation about the z-axis), roll (rotation about the x-axis), and pitch (rotation about the y-axis). The joint mechanism here is an example of a movable section.

It is not necessary that the joint mechanism should be rotatable about all the three axes, and the joint mechanism may be rotatable about only one axis or two axes. Such rotation may be implemented by a motor (not illustrated), or may be implemented manually. A case where the head portion 1612 is fixed with respect to the body portion 1611 is not excluded.

The head portion 1612 is provided eyes 1612A and 1612B. The eyes 1612A and 1612B may be disposed decoratively, or may include an image capture apparatus, a projector, a lighting fixture, etc. built therein. The head portion 1612 may be provided with movable ears.

The arms 1613 and 1615 according to the present exemplary embodiment are coupled to the body portion 1611 via a joint mechanism. An overarm and a forearm of the arms 1613 and 1615 are coupled to each other via a joint mechanism. The joint mechanism here may be of a multi-axis type or a single-axis type as with that for the head portion 1612. Rotation about an axis may be implemented by a motor (not illustrated), or may be implemented manually. The arms 1613 and 1615 may be fixed to the body portion 1611. The joint mechanism here is also an example of a movable section.

The arms 1613 and 1615 may be bent to an angle determined in advance to be used to transport an object.

The hands 1614 and 1616 are coupled to the arms 1613 and 1615, respectively, via a joint mechanism provided at a wrist portion. A palm and fingers of the hands 1614 and 1616 are coupled to each other via a joint mechanism. The joint mechanism here may be of a multi-axis type or a single-axis type as with that for the head portion 1612. Rotation about an axis may be implemented by a motor (not illustrated), or may be implemented manually. In the case of the present exemplary embodiment, the hands 1614 and 1616 may grasp an object by opening and closing the fingers. The joint mechanism here is also an example of a movable section.

The hands 1614 and 1616 may be fixed with respect to the arms 1613 and 1615, respectively.

The legs 1617 and 1618 may be coupled to the body portion 1611 via a joint mechanism, or may be attached to the body portion 1611 as a self-running apparatus such as a wheel or a caterpillar.

In the case where the legs 1617 and 1618 are coupled to the body portion 1611 via a joint mechanism, the joint mechanism may be of a multi-axis type or a single-axis type as with that for the head portion 1612.

Rotation about an axis may be implemented by a motor (not illustrated), or may be implemented manually. The legs 1617 and 1618 may be fixed with respect to the body portion 1611. The joint mechanism here is also an example of a movable section.

Figure 39:
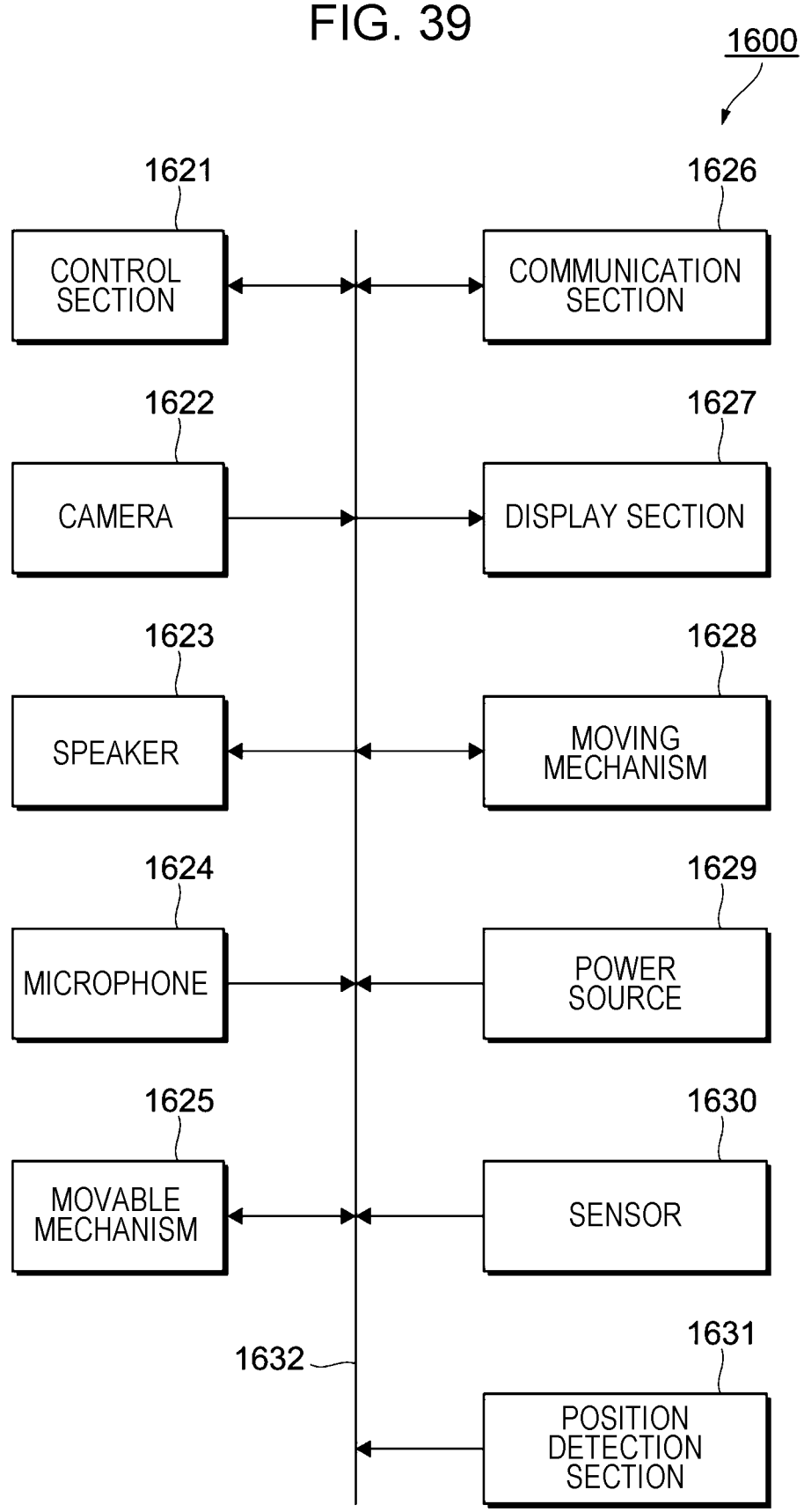
FIG. 39 illustrates the hardware configuration of a robot.

FIG. 39 illustrates the hardware configuration of the robot 1600.

The robot 1600 includes a control section 1621 that controls motion of the entire apparatus, a camera 1622 that captures an image of a scene around the robot, a speaker 1623 that reproduces voices for conversation, tunes, and sound effects, a microphone 1624 that is used to input or acquire a sound, a movable mechanism 1625 such as a joint mechanism, a communication section 1626 that is used to communicate with an external apparatus (e.g. a smartphone), a display section 1627 that displays an image, a moving mechanism 1628 that moves the entire apparatus, a power source 1629 that supplies electric power to the various sections, a sensor 1630 that is used to collect a state of the various sections and information on the surroundings, and a position detection section 1631 that is used to acquire positional information. Such sections are connected to each other via a bus 1632, for example.

It should be understood that the hardware configuration illustrated in FIG. 39 is exemplary. Thus, it is not necessary that the robot 1600 should be provided with all the functional sections discussed earlier.

The robot 1600 may be further provided with a functional section (not illustrated). For example, the robot 1600 may be provided with a power button, a storage apparatus (such as a hard disk apparatus or a semiconductor memory), a heat source (including a cooling source), or the like.

The control section 1621 is a so-called computer, and includes a CPU, a ROM, and a RAM. The ROM stores a program to be executed by the CPU. The CPU reads the program stored in the ROM, and executes the program using the RAM as a work area. The CPU controls operation of the various sections constituting the robot 1600 through execution of the program.

The program here includes a program associated with implementation of an algorithm corresponding to artificial intelligence. The CPU and the RAM constituting the control section 1621 provide a computational resource that is used by the artificial intelligence.

The control section 1621 according to the present exemplary embodiment processes information acquired through the camera 1622, the microphone 1624, and the sensor 1630, for example, with the artificial intelligence to autonomously determine operation that matches the surrounding environment and the state of the robot 1600.

For example, a voice may be output through the speaker 1623, a message may be transmitted through the communication section 1626, and an image may be output through the display section 1627.

The control section 1621 may establish communication with the user through input and output of such information and motion of the movable mechanism 1625. Examples of application of communication include customer attendance and leading meetings.

The control section 1621 also has a function of collecting additional information through Internet search or communication with an external computer in the case where an unknown situation occurs, and finding a solution in accordance with the degree of similarity to an event found in the search.

In the case of the present exemplary embodiment, examples of the information acquired by the control section 1621 include information obtained through the senses of sight, hearing, touch, taste, smell, and balance and the temperature.

The sense of sight is implemented through a process of recognizing an image captured by the camera 1622.

The sense of hearing is implemented through a process of recognizing a sound acquired by the microphone 1624.

Examples of the sense of touch include superficial sensation (such as touch, pain, and temperature), deep sensation (such as pressure, position, and vibration), and cortical sensation (such as two-point discrimination and three-dimensional discrimination).

The control section 1621 is capable of discriminating differences in the sense of touch.

The senses of touch, taste, smell, and balance and the temperature are implemented through detection of information by the sensor 1630 of various types. The temperature includes an ambient temperature, an internal temperature, and the body temperature of a human or an animal.

The information acquired by the control section 1621 may include brain waves of a human or an animal. In this case, the brain waves may be obtained by the communication section 1626 receiving information sent from a brain wave detection device mounted to a human or the like.

In the case of the present exemplary embodiment, the camera 1622 is disposed at the positions of the eyes 1612A and 1612B (see FIG. 38).

In the case where a projector is used as the display section 1627, the projector may be disposed at one or both of the eyes 1612A and 1612B (see FIG. 38), for example. The projector may be disposed at the body portion 1611 or the head portion 1612.

The movable mechanism 1625 may be used not only to transport an object but also to express a feeling.

In the case where the movable mechanism 1625 is used to transport an object, the movable mechanism 1625 implements operation such as grasping, holding, and supporting the object, for example, through deformation of the arms 1613 and 1615 and the hands 1614 and 1616 (see FIG. 38).

In the case where the movable mechanism 1625 is used to express a feeling, the movable mechanism 1625 implements operation such as tilting the head, looking up, looking around, giving a cheer, and pointing a finger through drive of the head portion 1612, the arms 1613 and 1615, the hands 1614 and 1616, etc. (see FIG. 38), for example.

The communication section 1626 according to the present exemplary embodiment communicates with an external apparatus wirelessly.

The robot 1600 is provided with a number of communication sections 1626, the number corresponding to the number of communication methods used by an external apparatus assumed as the target of communication. Examples of the communication methods include infrared communication, visible light communication, proximity wireless communication, Wi-Fi (registered trademark), Bluetooth (registered trademark), RFID (registered trademark), ZigBee (registered trademark), IEEE 802.11a (registered trademark), MulteFire, and Low Power Wide Area (LPWA).

Bands used for wireless communication include a short-wavelength region (e.g. 800 MHz to 920 MHz) and a long-wavelength region (e.g. 2.4 GHz and 5 GHz).

The communication section 1626 and the external apparatus may be connected to each other using a communication cable.

The display section 1627 may be used to achieve visual communication with the user. For example, the display section 1627 may display characters and figures.

In the case where the display section 1627 is disposed at the head portion 1612, the display section 1627 may display a facial expression.

In the case of the present exemplary embodiment, a wheel or a caterpillar is used for the moving mechanism 1628. However, the robot 1600 may be moved by a pneumatic force using a propeller or a compressed air blowout mechanism.

A secondary battery is used for the power source 1629 according to the present exemplary embodiment. However, any of a primary battery, a fuel cell, and a solar cell that generate electric power may also be used.

Alternatively, the robot 1000 may receive supply of electric power from an external apparatus through a power cable, rather than from the power source 1629.

In the case of the present exemplary embodiment, the robot 1600 is provided with the position detection section 1631.

The position detection section 1631 utilizes a method in which location information is read from a global positioning system (GPS) signal, an Indoor MEssaging System (IMES) method in which an indoor position is measured using a signal that is equivalent to the GPS signal, a Wi-Fi position measurement method in which a position is measured from the intensity, arrival time, etc. of radio waves transmitted from a plurality of Wi-Fi access points, a base-station position measurement method in which a position is measured from the direction and delay time of a response to a signal regularly generated from a base station, a sound-wave position measurement method in which a position is measured by receiving ultrasonic waves in an inaudible range, a Bluetooth position measurement method in which a position is measured by receiving radio waves from a beacon that uses Bluetooth, a visible-light position measurement method in which a position is measured using positional information transferred by flashing on and off of illumination light from a light emitting diode (LED) or the like, or an autonomous navigation method in which the current position is measured using an acceleration sensor, a gyro sensor, etc., for example.

Figure 40:
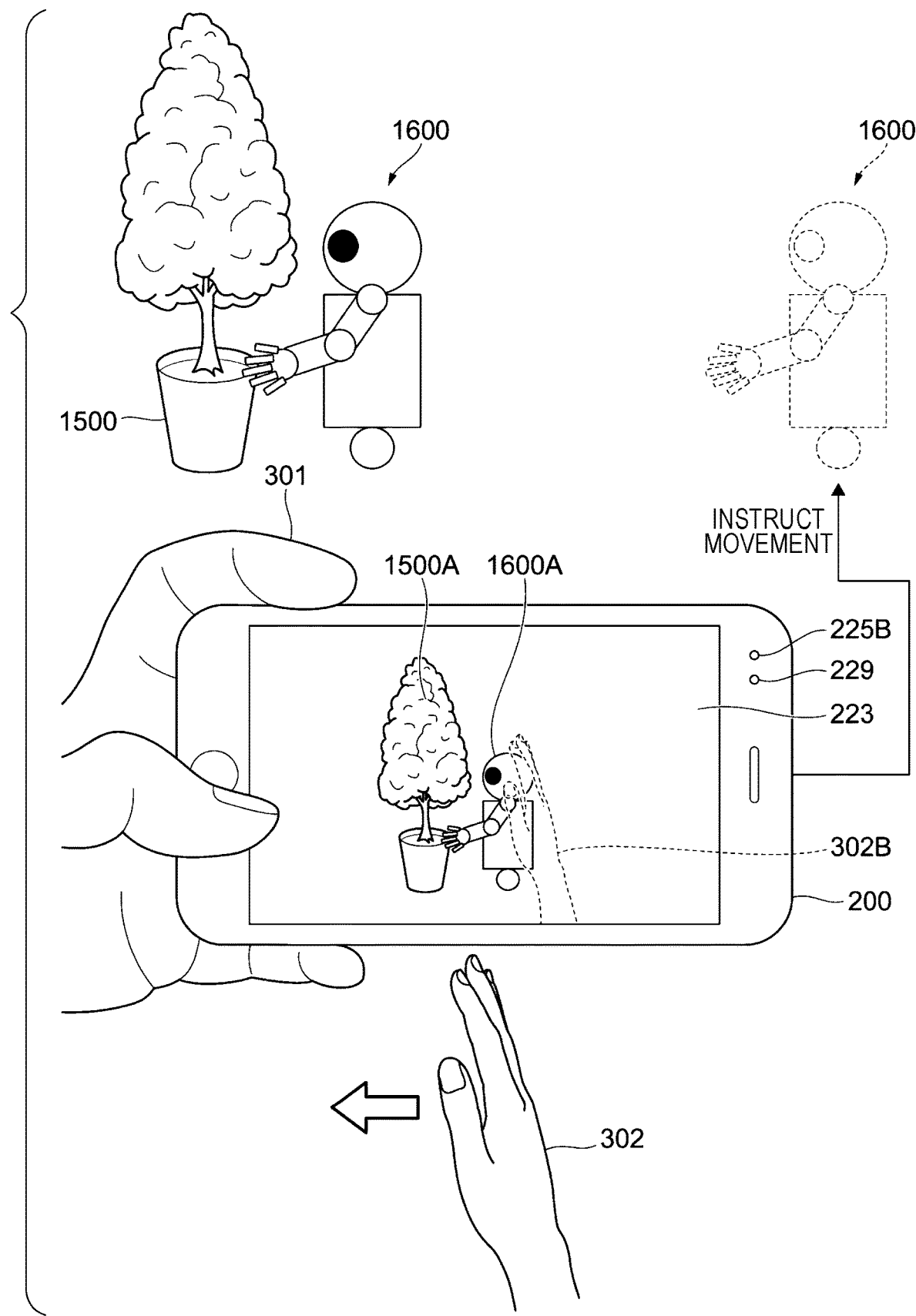
FIG. 40 illustrates how the potted plant is moved using the robot.

FIG. 40 illustrates how the potted plant 1500 is moved using the robot 1600.

Portions in FIG. 40 corresponding to those in FIG. 38 are denoted by the corresponding reference numerals.

As in the other exemplary embodiments, the user moves the right hand 302 in the space in front of the smartphone 200, and captures an image of such motion.

When the motion of the right hand 302 is received as an operation, the smartphone 200 instructs the robot 1600, which is able to move to the potted plant 1500, to execute the operation. The operation here is to move the potted plant 1500 sideways.

When the instruction for movement is received, the robot 1600 moves to the location of the potted plant 1500 which is the target of movement, and grasps and moves the potted plant 1500 sideways.

In this event, the smartphone 200 displays a robot image 1600A grasping and moving the potted plant image 1500A and the right hand image 302B. In the case of FIG. 40, the right hand image 302B is displayed as a transparent image in order to allow the user to easily confirm the robot image 1600A.

In the case of FIG. 40, both the potted plant 1500 and the robot 1600 actually exist in front of the eyes of the user, and thus there is little need to display the right hand image 302B in a transparent manner. In the case where the potted plant image 1500A being displayed on the smartphone 200 is not present in front of the eyes of the user (e.g. in the case where the smartphone 200 displays an image from a web camera), however, the right hand image 302B may be displayed in a transparent manner in order to allow the user to easily confirm a scene in the actual space.

<Sixth Exemplary Embodiment>

In the exemplary embodiments discussed earlier, the smartphone 200 is positioned in front of the object as the operation target to be at the position facing the object as the operation target. However, the facing position is not limited to a position in front.

Figure 41:
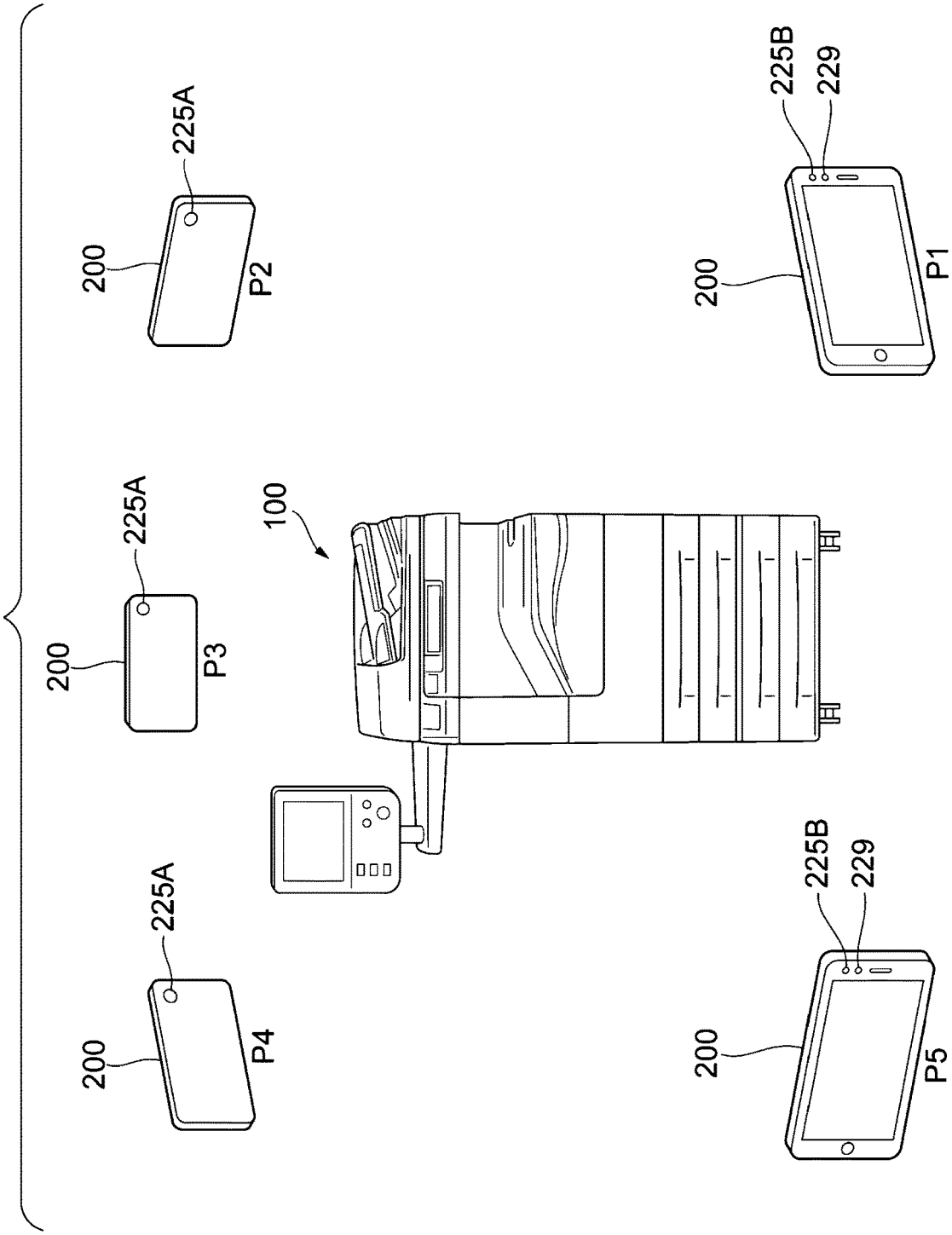
FIG. 41 illustrates a different example of positions facing the image forming apparatus.

FIG. 41 illustrates a different example of positions facing the image forming apparatus 100.

In FIG. 41, the smartphone 200 is positioned at a position P1 diagonally forward right of the image forming apparatus 100, a position P2 diagonally rearward right of the image forming apparatus 100, a position P3 in rear of the image forming apparatus 100, a position P4 diagonally rearward left of the image forming apparatus 100, and a position P5 diagonally forward left of the image forming apparatus 100. Such positions are examples of the position facing the image forming apparatus 100.

When the user captures images of the image forming apparatus 100 from different directions, different portions or operation elements are captured in the images by the camera 225A. Therefore, different operations are performed on the image forming apparatus 100 even if the same motion of the user is captured in images by the camera 225B.

<Seventh Exemplary Embodiment>

In the exemplary embodiments discussed earlier, the buttons displayed on the user interface section 110 (see FIG. 1) of the image forming apparatus 100 (see FIG. 1) are operated by a gesture. However, the housing section 140 (see FIG. 1) for paper may be opened and closed by a gesture.

Figure 42:
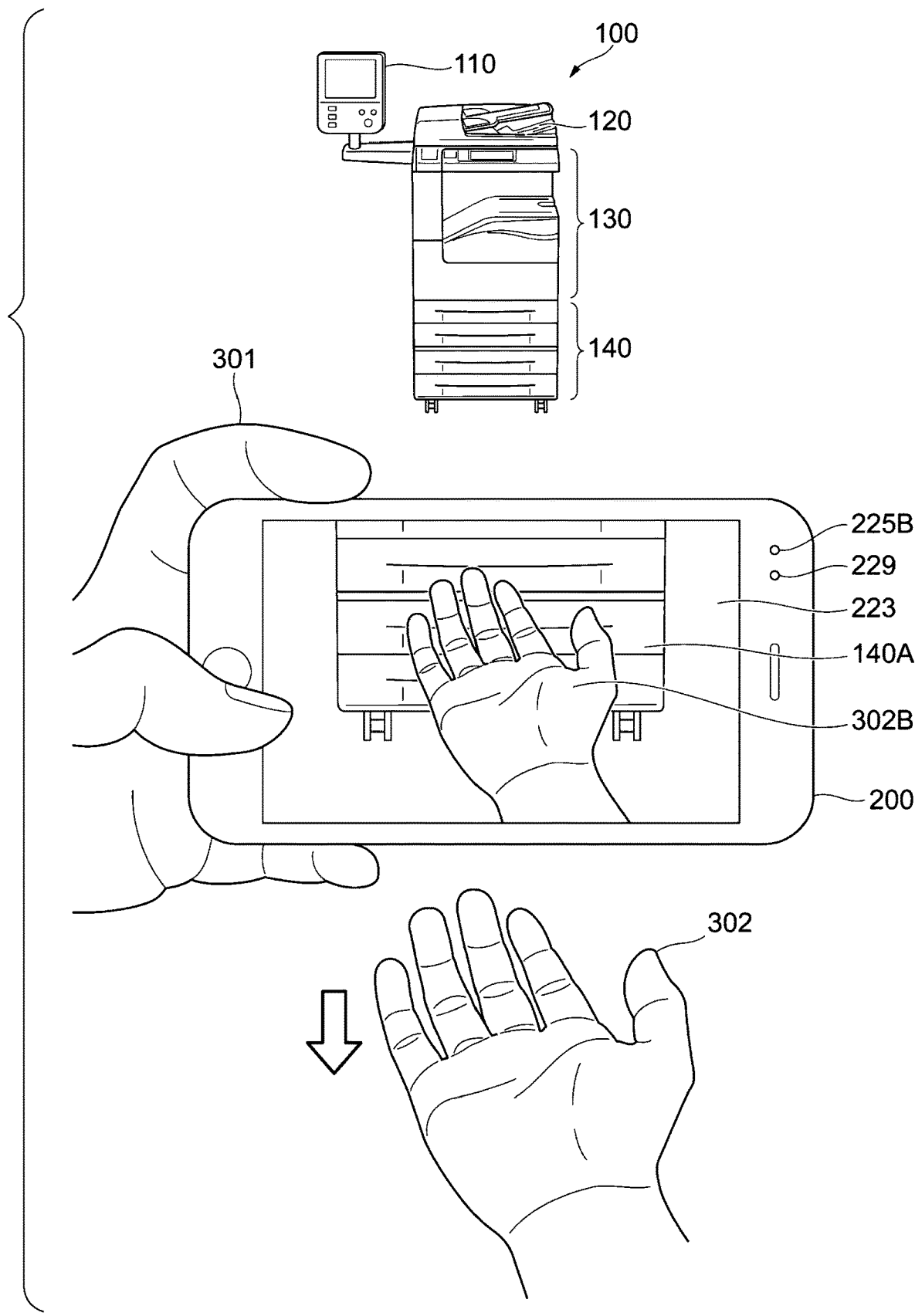
FIG. 42 illustrates an example in which a housing section for paper is opened and closed by a gesture.

FIG. 42 illustrates an example in which the housing section 140 for paper is opened and closed by a gesture. The housing section 140 for paper is the operation target, and thus an image 140A of the housing section 140 for paper and the user's right hand image 302B are displayed as superposed on each other on the liquid crystal display 223 of the smartphone 200. In FIG. 42, the right hand 302 is pulled toward the closer side (in the direction closer to the user himself/herself or the direction away from the liquid crystal display 223) as indicated by an arrow.

In the case of this example, the housing section 140 for paper, which is detected as superposed on the right hand image 302B, is pulled out toward the closer side even if the buttons displayed on the user interface section 110 are not operated.

As a matter of course, it is necessary, as a precondition, that a motor (not illustrated) that drives the housing section 140 for paper should be built in the image forming apparatus 100. The housing section 140 for paper may also be closed by moving the right hand 302 toward the farther side.

<Eighth Exemplary Embodiment>

In the exemplary embodiments discussed earlier, an operation that is similar to that performed in the case where the user interface section 110 is directly operated is implemented by a gesture. In the case where a specific portion as the operation target is designated by a gesture, the content displayed on the user interface section 110 may be switched to display including buttons associated with the designated portion.

Figure 43:
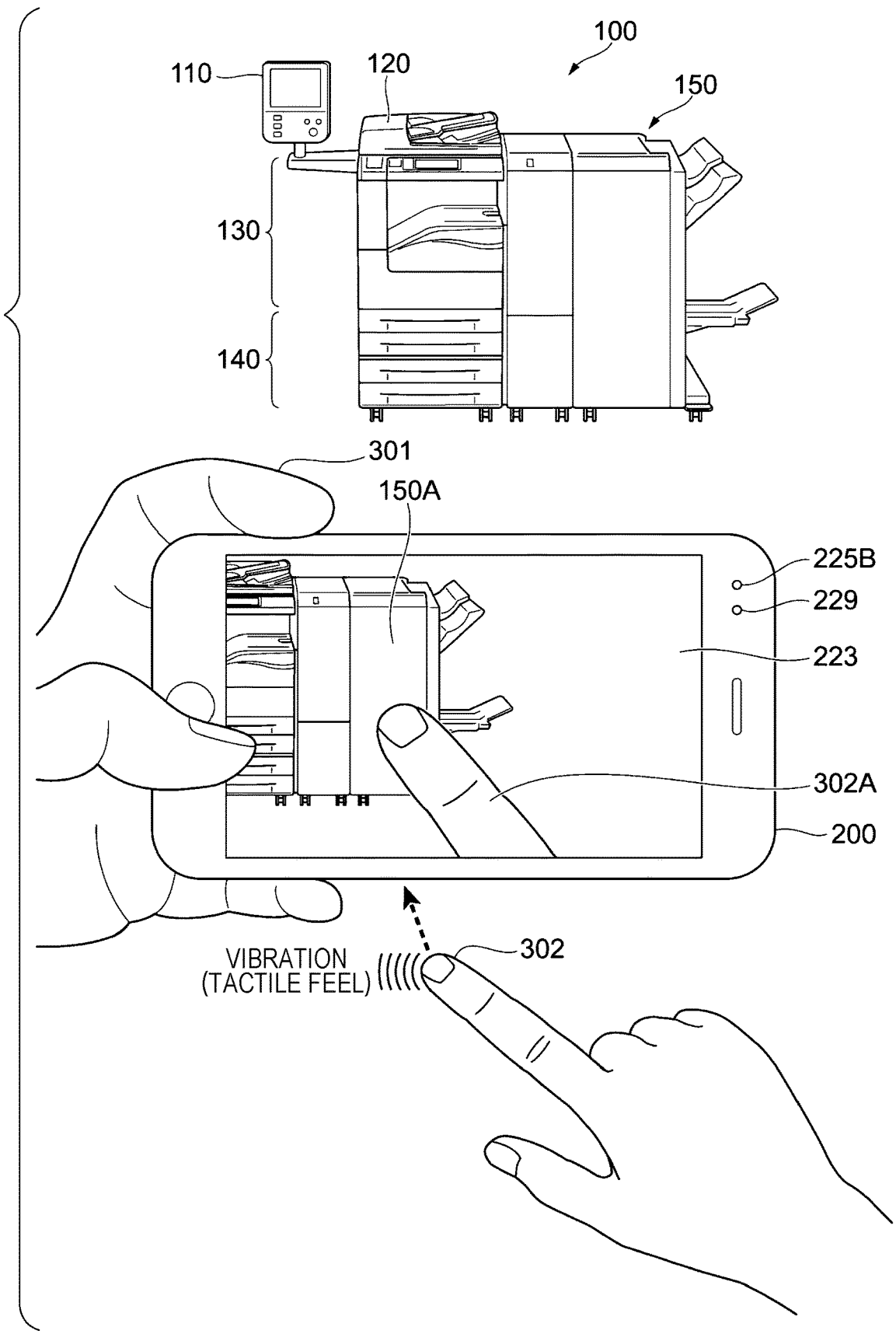
FIG. 43 illustrates an operation example for a case where a mechanism that applies a punching process or a binding process to printed paper is provided.

FIG. 43 illustrates an operation example for a case where a mechanism (post-processing apparatus 150) that applies a punching process or a binding process to printed paper is provided. The post-processing apparatus 150 may include a sorting mechanism.

In FIG. 43, the index finger image 302A is superposed on a post-processing apparatus image 150A.

In the case of the present exemplary embodiment, a select operation by the index finger image 302A and a function of opening the page for setting associated with the post-processing apparatus 150 are allocated to the post-processing apparatus image 150A.

FIGS. 44A to 44C illustrate screen variations caused on the display section 111 in the case where the post-processing apparatus image 150A (see FIG. 43) is selected by the index finger image 302A, in which FIG. 44A illustrates display before a gesture by the index finger image 302A is received, FIG. 44B illustrates display after a gesture by the index finger image 302A is received, and FIG. 44C illustrates an example of a screen of the smartphone 200 that receives an operation by a gesture.

In the case of FIGS. 44A to 44C, when the display section 111 of the user interface section 110 (see FIG. 43) is captured in an image by the smartphone 200, the display section 111 is switched to a screen including a button 110B for designating whether or not to execute a binding process, even if the display section 111 is not operated by a gesture.

As a matter of course, the portion to which a specific gesture and a specific function are allocated is not limited to the post-processing apparatus 150. For example, such a portion may be the back surface of the image forming apparatus 100 (see FIG. 1). In the case where selection by a gesture is received with a connection terminal or a communication line disposed on the back surface captured in an image, the display section 111 may display a menu screen that is used to adjust or set the connection terminal.

<Ninth Exemplary Embodiment>

In the exemplary embodiments discussed earlier, as illustrated in FIG. 2, the right hand 302 which is used to instruct an operation is moved in the air between a display surface (e.g. the liquid crystal display 223) and the user 300. However, the right hand 302 may be moved in the air between an object as the operation target and the smartphone 200.

The configuration of the entire system and the positional relationship between the user and the devices according to a ninth exemplary embodiment will be described below with reference to FIGS. 45 and 46.

FIG. 45 illustrates an example of the system according to the ninth exemplary embodiment.

FIG. 46 illustrates the positional relationship between the right hand 302 and the smartphone 200.

As seen from a comparison between FIGS. 45 and 1 and a comparison between FIGS. 46 and 2, the difference lies in the position of the right hand 302 of the user 300.

In the case of the present exemplary embodiment, an object (the image forming apparatus 100) as the operation target and the right hand 302 of the user are captured in an image at a time by the camera 225A. Therefore, in the case of the manner of use according to the present exemplary embodiment, it is not necessary to use the camera 225B which is provided on the same surface as the liquid crystal display 223 (see FIG. 7).

Also in the case of the present exemplary embodiment, the user is able to operate an object without touching the object.

In the case of the present exemplary embodiment, an index finger image captured by the camera 225A may be displayed, as it is, on the liquid crystal display 223.

The method of moving the right hand 302, which is used to input an operation, between the smartphone 200 and the image forming apparatus 100 as the operation target as in the present exemplary embodiment may be combined with any of the first to eighth exemplary embodiments discussed earlier.

<Tenth Exemplary Embodiment>

A case where the two types of operation methods discussed earlier are combined with each other will be described in relation to the present exemplary embodiment.

Figure 47A:
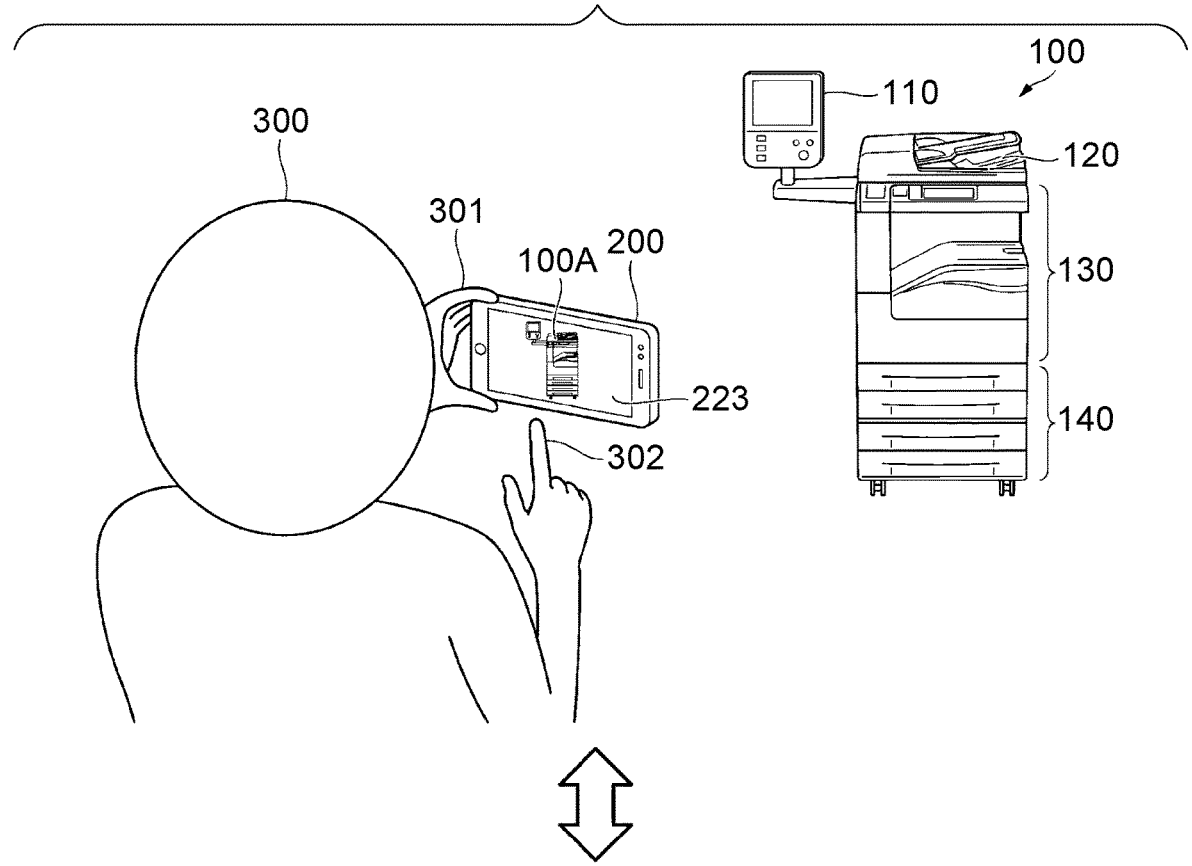
Figure 47B:
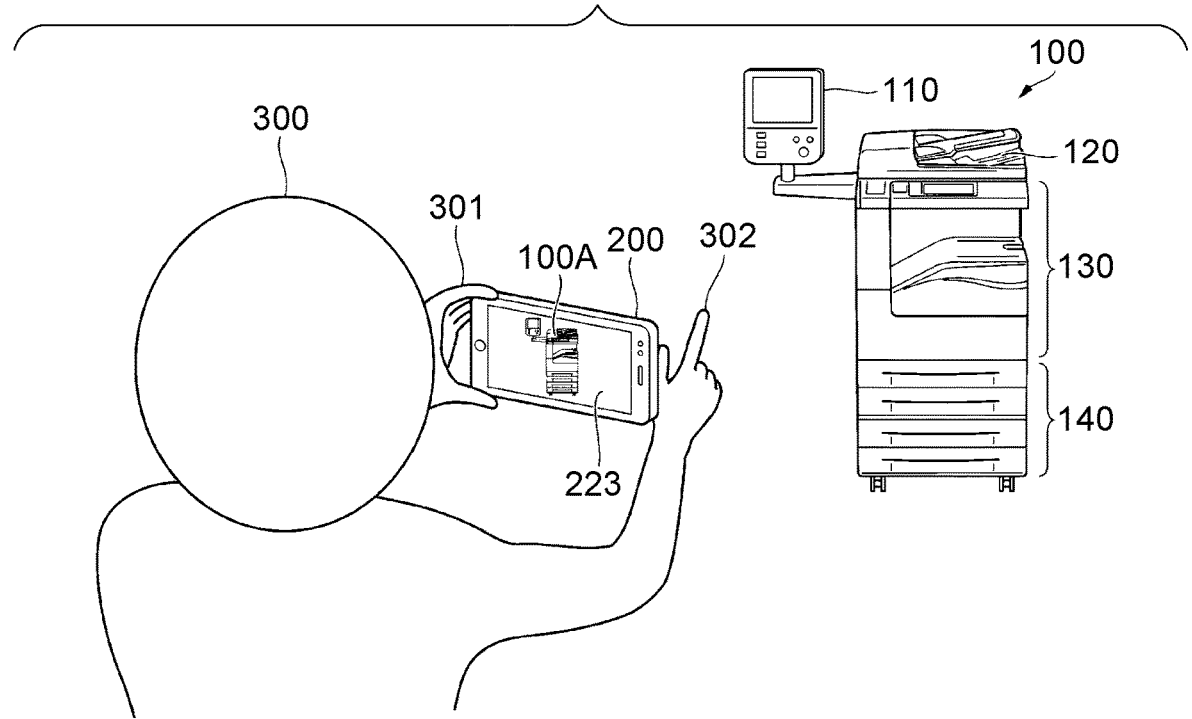

FIGS. 47A and 47B illustrate switching between two types of operation methods, in which FIG. 47A illustrates a method in which the right hand 302 is moved in the air between the liquid crystal display 223 and the user 300, and FIG. 47B illustrates a method in which the right hand 302 is moved in the air between the smartphone 200 and the image forming apparatus 100.

That is, the method in FIG. 47A corresponds to the first to eighth exemplary embodiments, and the method in FIG. 47B corresponds to the ninth exemplary embodiment.

The basic hardware configuration and functional configuration of the smartphone 200 according to the present exemplary embodiment are the same as those according to the first exemplary embodiment.

In the case of the present exemplary embodiment, the operation receiving section 254 (see FIG. 5) is additionally provided with a function of detecting whether input of an operation by the user 300 is executed in the space on the same side as the liquid crystal display 223 of the smartphone 200 or such input is executed in the space on the opposite side and determining the content of the operation on the basis of the result of the detection.

The operation receiving section 254 according to the present exemplary embodiment is set so as to receive different operations, even in the case where the object or portion as the operation target is the same and identical gestures by the user 300 are detected, if the gestures are performed in different spaces.

The operation receiving section 254 may alternatively be set so as not to differentiate such gestures from each other.

The setting may be individually changed by the user. Whether or not to differentiate such gestures from each other may be set for each of the individual functions associated with the object or portion or each user that executes the operations.

<Operation Example 1>

Figure 48A:
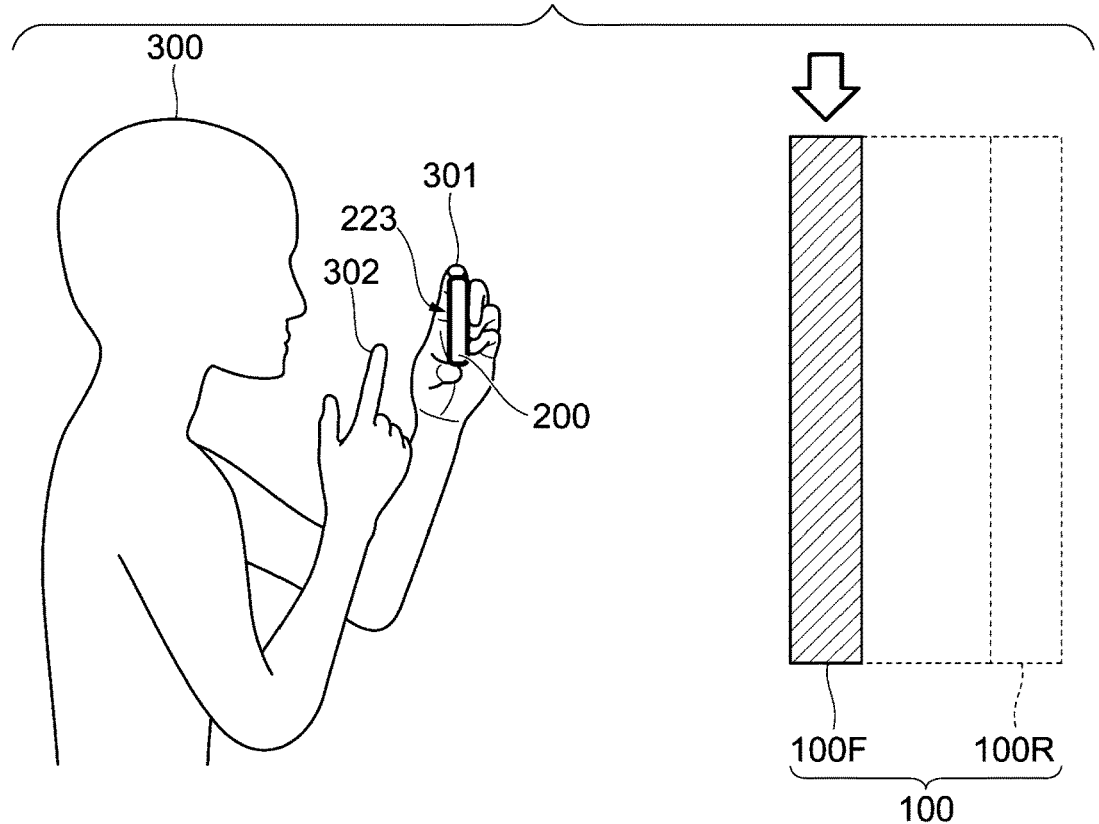
Figure 48B:
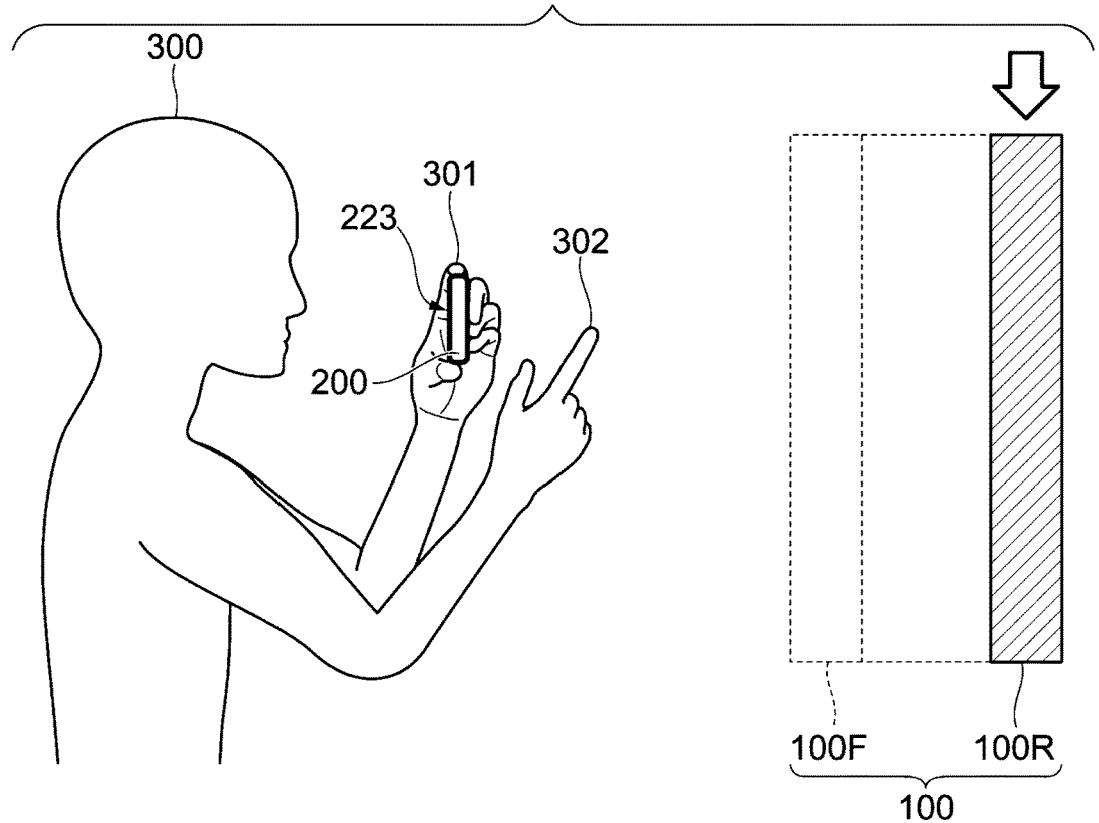

FIGS. 48A and 48B illustrate a case where a portion of an object as the operation target is switched between a case where an operation is performed on the closer side with respect to the smartphone 200 and a case where an operation is performed on the farther side with respect to the smartphone 200, in which FIG. 48A illustrates the relationship for a case where an operation by the user 300 is performed between the liquid crystal display 223 and the user 300, and FIG. 48B illustrates the relationship for a case where an operation by the user 300 is performed between the smartphone 200 and the image forming apparatus 100.

An operation corresponding to the motion of the user is determined in accordance with a combination of an object and a portion. Thus, different operations may be allocated to the same portion for different objects.

In the example in FIGS. 48A and 48B, an operation performed on the closer side with respect to the smartphone 200 is correlated with a front surface (surface on the closer side) 100F of the image forming apparatus 100, and an operation performed on the farther side with respect to the smartphone 200 is correlated with a back surface (surface on the farther side) 100R of the image forming apparatus 100.

In the case of this operation example, the user may perform an operation by a gesture in the space on the closer side or the farther side with respect to the smartphone 200 in accordance with whether he/she desires to operate the front surface or the back surface of the image forming apparatus 100.

For example, in the case where the user 300 moves the right hand 302 on the closer side with respect to the smartphone 200, the operation by the user is received as an operation on an operation element disposed on the front surface, even if an operation element is disposed on both the front surface and the back surface of the image forming apparatus 100.

In the case where the user 300 moves the right hand 302 on the farther side with respect to the smartphone 200, on the other hand, the operation by the user is received as an operation on an operation element disposed on the back surface, even if an operation element is disposed on both the front surface and the back surface of the image forming apparatus 100.

The back surface of the image forming apparatus 100 is not seeable from the position of the user 300, and display may be switched to an image of the back surface captured beforehand or prepared in advance. Such image switching is not necessary.

Functions disposed on the back surface are often smaller in number than those on the front surface, and also come in limited types. Therefore, even in the case where an image of the back surface is not displayed, a list of operable functions may be displayed to allow selection of a function to be correlated with an operation by the user 300.

<Operation Example 2>

Figure 49A:
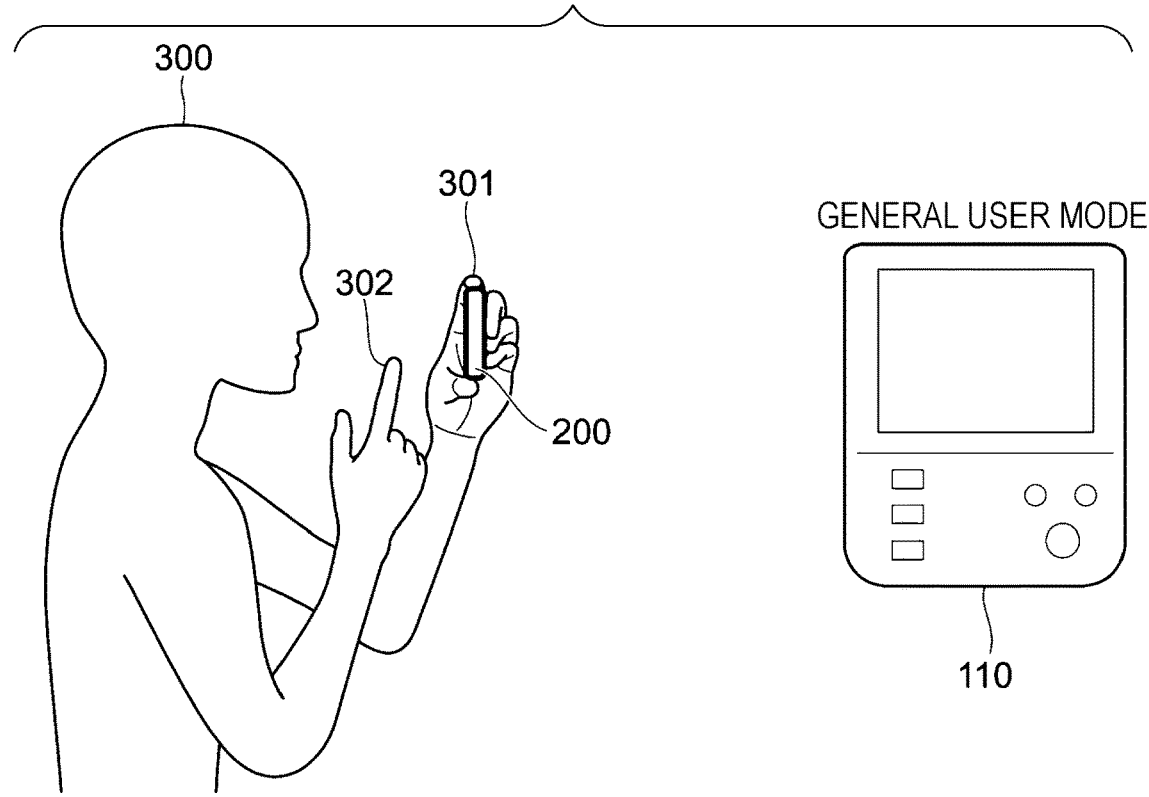
Figure 49B:
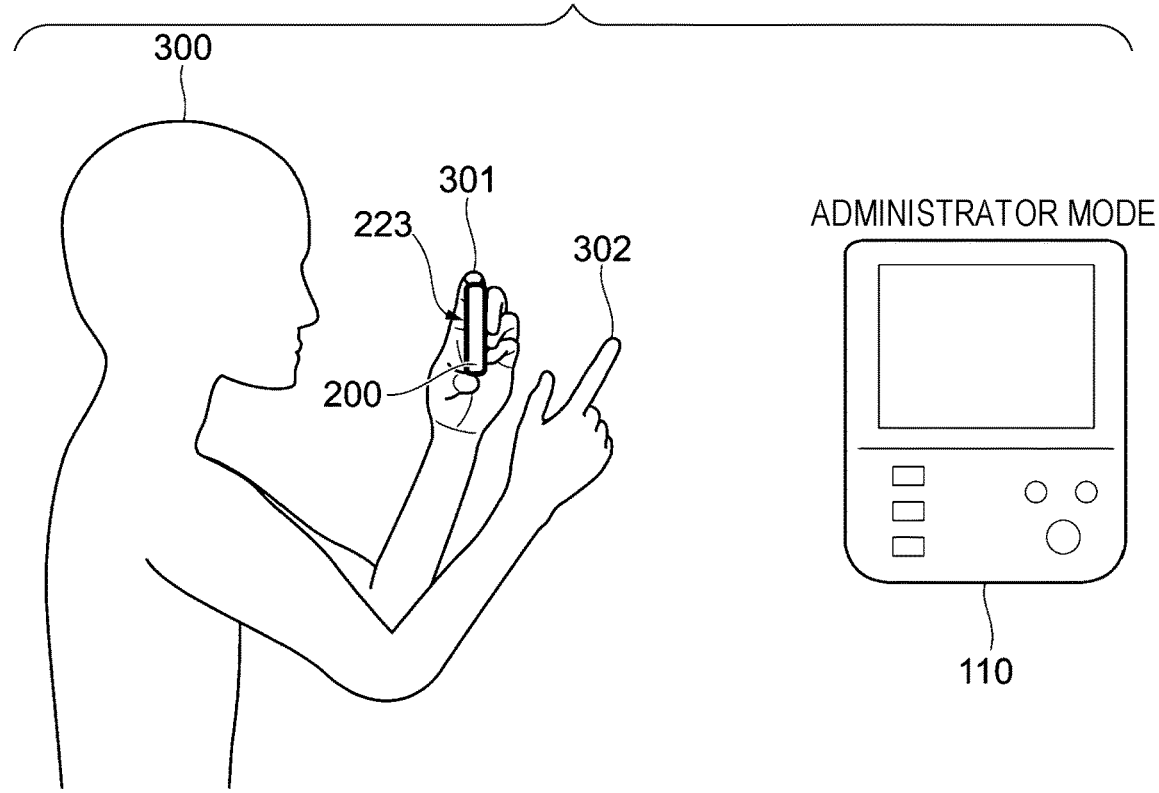

FIGS. 49A and 49B illustrate a case where an operation mode is switched between a case where an operation is performed on the closer side with respect to the smartphone 200 and a case where an operation is performed on the farther side with respect to the smartphone 200, in which FIG. 49A illustrates the relationship for a case where an operation by the user 300 is performed between the liquid crystal display 223 and the user 300, and FIG. 49B illustrates the relationship for a case where an operation by the user 300 is performed between the smartphone 200 and the image forming apparatus 100.

In the case of FIGS. 49A and 49B, the operation target is the same regardless of the difference in the position of an operation by the user 300. That is, the operation target is the user interface section 110 regardless of the difference in the position of an operation.

In the case of this operation example, however, an operation is executed in a general user mode in the case where the operation is performed on the closer side with respect to the smartphone 200, while an operation is executed in an administrator mode in the case where the operation is performed on the farther side with respect to the smartphone 200.

An operation may be performed in the administrator mode on condition that the user 300 is registered as an administrator.

Alternatively, an operation may be performed in the administrator mode only in the case where the user 300 successfully logs in to the image forming apparatus 100.

<Operation Example 3>

Figure 50A:
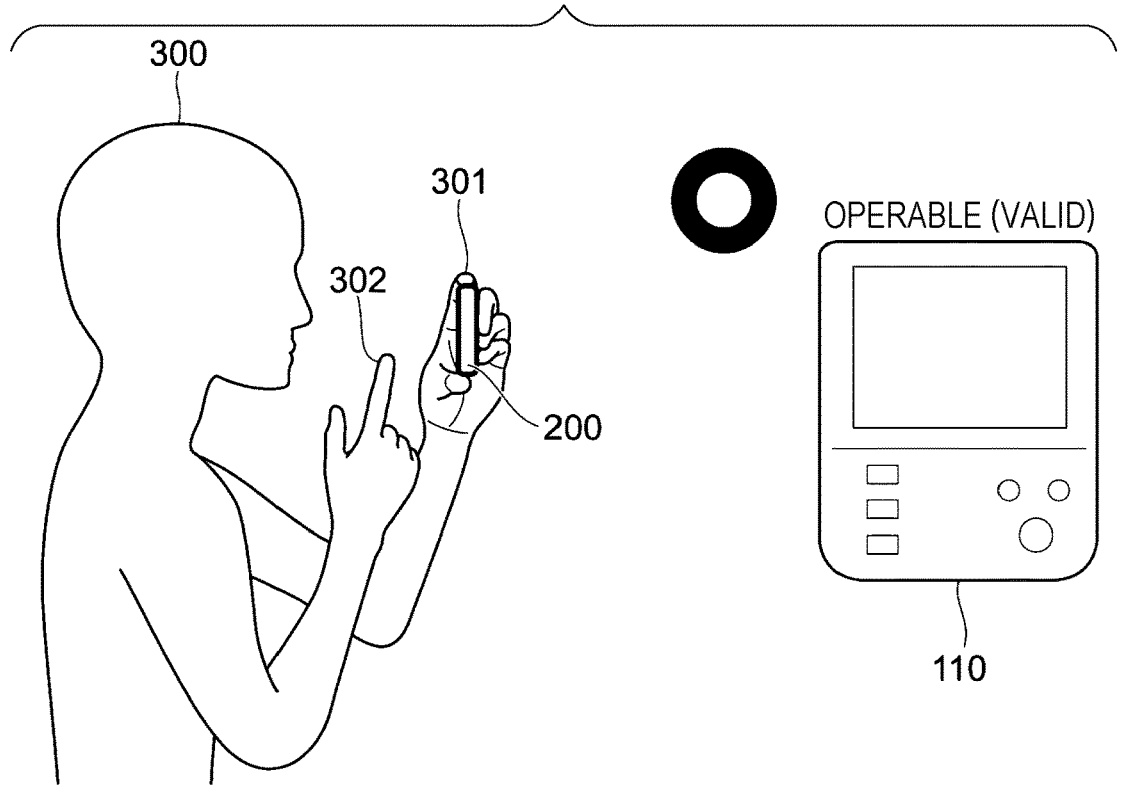
Figure 50B:
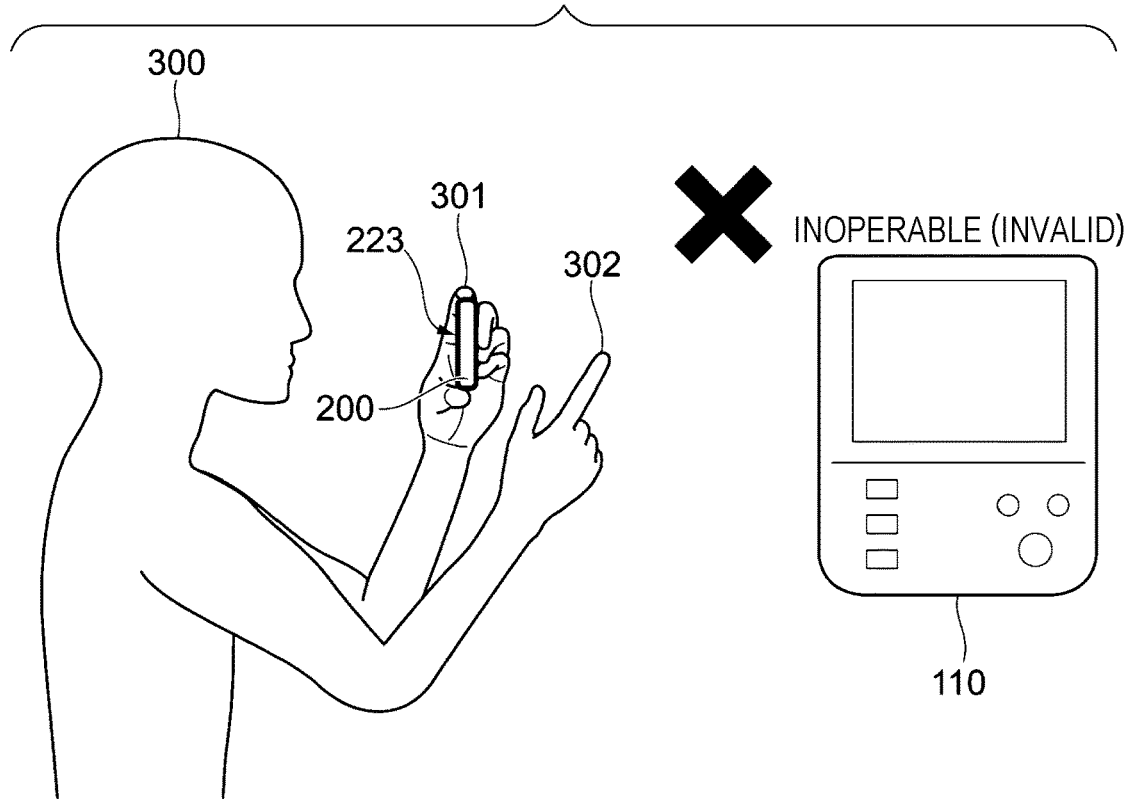

FIGS. 50A and 50B illustrate a case where an operation is set to be valid and invalid in accordance with a case where an operation is performed on the closer side with respect to the smartphone 200 and a case where an operation is performed on the farther side with respect to the smartphone 200, in which FIG. 50A illustrates a case where an operation by the user 300 is performed between the liquid crystal display 223 and the user 300, and FIG. 50B illustrates a case where an operation by the user 300 is performed between the smartphone 200 and the image forming apparatus 100.

In the case of FIGS. 50A and 50B, an operation performed on the closer side with respect to the smartphone 200 is received as a valid operation, while an operation performed on the farther side with respect to the smartphone 200 is received as an invalid operation.

That is, an operation on the user interface section 110 is enabled in the case where the operation is performed on the closer side with respect to the smartphone 200, while an operation on the user interface section 110 is disabled in the case where the operation is performed on the farther side with respect to the smartphone 200.

It is desirable that this setting should be changeable by the user 300.

Figure 51:
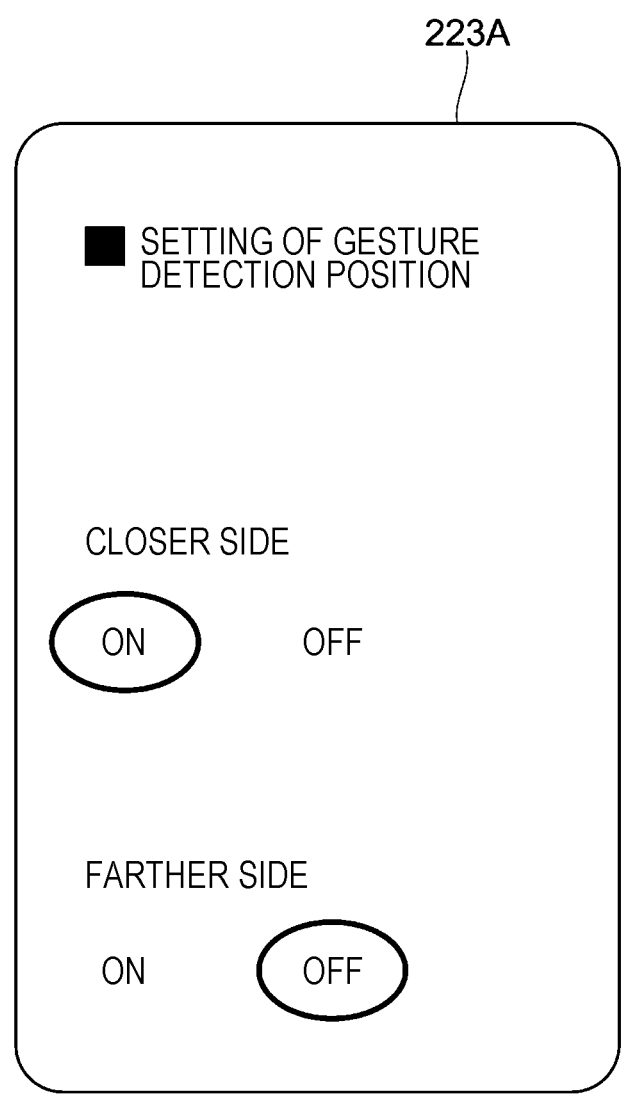
FIG. 51 illustrates an example of a screen for setting displayed on the liquid crystal display.

FIG. 51 illustrates an example of a screen 223A for setting displayed on the liquid crystal display 223.

The screen 223A illustrated in FIG. 51 is used to set the position at which a gesture is to be detected, and corresponds to an example in which a function of detecting a gesture performed on the closer side with respect to the smartphone 200 is set to on and a function of detecting a gesture performed on the farther side is set to off.

The setting in FIG. 51 corresponds to the operation example illustrated in FIGS. 50A and 50B.

The setting of the position at which a gesture is to be detected may be determined for each function.

FIG. 52 illustrates an example of a screen 223B on which the setting of the position at which a gesture is to be detected is determined for each function.

Operations for function A and function D are valid both in the case where an operation by the user is performed on the closer side with respect to the smartphone 200 and in the case where such an operation is performed on the farther side with respect to the smartphone 200, for example.

Operations for function B and function F are valid only in the case where an operation by the user is performed on the farther side with respect to the smartphone 200, for example.

Operations for function C and function E are valid only in the case where an operation by the user is performed on the closer side with respect to the smartphone 200, for example.

<Eleventh Exemplary Embodiment>

In the present exemplary embodiment, an operation screen is displayed as an aerial image.

Figure 53:
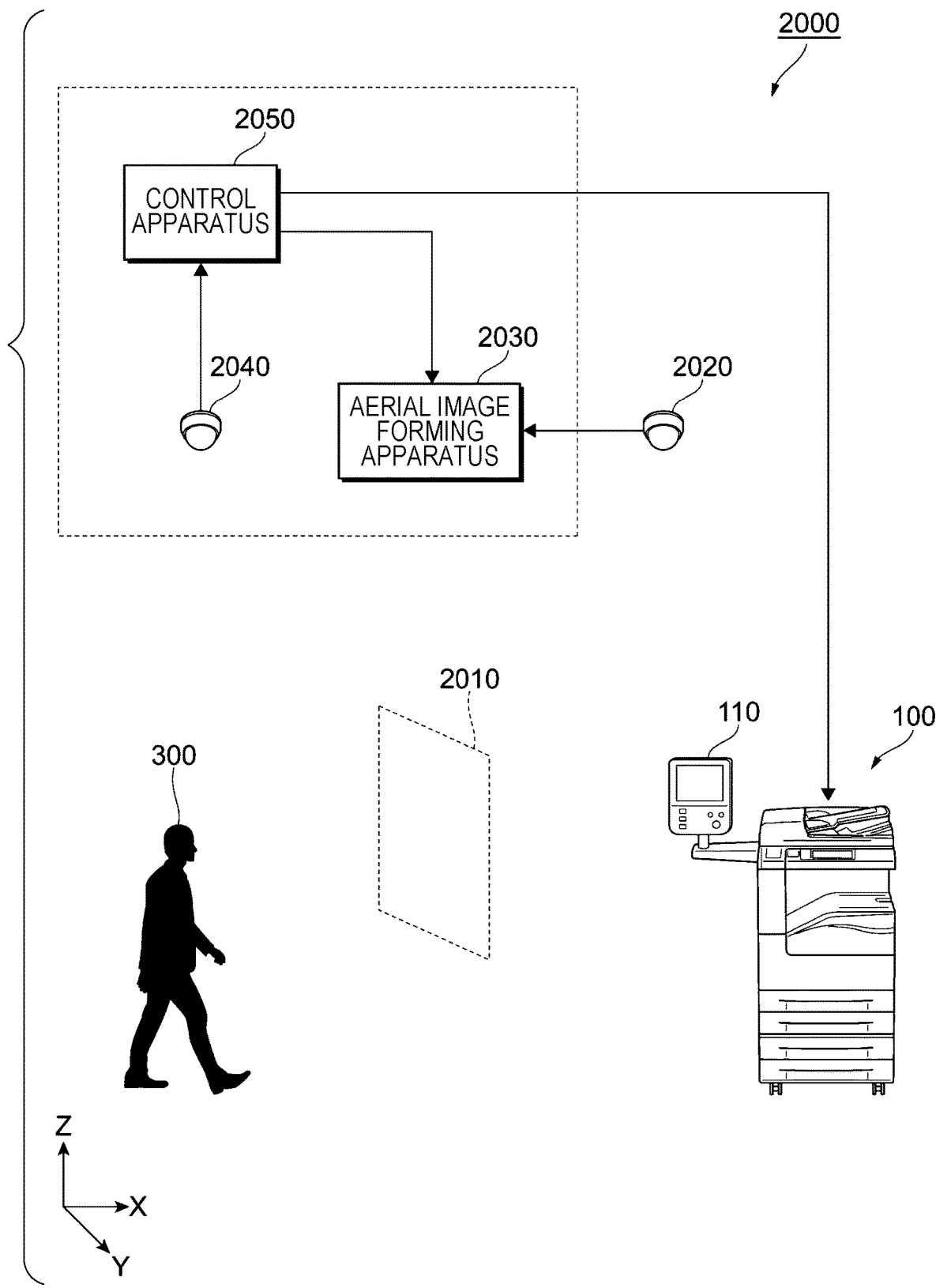
FIG. 53 illustrates a schematic configuration of an aerial image forming system according to an eleventh exemplary embodiment.

FIG. 53 illustrates a schematic configuration of an aerial image forming system 2000 according to an eleventh exemplary embodiment. The aerial image forming system 2000 is an example of an information processing system.

In the present exemplary embodiment, an aerial image 2010 is an image formed in the air so as to reproduce a state of light that is equivalent to that of light reflected from an object.

The aerial image 2010 is formed so as to float in the air, and thus a person is able to pass through the aerial image 2010.

In the case of the present exemplary embodiment, an image of an object (e.g. the user interface section 110 of the image forming apparatus 100) as the target to be operated by the user 300 is displayed in the aerial image 2010.

In the case of FIG. 53, an image of the user interface section 110 is captured by a camera 2020, and provided to an aerial image forming apparatus 2030.

In the case of the present exemplary embodiment, an image (e.g. "AAAAA/AAAAA/AAAAA/AAAAA" with the symbol "/" indicating a line break) of the operation target is displayed in the aerial image 2010. However, a different image may be displayed.

Not only a still image but also a moving image may be displayed in the aerial image 2010.

In FIG. 53, the aerial image 2010 has a rectangular outer edge. However, the shape of the outer edge of the aerial image 2010 may be determined as desired. For example, a space in which an image of an object is formed may be the entirety of a space in which the aerial image 2010 is formed. Examples of the aerial image 2010 here include an image of a button for operation, an image of a person, an image of an animal, an image of a product, and an image of a fruit.

In FIG. 53, the aerial image 2010 has a planar shape. However, the aerial image 2010 may have a three-dimensional shape such as a curved surface shape, a spherical shape, and a cubic shape.

While the aerial image 2010 is occasionally disposed independently, a plurality of aerial images 10 may be disposed in one space.

The aerial image forming system 2000 illustrated in FIG. 53 includes an aerial image forming apparatus 2030 that forms an aerial image 2010 in the air, a camera 2040 that captures an image of an operation on the aerial image 2010 by the user 300, and a control apparatus 2050 that controls motion of the aerial image forming apparatus 2030 and the image forming apparatus 100 on the basis of the motion of the user 300 captured in an image.

The aerial image forming apparatus 2030 according to the present exemplary embodiment is an example of an image forming unit.

The control apparatus 2050 is common to the exemplary embodiments discussed earlier in that the content of an operation is specified by combining motion of the user 300 made on the aerial image 2010 and the position at which such motion is detected.

The control apparatus 2050 specifies the content of an operation using a technology (image recognition) of recognizing an image input from the camera 2040.

The control apparatus 2050 here is an example of an information processing apparatus that controls the image forming apparatus 100 in accordance with the specified content.

Although the control apparatus 2050 according to the present exemplary embodiment differs from the other exemplary embodiments in that the control apparatus 2050 is not used in contact with the user 300, the control apparatus 2050 is common to the other exemplary embodiments in the content of an operation to be executed.

The camera 2040 is disposed at a position at which the camera 2040 is able to capture motion of a hand or a fingertip of the user 300 in an image, for example.

While FIG. 53 illustrates a case where one camera 2040 is provided, a plurality of cameras 2040 may be provided. The plurality of cameras 2040 may be different from each other in the attachment position or the image capture direction. Different attachment positions and different image capture directions reduce blind spots, enhancing the precision in the detection or specification of an operation by the user 300.

While the camera 2040 is used in FIG. 53, a different type of sensor may also be used. For example, a sensor that detects an object that crosses a detection plane formed in parallel with the aerial image 2010 may also be used. The detection plane is formed by an infrared ray, for example.

Figure 54:
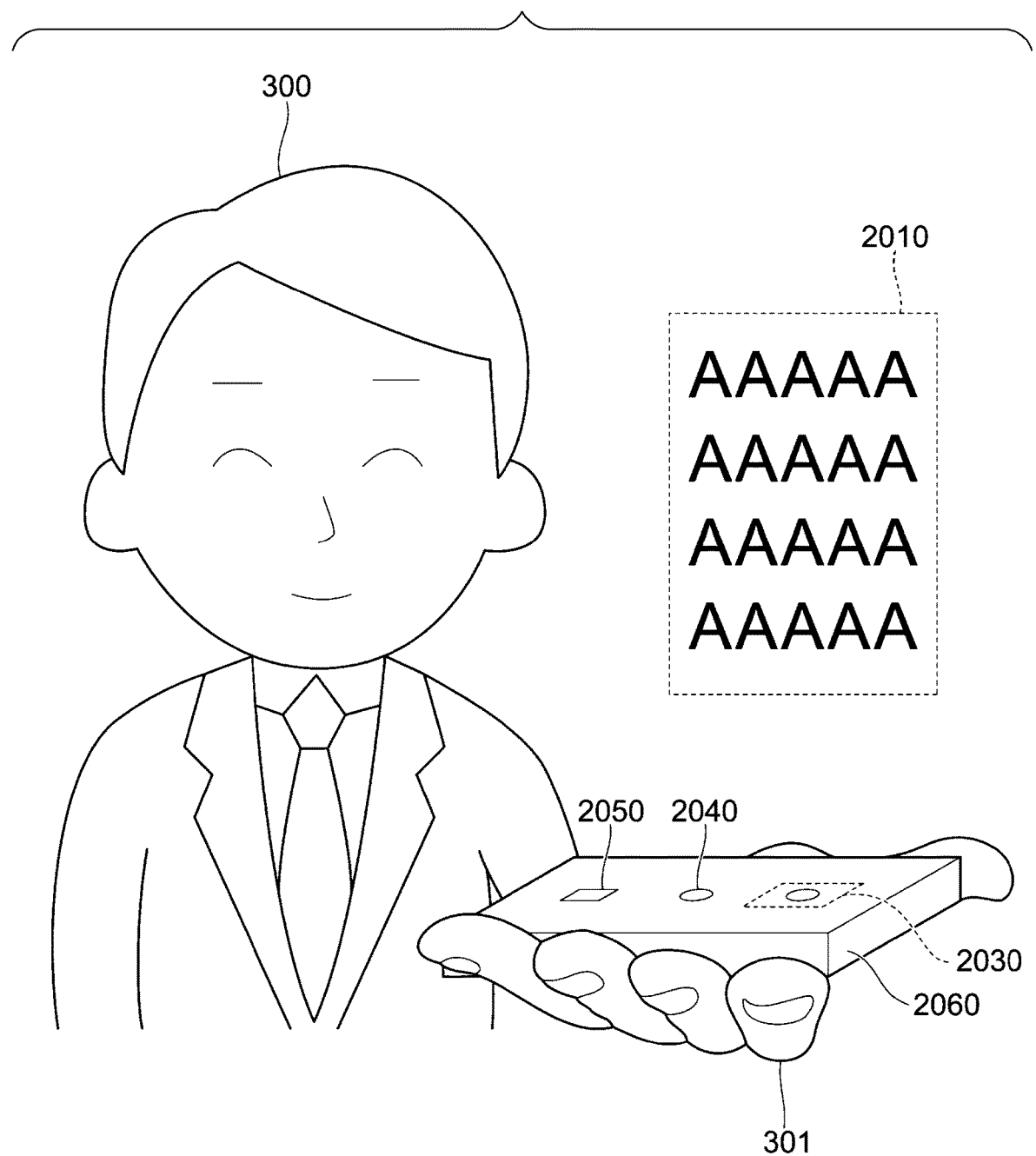
FIG. 54 illustrates an example of a portable device that forms an aerial image.

FIG. 54 illustrates an example of a portable device 2060 that forms an aerial image 2010.

In the case of FIG. 54, the user 300 holds the device 2060 with the left hand 301. The aerial image forming apparatus 2030, the camera 2040, and the control apparatus 2050 are housed in the device 2060. The device 2060 is not limited to a portable type, and may be movable together with a housing therefor.

Figure 55A:
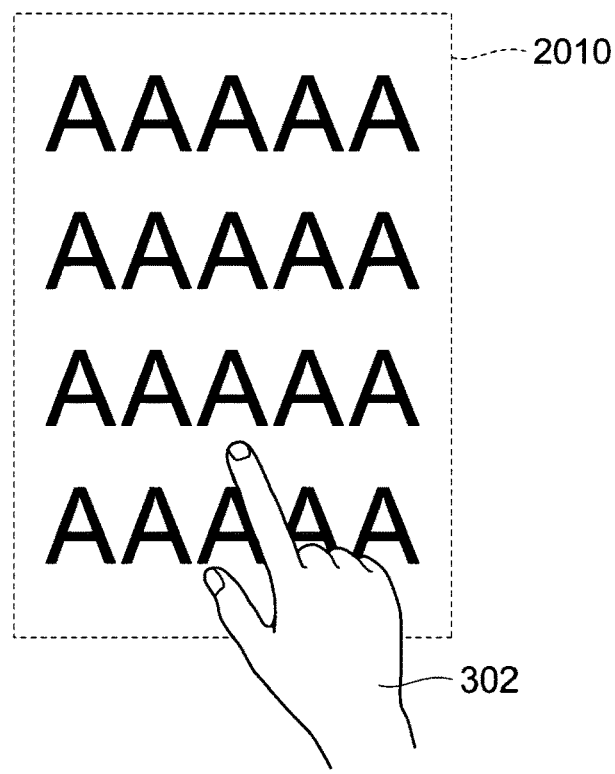
Figure 55B:
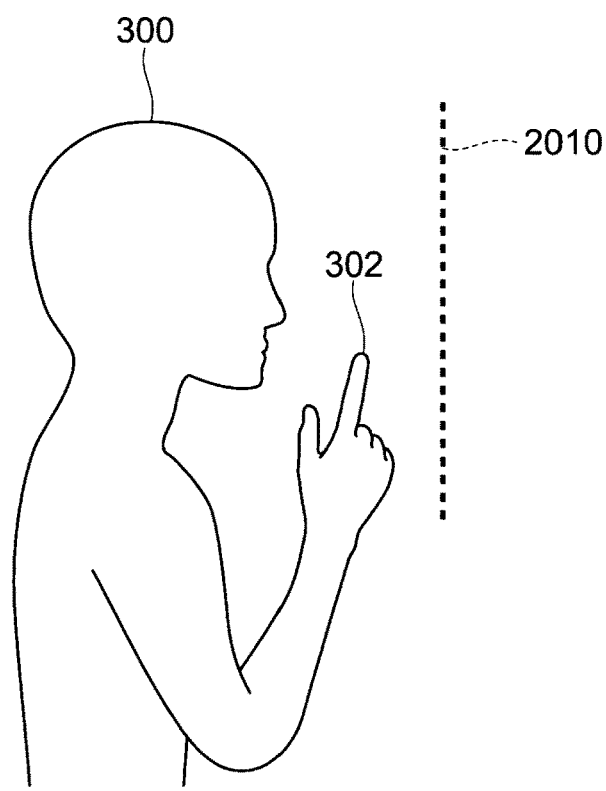

FIGS. 55A and 55B illustrate an example in which an object (e.g. the image forming apparatus 100) is operated by moving the right hand 302 at a position on the closer side with respect to the aerial image 2010, in which FIG. 55A illustrates how the aerial image 2010 and the right hand 302 look as seen from the user 300, and FIG. 55B illustrates the positional relationship among the user 300, the aerial image 2010, and the right hand 302.

Figure 56A:
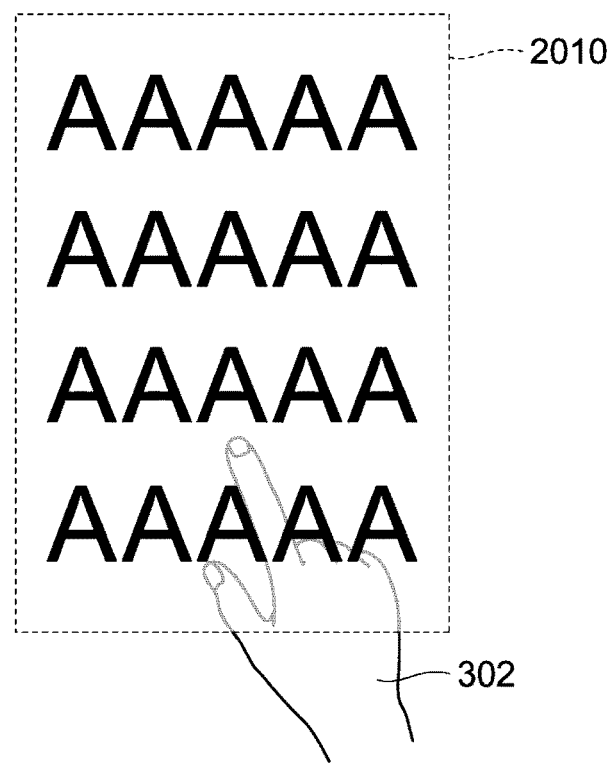
Figure 56B:
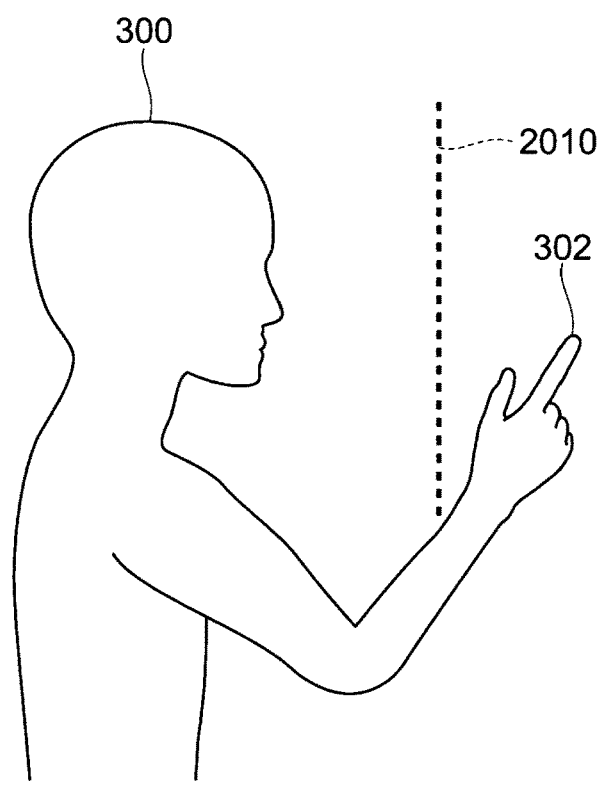

FIGS. 56A and 56B illustrate an example in which an object (e.g. the image forming apparatus 100) is operated by moving the right hand 302 at a position on the farther side with respect to the aerial image 2010, in which FIG. 56A illustrates how the aerial image 2010 and the right hand 302 look as seen from the user 300, and FIG. 56B illustrates the positional relationship among the user 300, the aerial image 2010, and the right hand 302.

The device 2060 according to the present exemplary embodiment detects whether the right hand 302 is positioned on the closer side or the farther side with respect to the aerial image 2010, and changes the content of control in accordance with the result of the detection.

A specific example of the aerial image forming apparatus 2030 will be described below.

Figure 57A:
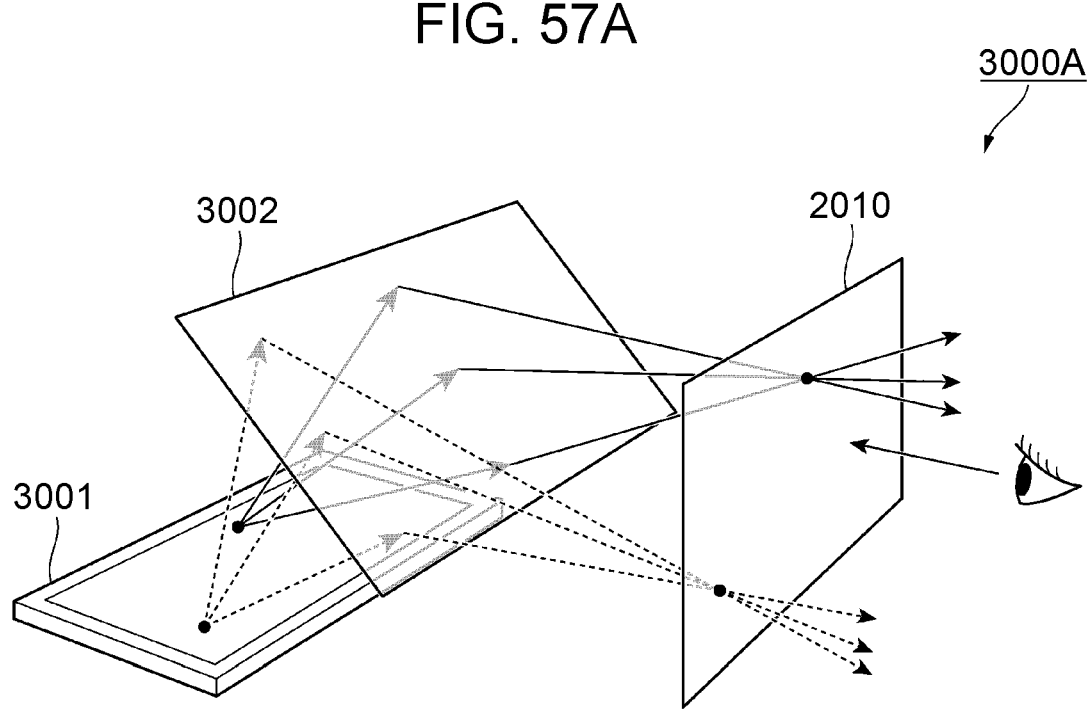
Figure 57B:
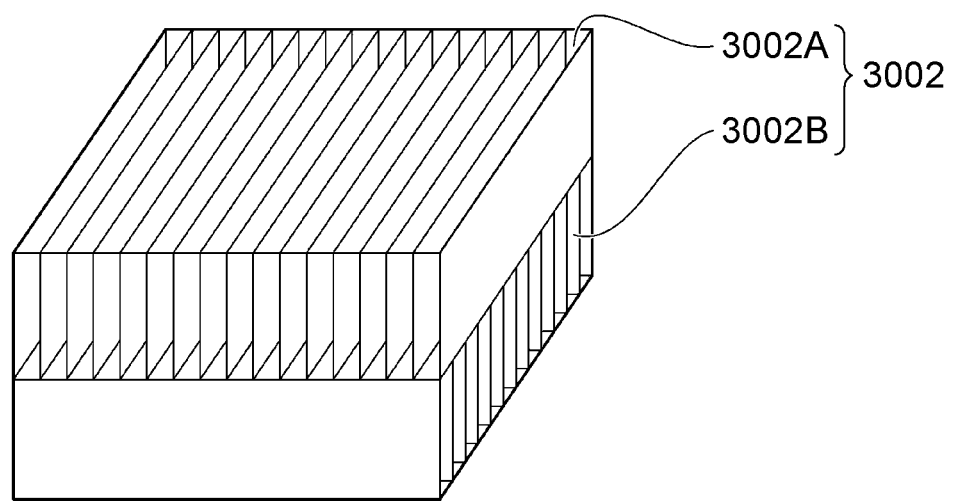

FIGS. 57A and 57B illustrate the principle of an aerial image forming apparatus 3000A that forms an aerial image 2010 by allowing light output from a display device 3001 to pass through a dedicated optical plate 3002, in which FIG. 57A illustrates the positional relationship between members and the aerial image 2010, and FIG. 57B illustrates a part of the sectional structure of the optical plate 3002. The display device 3001 and the optical plate 3002 are examples of an optical component.

The optical plate 3002 has a structure in which a plate in which short strips of glass 3002A with a wall surface used as a mirror are arranged and a plate in which short strips of glass 3002B are arranged in a direction that is orthogonal to that of the short strips of glass 3002A are vertically stacked on each other.

The optical plate 3002 reproduces an image displayed on the display device 3001 in the air by reflecting light output from the display device 3001 twice using the short strips of glass 3002A and 3002B to form an image in the air.

The distance between the display device 3001 and the optical plate 3002 and the distance between the optical plate 3002 and the aerial image 2010 are equal to each other. The dimensions of an image displayed on the display device 3001 and the dimensions of the aerial image 2010 are equal to each other.

Figure 58:
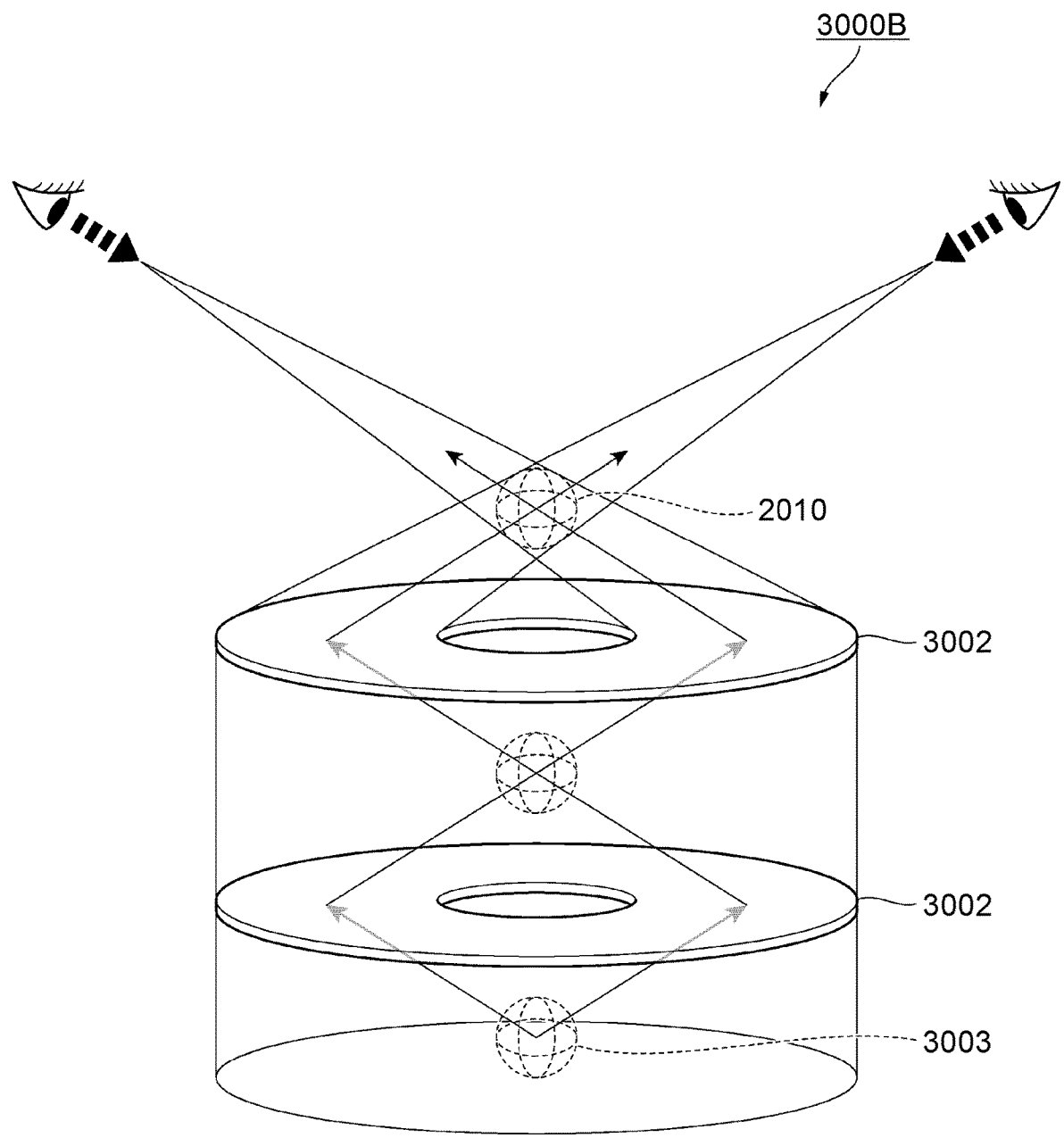
FIG. 58 illustrates the principle of an aerial image forming apparatus that forms a three-dimensional image as an aerial image.

FIG. 58 illustrates the principle of an aerial image forming apparatus 3000B that forms a three-dimensional image as an aerial image 2010. The aerial image forming apparatus 3000B reproduces a three-dimensional image (aerial image 2010) in the air by allowing light reflected by a surface of an actual object 3003 to pass through two optical plates 3002 in a ring shape. It is not necessary that the optical plates 3002 should be disposed in series with each other.

Figure 59A:
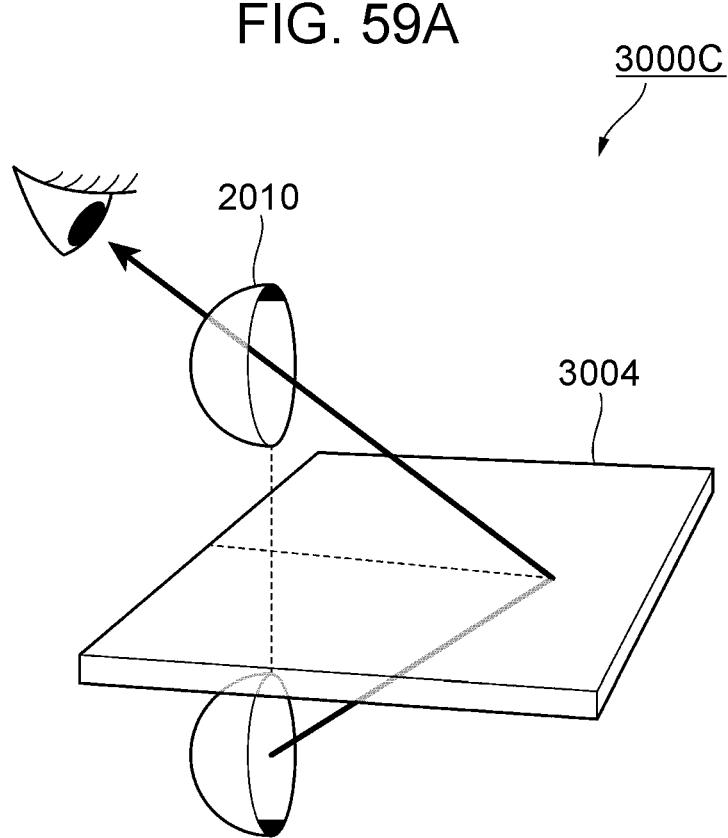
Figure 59B:
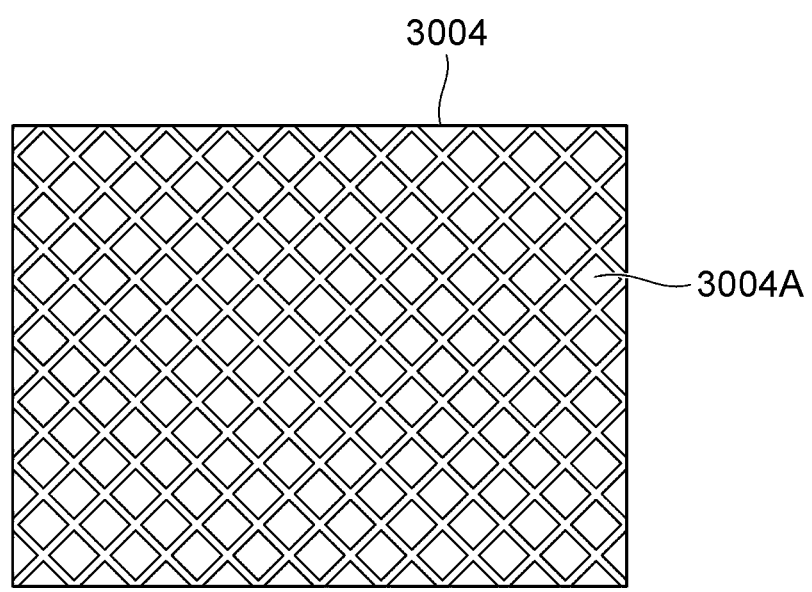

FIGS. 59A and 59B illustrate the principle of an aerial image forming apparatus 3000C that forms an aerial image 2010 using a micro mirror array 3004 with a structure in which minute rectangular holes 3004A that constitute a two-face corner reflector are arranged at equal intervals in a plane, in which FIG. 59A illustrates the positional relationship between members and the aerial image 2010, and FIG. 59B illustrates a part of the micro mirror array 3004 as enlarged. One hole 3004A is formed as a square, 100 µm each side, for example. The micro mirror array 3004 is an example of an optical component.

Figure 60:
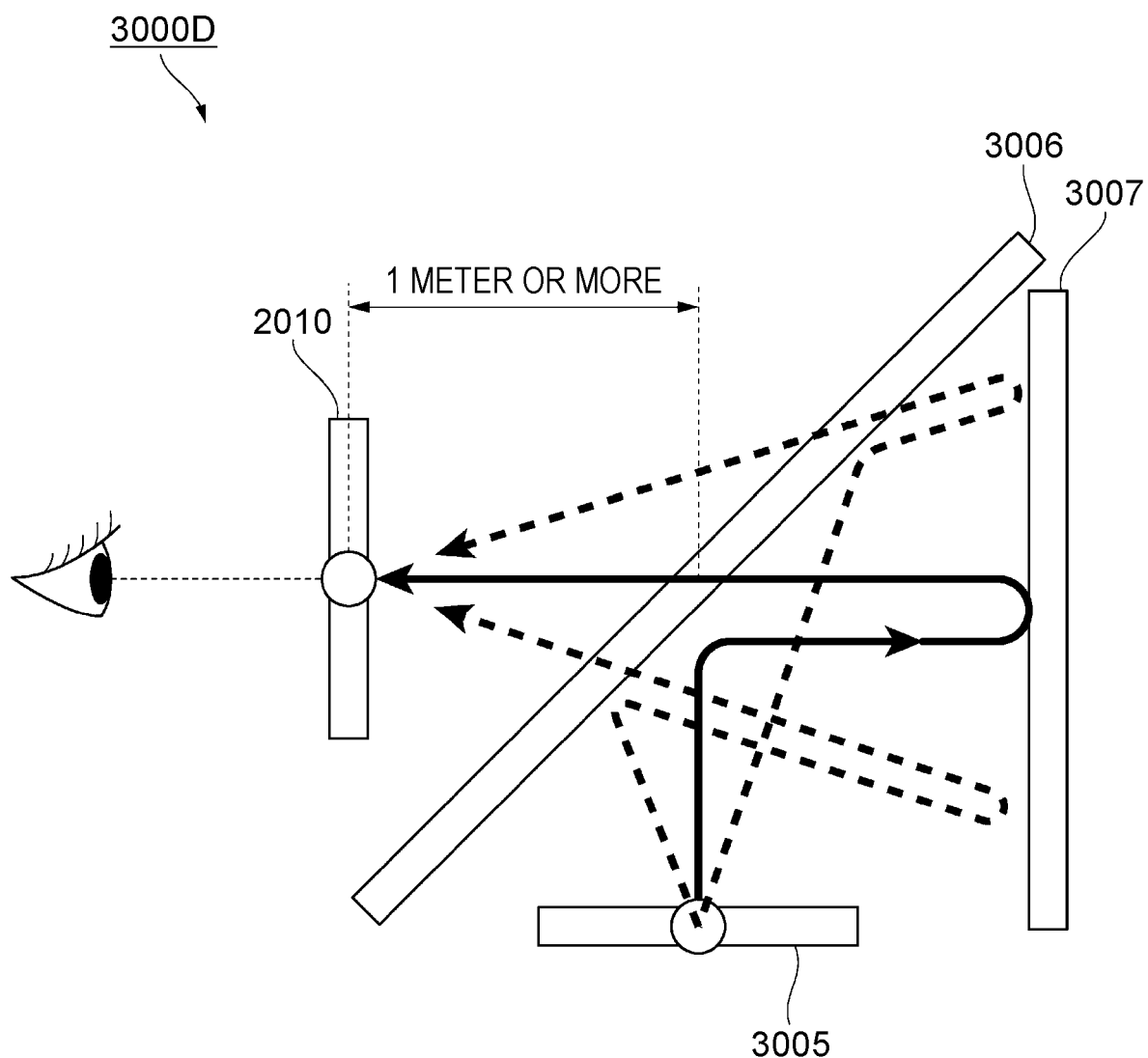
FIG. 60 illustrates the principle of an aerial image forming apparatus that uses a beam splitter and a retroreflective sheet.

FIG. 60 illustrates the principle of an aerial image forming apparatus 3000D that uses a beam splitter 3006 and a retroreflective sheet 3007. The beam splitter 3006 is disposed at an angle of 45° with respect to a display surface of a display device 3005.

The retroreflective sheet 3007 is disposed at an angle of 90° with respect to the display surface of the display device 3005 in the direction of reflection of a display image by the beam splitter 3006. The display device 3005, the beam splitter 3006, and the retroreflective sheet 3007 are examples of an optical component.

In the case of the aerial image forming apparatus 3000D, light output from the display device 3005 is reflected by the beam splitter 3006 in the direction of the retroreflective sheet 3007, next retroreflected by the retroreflective sheet 3007, and passes through the beam splitter 3006 to form an image in the air. The aerial image 2010 is formed at the position at which light forms an image.

Figure 61:
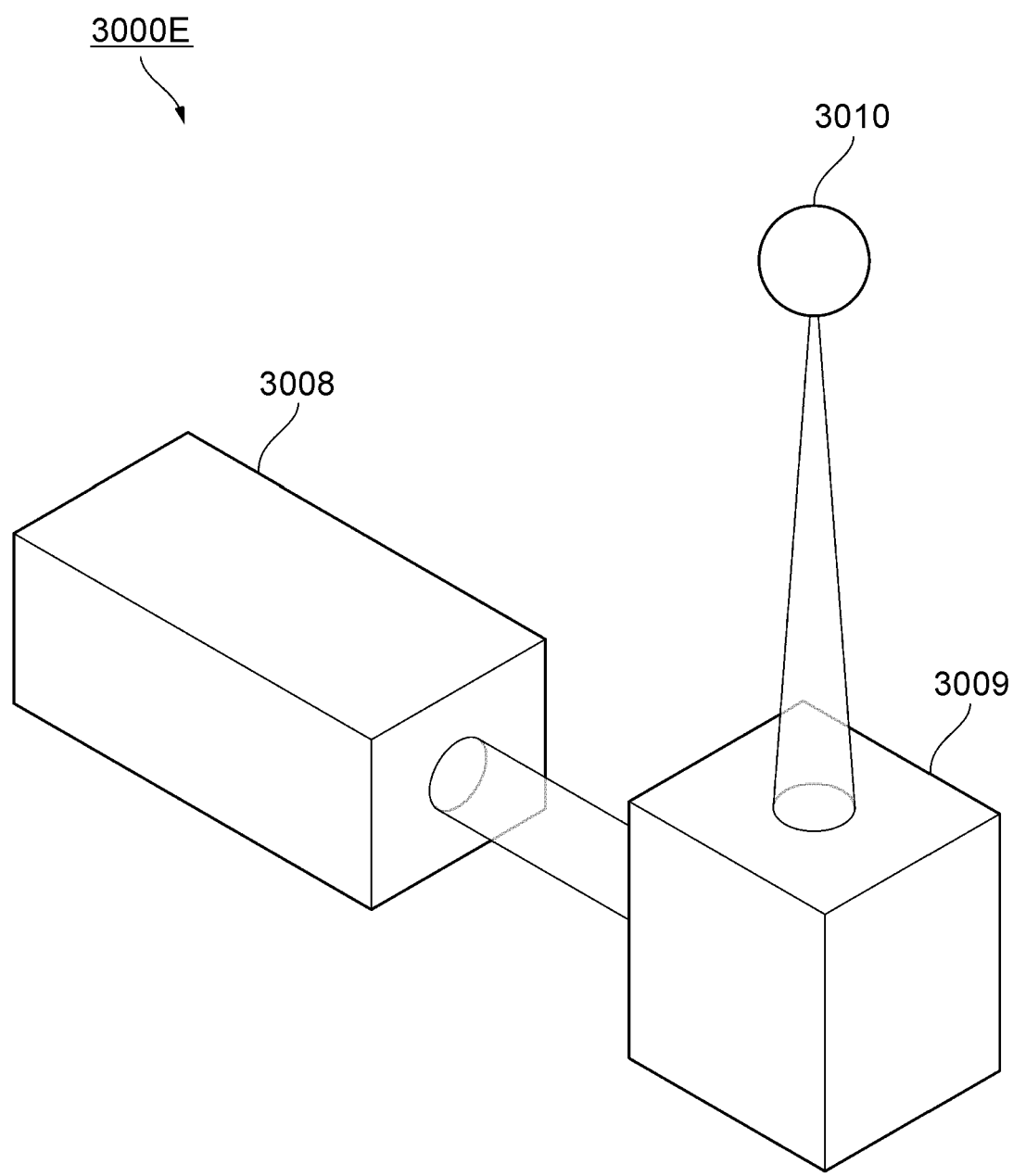
FIG. 61 illustrates the principle of an aerial image forming apparatus that forms an aerial image as a collection of plasma light emitting bodies.

FIG. 61 illustrates the principle of an aerial image forming apparatus 3000E that forms an aerial image 2010 as a collection of plasma light emitting bodies.

In the case of the aerial image forming apparatus 3000E, an infrared pulse laser 3008 outputs pulsed laser light, and an XYZ scanner 3009 condenses the pulsed laser light in the air. At this time, a gas in the vicinity of the focal point 3010 is momentarily formed into plasma to emit light. The pulse frequency is 100 Hz or less, for example, and the pulsed light emission time is in the nano second order, for example. The infrared pulse laser 3008 and the XYZ scanner 3009 are examples of an optical component.

<Other Exemplary Embodiments>

While exemplary embodiments of the present disclosure have been described above, the technical scope of the present disclosure is not limited to the exemplary embodiments discussed above. It is apparent from the following claims that a variety of modifications and improvements that may be made to the exemplary embodiments discussed above also fall within the technical scope of the present disclosure.

(1) For example, in the exemplary embodiments discussed earlier, the smartphone 200 (see FIG. 1) or the glass-type terminal (see FIG. 27) is used to operate an object that is present in the real space. However, the information processing apparatus that receives a gesture by the user as an operation may be a tablet terminal, a so-called digital camera, a toy such as a gaming device, a watch-type wearable terminal, or a contact lens with a built-in camera, for example, that includes a camera for image capture, a display section, and a communication section. The contact lens with a built-in camera is an example of the wearable terminal, and is also called a "smart contact lens". The smart contact lens includes a camera, an antenna, and an electronic component (such as a transmission/reception circuit and a signal processing circuit), for example, disposed in a lens that is used in contact with a cornea, and is operable through blinking. Operations for shutter release, zooming, aperture setting, and focusing, for example, may be performed.

(2) In the exemplary embodiments discussed earlier, the smartphone 200 executes a process of receiving motion of a part of the body of the user captured in an image by the smartphone 200 as an operation. However, the smartphone 200 may be used as a unit that captures an image of motion of a part of the body, and an external apparatus (e.g. a server) may execute a process of receiving such motion as an operation.

(3) In the exemplary embodiments discussed earlier, a glove is described as an example of an object that decorates a part of the body of the user in accordance with the situation of use. However, a garment or the like may be added as decoration. Nails may be manicured on the screen. In the case where an operation is performed using a foot, footwear that matches the situation of use may be added as decoration. Examples of the footwear include a business shoe, a sports shoe, a sandal, and a boot.

(4) In the case of the exemplary embodiments discussed earlier, an aerial image is generated by one of the schemes illustrated in FIGS. 57A and 57B to 61. However, the method of generating an aerial image is not limited thereto. For example, an aerial image may be generated using a so-called hologram method.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a first image capturing device;
a second image capturing device; and
a processing circuit configured to:
detect a motion of a user made between a display surface that displays an image of an object to be operated and the user, the image of the object being captured by the first image capturing device, the motion of the user being detected based on an image captured by the second image capturing device different from the first image capturing device, the motion of the user being made without contact with the display surface; and
instruct the object to execute an operation corresponding to the detected motion of the user.

2. The information processing apparatus according to claim 1,
wherein the image of the object is displayed on the display surface on a basis of a captured image captured by the first image capturing device.

3. The information processing apparatus according to claim 1,
wherein the processing circuit detects motion of a hand or a finger of the user by processing a captured image captured by the second image capturing device.

4. The information processing apparatus according to claim 1,
wherein the processing circuit detects motion of a hand or a finger of the user using information on a measured distance.

5. The information processing apparatus according to claim 1,
wherein an image of a hand or a finger of the user is displayed on the display surface as superposed on the image of the object.

6. The information processing apparatus according to claim 1,
wherein the operation corresponding to the motion of the user is prepared for each of individual portions of the object.

7. The information processing apparatus according to claim 1,
wherein the processing circuit instructs the object to execute the operation in a case where the user is permitted to operate the object.

8. The information processing apparatus according to claim 1,
wherein the user is notified in a case where the object is unable to execute the operation corresponding to the detected motion of the user.

9. The information processing apparatus according to claim 8,
wherein the user is notified of a method of correctly operating the object.

10. The information processing apparatus according to claim 1,
wherein the processing circuit determines a content of the operation corresponding to the detected motion of the user in accordance with the object.

11. The information processing apparatus according to claim 1,
wherein the processing circuit acquires a function of the object that is operable through communication with the object.

12. The information processing apparatus according to claim 1,
wherein the processing circuit displays an indication that suggests a portion of a body of the user as superposed on the object.

13. The information processing apparatus according to claim 1,
wherein the processing circuit notifies the user that the motion of the user has been received as an operation.

14. The information processing apparatus according to claim 13,
wherein the user is notified through a tactile feel at a portion of a body of the user moved without contact with respect to the display surface.

15. The information processing apparatus according to claim 13,
wherein the processing circuit displays a portion of a body whose motion has been received as an operation in a manner that is different from that before reception.

16. The information processing apparatus according to claim 1,
wherein the processing circuit displays equipment that is used to operate the object as superposed on a body of the user.

17. The information processing apparatus according to claim 1,
wherein the processing circuit displays equipment that matches an environment in which the object is present as superposed on a body of the user.

18. The information processing apparatus according to claim 1,
wherein the processing circuit instructs a different device that includes a movable section to execute the operation corresponding to the motion of the user in a case where the operation requires a physical operation on the object.

19. The information processing apparatus according to claim 1,
wherein the image of the object displayed on the display surface is an image obtained by further capturing the image of the object to be operated in an image.

20. The information processing apparatus according to claim 1,
wherein the display surface is formed in air.

21. The information processing apparatus according to claim 1,
wherein the display surface is displayed as an augmented reality or a mixed reality.

22. An information processing apparatus comprising:
a first image capturing device;
a second image capturing device; and
a processing circuit configured to:
detect a motion of a user executed without contact with an object to be operated; and
switch a content of an operation that the object is instructed to perform in accordance with a determination whether the motion of the user is detected between a display surface that displays an image of the object captured by the first image capturing device and the user or such motion is detected between the display surface from which the object is captured by the first image capturing device and the object, wherein the motion of the user between the display surface and the user is detected based on an image captured by the second image capturing device different from the first image capturing device.

23. The information processing apparatus according to claim 22, wherein the motion of the user detected between the display surface and the user and the motion of the user detected between the display surface and the object are correlated with different portions of the object.

24. The information processing apparatus according to claim 23, wherein the motion of the user detected between the display surface and the user is correlated with a surface of the object on a closer side as seen from the user, and the motion of the user detected between the display surface and the object is correlated with a surface of the object on a farther side as seen from the user.

25. The information processing apparatus according to claim 22, wherein the motion of the user detected between the display surface and the user and the motion of the user detected between the display surface and the object are correlated with an identical portion of the object.

26. The information processing apparatus according to claim 22, wherein the processing circuit instructs the object on a basis of only the motion of the user detected between the display surface and the user, or only the motion of the user detected between the display surface and the object, as valid motion.

27. The information processing apparatus according to claim 26, wherein a position of the detected motion treated as the valid motion is set for each function.

28. The information processing apparatus according to claim 26, wherein a position of the detected motion treated as the valid motion is designated by the user.

29. A non-transitory computer readable medium storing a program causing a computer to execute a process, the process comprising:

detecting a motion of a user made between a display surface that displays an image of an object to be operated and the user, the image of the object being captured by a first image capturing device, the motion of the user being detected based on an image captured by a second image capturing device different from the first image capturing device, the motion of the user being made without contact with the display surface; and instructing the object to execute an operation corresponding to the detected motion of the user.

30. A non-transitory computer readable medium storing a program causing a computer to execute a process, the process comprising:

detecting a motion of a user executed without contact with an object to be operated; and switching a content of an operation that the object is instructed to perform in accordance with a determination whether the motion of the user is detected between a display surface that displays an image of the object captured by a first image capturing device and the user or such motion is detected between the display surface from which the object is captured by the first image capturing device and the object, wherein the motion of the user between the display surface and the user is detected based on an image captured by the second image capturing device different from the first image capturing device.

* * * * *